United States Patent
Zhang et al.

(10) Patent No.: US 9,756,596 B2
(45) Date of Patent: *Sep. 5, 2017

(54) METHOD AND COMMUNICATION SYSTEM FOR STORING ADDRESS OF NETWORK ANCHOR POINT TO NETWORK SERVER

(71) Applicant: HUAWEI TECHNOLOGIES CO., LTD., Shenzhen, Guangdong (CN)

(72) Inventors: Jian Zhang, Beijing (CN); Wenruo Zhu, Shanghai (CN); Lan Liu, Shenzhen (CN); Sihong Zhou, Shenzhen (CN); Yanglai Shuai, Shanghai (CN); Haining Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,216

(22) Filed: Jan. 7, 2016

(65) Prior Publication Data

US 2016/0119892 A1 Apr. 28, 2016

Related U.S. Application Data

(63) Continuation of application No. 13/915,877, filed on Jun. 12, 2013, now Pat. No. 9,271,250, which is a
(Continued)

(30) Foreign Application Priority Data

May 28, 2007 (CN) .......................... 2007 1 0074594
Aug. 13, 2007 (CN) .......................... 2007 1 0140572

(51) Int. Cl.
*H04Q 7/00* (2006.01)
*H04W 60/00* (2009.01)
(Continued)

(52) U.S. Cl.
CPC ........... *H04W 60/00* (2013.01); *H04L 61/106* (2013.01); *H04L 61/1588* (2013.01); *H04W 8/26* (2013.01);
(Continued)

(58) Field of Classification Search
USPC ....................................................... 370/328
See application file for complete search history.

(56) References Cited

U.S. PATENT DOCUMENTS 8,244,242 B2 8/2012 Zhang et al.
8,467,782 B1 6/2013 Faccin
(Continued)

FOREIGN PATENT DOCUMENTS

CN 1567894 1/2005
CN 1744761 3/2006
(Continued)

OTHER PUBLICATIONS

3rd Generation Partnership Project; Technical Specification Group Services and System Aspects; 3GPP System Architecture Evolution; GPRS enhancements for E-UTRAN access; Release 8, 3GPP TS 23.401 V0.4.0, Apr. 2007, pp. 1-41 and 3rd Generation Partnership Project; Technical Specification Group Services and System Aspects; 3GPP System Architecture Evolutions; GPRS enhancements for E-UTRAN access; Release 8, 3GPP TS 23.401 V0.4.0, Apr. 2007, pp. 1-60.
(Continued)

*Primary Examiner* — Edan Orgad
*Assistant Examiner* — Sithu Ko
(74) *Attorney, Agent, or Firm* — Staas & Halsey LLP

(57) ABSTRACT

A method, apparatus and communication system for registering address information of a network anchor point to a network server are disclosed. A network apparatus, such as a mobility management entity, determines whether to reg-
(Continued)

ister address information of a network anchor point to a network server, and registers the address information of the network anchor point to the network server when determining to do so.

16 Claims, 33 Drawing Sheets

Related U.S. Application Data continuation of application No. 13/551,376, filed on Jul. 17, 2012, now Pat. No. 8,483,686, which is a continuation of application No. 12/550,867, filed on Aug. 31, 2009, now Pat. No. 8,244,242, which is a continuation of application No. PCT/CN2007/071260, filed on Dec. 18, 2007.

(51) Int. Cl.
*H04W 8/26* (2009.01)
*H04L 29/12* (2006.01)
*H04W 8/06* (2009.01)
*H04W 76/02* (2009.01)
*H04W 80/04* (2009.01)

(52) U.S. Cl.
CPC ............ *H04W 8/065* (2013.01); *H04W 76/02* (2013.01); *H04W 80/04* (2013.01)

(56) References Cited

U.S. PATENT DOCUMENTS

| | | | |
|---|---|---|---|
| 8,483,686 B2 | 7/2013 | Zhang et al. | |
| 9,271,250 B2 | 2/2016 | Zhang et al. | |
| 2002/0159420 A1* | 10/2002 | Naqvi | H04W 8/08 370/338 |
| 2005/0083893 A1* | 4/2005 | Purkayastha | H04W 8/245 370/338 |
| 2006/0117111 A1 | 6/2006 | Sudo | |
| 2006/0258356 A1* | 11/2006 | Maxwell | H04L 29/12047 455/436 |
| 2007/0019643 A1 | 1/2007 | Shaheen | |
| 2007/0160017 A1* | 7/2007 | Meier | H04W 36/18 370/338 |
| 2007/0218903 A1* | 9/2007 | Grech | H04W 36/02 455/436 |
| 2007/0253359 A1* | 11/2007 | Hall | H04W 76/022 370/328 |
| 2009/0052396 A1* | 2/2009 | Bucker | H04W 36/0038 370/331 |
| 2009/0109986 A1 | 4/2009 | Zhao et al. | |
| 2009/0285183 A1 | 11/2009 | Wu et al. | |
| 2009/0305707 A1 | 12/2009 | Pudney | |
| 2010/0040024 A1 | 2/2010 | Wu | |
| 2010/0182953 A1 | 7/2010 | Zhu et al. | |
| 2012/0269182 A1 | 10/2012 | Walker | |

FOREIGN PATENT DOCUMENTS

| | | |
|---|---|---|
| CN | 1878103 | 12/2006 |
| CN | 1886952 | 12/2006 |
| CN | 101316440 | 7/2012 |
| WO | WO2005/053275 | 6/2005 |

OTHER PUBLICATIONS

3GPP TS 23.402 V0.4.0 (Apr. 2007) 3$^{rd}$ Generation Partnership Project; Technical Specification Group Services and System Aspects, 3GPP System Architecture Evolution: Architecture Enhancements for non-3GPP accesses; Release 8, Apr. 2007.
Notice of Allowance, dated Oct. 8, 2015, in U.S. Appl. No. 13/915,877.
Office Action, dated Apr. 3, 2015, in U.S. Appl. No. 13/915,877.
*3$^{rd}$ Generation Partnership Project; Technical Specification Group Services and System Aspects; 3GPP System Architecture Evolution; GPRS enhancements for E-UTRAN access; Release 8,* 3GPP TS 23.401 V0.4.0, Apr. 2007, pp. 1-41.
*Detach Procedure,* 3GPP TSG SA WG2 Meeting #61, TD S2-074970, Ljubljana, Slovenia, Nov. 12-16, 2007, pp. 1-3.
*Discussion on PDN GW address update,* 3GPP TSG SA WG2 Meeting #61, S2-075033, Ljubljana, Slovenia, Nov. 12-16, 2007, pp. 1-23.
Search Report, dated Mar. 13, 2014, in corresponding Chinese Application No. 201210191787.5 (2 pp.).
Office Action, dated Apr. 2, 2014, in corresponding Chinese Application No. 201210191787.5 (5 pages).
Guardini et al., "Mobile IPv6 deployment opportunities in next generation 3GPP networks." 16$^{th}$ IST Mobile and Wireless Communications Summit. Budapest, Hungary Jul. 1-5, 2007.
First Chinese Office Action dated (mailed) Dec. 9, 2010, issued in related Chinese Application No. 200710140572.X Huawei Technologies Co., Ltd.
Second Chinese Office Action of Corresponding Chinese Patent Application No. 200710140572.X; mailed May 25, 2011.
Third Office Action of Corresponding Chinese Patent Application No. 200710140572.X; mailed Aug. 31, 2011.
Written Opinion of the International Searching Authority (translation) dated (mailed) Mar. 6, 2008, issued in related Application No. PCT/CN2007/071260, filed Dec. 18, 2007, Huawei Technologies Co., Ltd.
3GPP TS 23.401 V0.4.1 (Apr. 2007) 3rd Generation Partnership Project; Technical Specification Group Services and System Aspects, 3GPP System Architecture Evolution: GPRS enhancements for E-UTRAN access; Release 8, Apr. 2007.
International Search Report issued in corresponding PCT Patent Application No. PCT/CN2007/071260, mailed Mar. 6, 2008.
Office Action, dated Oct. 17, 2011, in corresponding U.S. Appl. No. 12/550,867.
Notice of Allowance, dated Apr. 20, 2012, in corresponding U.S. Appl. No. 12/550,867.
Office Action, dated Nov. 6, 2012, in corresponding U.S. Appl. No. 13/551,376.
Notice of Allowance, dated Mar. 13, 2013, in corresponding U.S. Appl. No. 13/551,376.
*PDN Gateway selection,* 3GPP TSG SA WG2 Architecture—S2#57, S2-071688, Apr. 23-27, 2007, Beijing, China (pp. 1-3).
*Storage of PDN GW during Handover from non 3GPP to 3GPP,* 3GPP TSG SA WG2 Architecture—S2#57, S2-071700, Apr. 23-27, 2007, Beijing, China (pp. 14).
*GW selection for LTE and non 3GPP accesses,* 3GPP TSG SA WG2 Architecture—S2#57, S2-071738, Apr. 23-27, 2007, Beijing, China (pp. 1-18).
*PDN-GW address retrieval,* 3GPP TSG SA WG2 Architecture—S2#57, S2-071791, Apr. 23-27, 2007, Beijing, China (pp. 1-2).
*PDN GW selection,* 3GPP TSG SA WG2 Architecture—S2#57, S2-071873, Apr. 23-27, 2007, Beijing, China (pp. 1-2).
*PDN Gateway selection,* 3GPP TSG SA WG2 Architecture—S2#57, S2-071983, Apr. 23-27, 2007, Beijing, China (pp. 1-3).

\* cited by examiner

METHOD AND COMMUNICATION SYSTEM FOR STORING ADDRESS OF NETWORK ANCHOR POINT TO NETWORK SERVER

CROSS-REFERENCE TO RELATED APPLICATIONS

This application is a continuation of U.S. patent application Ser. No. 13/915,877, filed on Jun. 12, 2013, which is a continuation of U.S. patent application Ser. No. 13/551,376, filed on Jul. 17, 2012, now U.S. Pat. No. 8,483,686, which is a continuation of U.S. patent application Ser. No. 12/550,867, filed on Aug. 31, 2009, now U.S. Pat. No. 8,244,242, which is a continuation of International Application No. PCT/CN2007/071260, filed on Dec. 18, 2007, which claims priority to Chinese patent application No. 200710074594.0, filed on May 28, 2007, and Chinese patent application No. 200710140572.X, filed on Aug. 13, 2007, all of which are hereby incorporated by reference in their entireties.

TECHNICAL FIELD

The present disclosure relates to a wireless communication technology, particularly to a technology for storing and deleting an address of a network anchor point, and more particularly to a method and communication system for storing an address of a network anchor point to a network server.

BACKGROUND

For future communication technologies, it will be an important research subject to achieve a seamless handover of a terminal between $3^{rd}$ Generation Partnership Project (3GPP) and non-3GPP access technologies.

Currently, as the two access technologies are different in aspects such as air interface, authentication, user plane establishment, and control plane entities of core networks of the two access technologies have no corresponding interface, a seamless handover of a terminal between the 3GPP and non-3GPP access technologies is a hard forward handover process, that is, an attachment process will be performed again when the terminal in an active state accesses a heterogeneous access network.

After the terminal is attached to an access network, the terminal may select a network anchor point for connection to an external packet data network (PDN); and an Internet protocol (IP) address used by the terminal will be assigned by the network anchor point or provided by the external PDN. In the 3GPP access technology, an entity in a network may obtain an address of the network anchor point by using an access point name (APN); and in the non-3GPP access technology, the terminal may obtain the address of the network anchor point during access authentication or obtain the address of the network anchor point from a domain name server (DNS) by using the APN obtained during the access authentication. Therefore, modes for obtaining an address of a network anchor point are different for different access technologies. As such, when the terminal is attached to a 3GPP network, the terminal may select a network anchor point, and obtain an address of the network anchor point. When the terminal in the active state moves from the 3GPP network to a non-3GPP network, a reattachment process may be triggered, and a PDN gateway (PDN GW) reselection process needs to be triggered. If the mode for obtaining an address of a network anchor point in the non-3GPP network is used, the obtained network anchor point may not be a network anchor point obtained in the 3GPP network, which causes a change in connection of a user IP level, resulting in data loss. Therefore, when the terminal is handed over between different access networks, it is essential to keep the network anchor point unchanged in order to maintain the service continuity.

In order to keep the network anchor point unchanged, those skilled in the art proposed a concept: storing an address of a network anchor point obtained in an access network to a network server; and obtaining the address of the network anchor point from the network server when the terminal is handed over from the access network to another access network. As such, no matter which network the terminal is handed over to, the same address of the network anchor point may be obtained, thus avoiding loss of user data.

However, currently, storing an address of a network anchor point to a network server is not feasible, nor is deleting an address of a network anchor point from a network server feasible.

BRIEF SUMMARY

Various embodiments described herein provide a method and communication system for storing an address of a network anchor point to a network server, so as to provide a feasible technical solution for storing an address of a network anchor point to a network server.

One embodiment of the present disclosure provides a method for storing an address of a network anchor point to a network server. The method includes the following steps.

A terminal initiates an attach request or a bearer establishment request, and a network selects a network anchor point.

When the network anchor point assigns a first bearer context to the terminal, or when a first connection is established between the network anchor point and the terminal, the network registers an address of the network anchor point to a network server.

One embodiment of the present disclosure further provides a communication system. The communication system includes a bearer context assignment entity and an address registration entity. The bearer context assignment entity is configured to enable a network anchor point to assign a first bearer context to a terminal. The address registration entity is configured to register an address of the network anchor point with a network server when the network anchor point assigns the first bearer context to the terminal.

One embodiment of the present disclosure further provides a communication system. The communication system includes a connection establishment entity and an address registration entity. The connection establishment entity is configured to establish a first connection between a network anchor point and a terminal. The address registration entity is configured to register an address of the network anchor point with a network server when the first connection between the network anchor point and the terminal is established.

Embodiments of the present disclosure also provide a method and communication system for deleting an address of a network anchor point from a network server, so as to provide a feasible technical solution for deleting an address of a network anchor point from a network server, scenarios where a server entity in a network initiates a delete bearer request, and specific processes related thereof.

One embodiment of the present disclosure provides a method for deleting an address of a network anchor point from a network server. The method includes the following steps.

When a terminal or an entity in a network initiates a delete bearer request, the network instructs a network server to delete an address of a network anchor point that has been registered with the network server if the network anchor point no longer serves the terminal.

The network server deregisters the address of the network anchor point.

One embodiment of the present disclosure further provides a communication system. The communication system includes an address deletion notification entity and an deregistration entity. The address deletion notification entity is configured to send a notification for deleting an address of a network anchor point that has been registered with a network server and no longer serves a terminal when the terminal or an entity in a network initiates a Delete Bearer Request. The deregistration entity is configured to deregister the address of the network anchor point according to the notification of the address deletion notification entity.

A method for releasing a bearer is provided. The method includes the following steps.

A network server initiates a bearer release request.

After receiving a bearer release response, the network server deletes an address of a network anchor point corresponding to the bearer stored on the network server.

Embodiments of the present disclosure also provide a method for a terminal to log out of a network, so as to provide for a terminal to log out of a network and specific processes for a terminal to log out of a network.

The method includes the following steps.

A terminal logout process is triggered, and access network resources corresponding to the terminal are released.

A mobile Internet protocol (IP) binding corresponding to the terminal is unbound.

Address information of all network anchor points related to the terminal stored in a network server is deleted.

In some embodiments of the present disclosure, a network anchor point may assign a first bearer context to a terminal or a first connection may be established between the network anchor point and the terminal, and a network registers an address of the network anchor point with a network server. Thus, the embodiments of the present disclosure may provide a feasible technical solution for registering an address of a network anchor point with a network server.

In some other embodiments of the present disclosure, when a network anchor point on longer serves a terminal, a network server may receive a notification for deleting an address of the network anchor point and then deregister the address of the network anchor point. Thus, the embodiments of the present disclosure may provide a feasible embodiment for deleting an address of a network anchor point from a network server, and a feasible embodiment for implementing a bearer release process initiated by a network server.

In some other embodiments of the present disclosure, when it is required to break a connection between a terminal and a network, address information of all network anchor points related to the terminal stored in a network server is deleted, and a mobile IP binding corresponding to the terminal is unbound, so as to break the connection between the terminal and the network.

DETAILED DESCRIPTION OF THE EMBODIMENTS

As some embodiments described in the following relate to the evolved radio network technology, a evolved radio network architecture is illustrated first with reference to FIG. 1.

Figure 1:
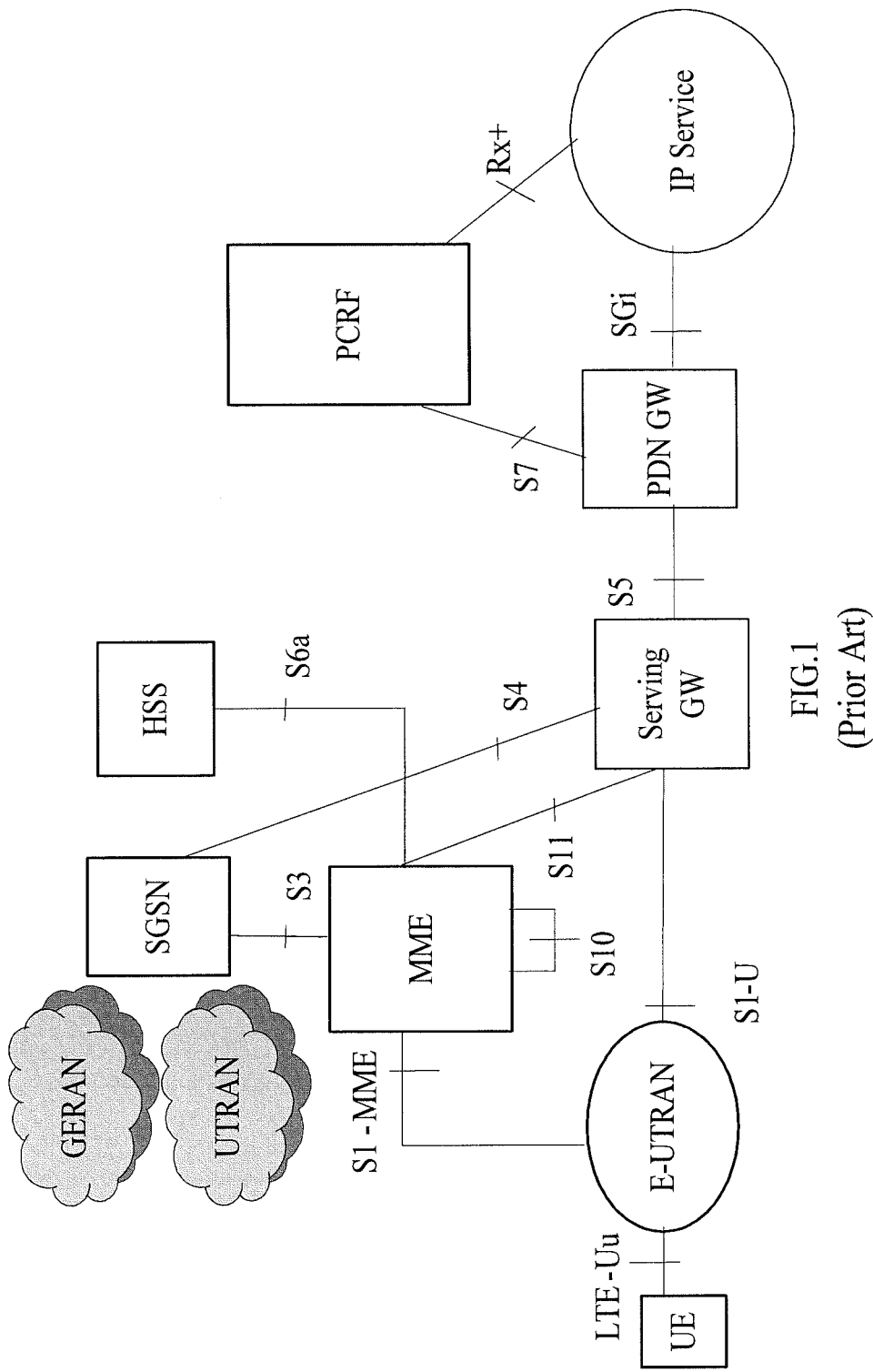
FIG. 1 is a schematic view of an evolved radio network architecture in the prior art.

As shown in FIG. 1, a core network of an evolved radio network mainly includes a mobility management entity (MME), a serving gateway (serving GW), a PDN GW, and other logic functional modules. The MME is responsible for the mobility management of the control plane, including the management of user contexts and mobility states, the allocation of temporary identities to users as well as security functions, and corresponds to a control plane part of a serving GPRS support node (SGSN) in a current universal mobile telecommunication system (UMTS). The serving GW is a user plane entity responsible for initiating a paging for downlink data in an idle state, managing and storing IP bearer parameters and intra-network route information, and corresponds to a data plane part of a gateway GPRS support node (GGSN) and the SGSN in the current UMTS system. An evolved packet data gateway (ePDG) is equivalent to an access gateway of a non-3GPP network. The PDN GW is equivalent to a network anchor point between different access networks. An interface between the PDN GW and a 3GPP access network is S5 as shown in FIG. 1, and an interface between the PDN GW and a non-3GPP access network is S2 (not shown in FIG. 1).

In order to enable those skilled in the art to store an address of a network anchor point to a network server, several embodiments of the present disclosure are described in the following with reference to the accompanying drawings.

Embodiments as shown in FIGS. 2A and 2B, 3A and 3B, and 4A and 4B respectively describe processes for registering an address of a PDN GW with a home subscriber server (HSS) when a terminal is attached to a 3GPP access network.

Figure 2A:
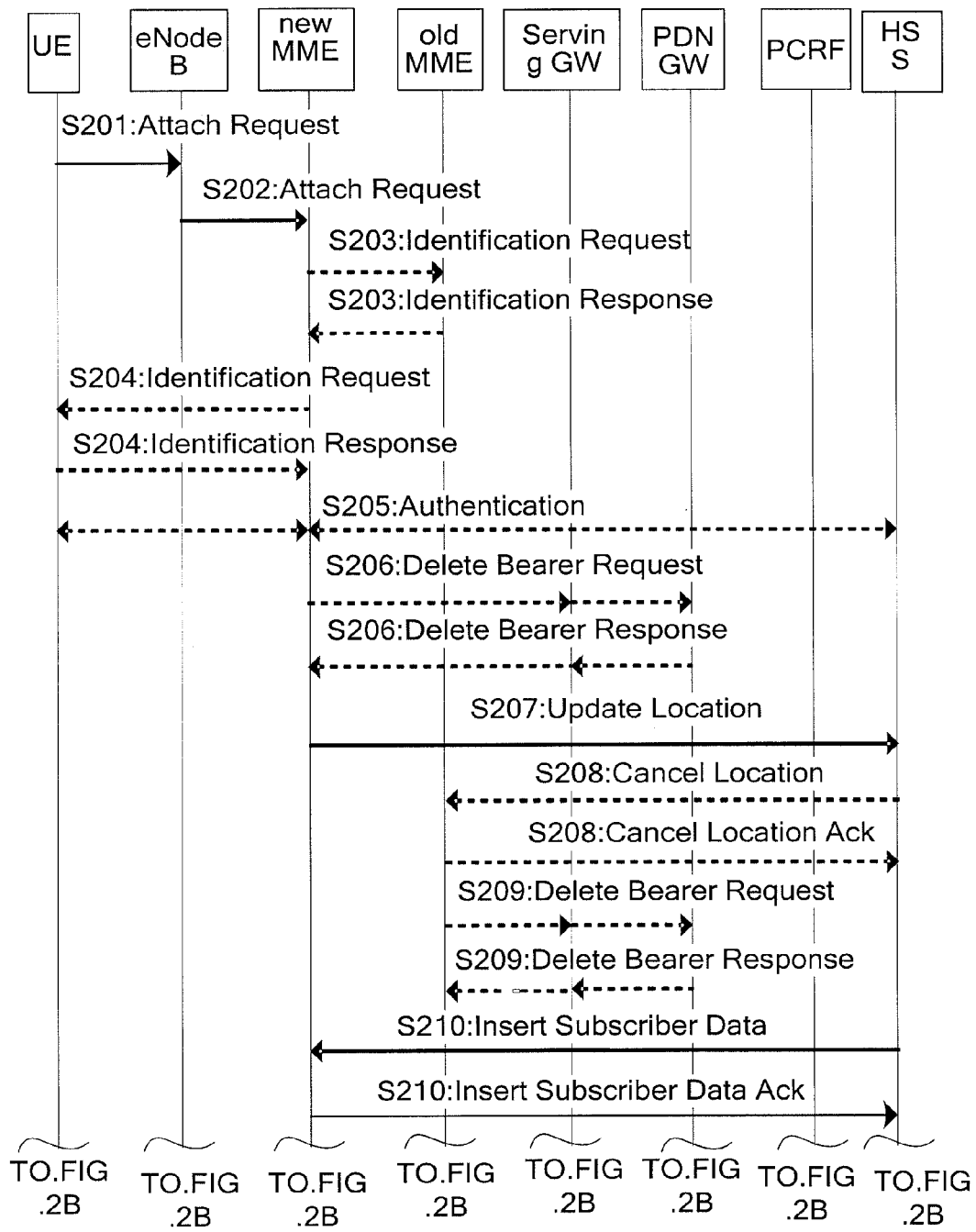
FIG. 2A and FIG. 2B together show a flow chart of a method for storing an address of a network anchor point to a network server according to one embodiment of the present disclosure.
Figure 2B:
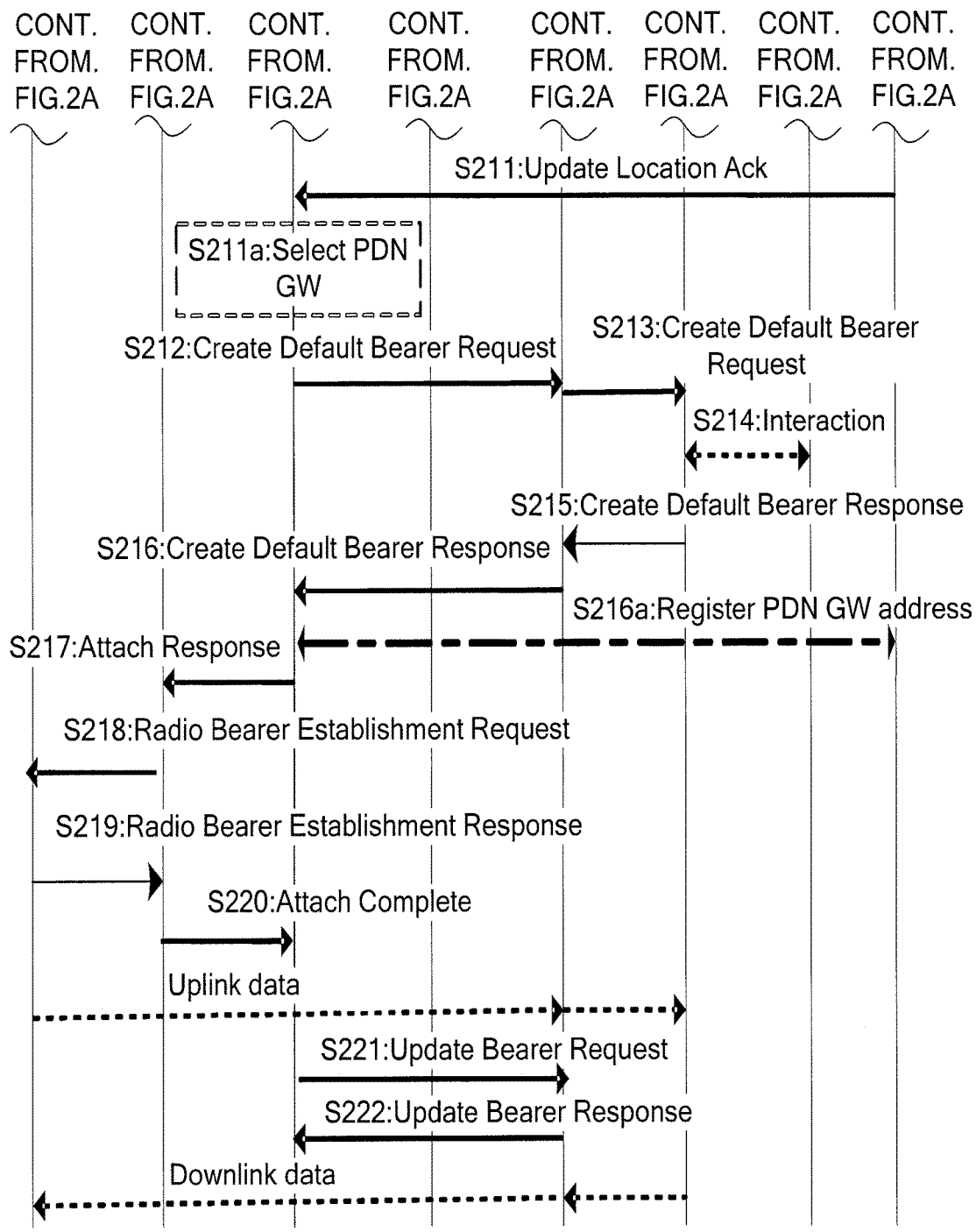

Specifically, in the embodiment shown in FIG. 2A and FIG. 2B, an MME registers an address of a PDN GW with an HSS.

As shown in FIG. 2A and FIG. 2B, the process includes the following steps.

In Step S201, a user equipment (UE) initiates an Attach Request. The request contains an International Mobile Subscriber Identity (IMSI), an S-Temporary Mobile Subscriber Identity (S-TMSI), a Tracking Area Identity (TAI), a selected network identity, and other parameters.

In Step S202, an evolved Node B (eNodeB) forwards the Attach Request to a new MME. The Attach Request carries a cell identity. Specifically, the eNodeB may query an MME address from the selected network identity and the S-TMSI, and may select an MME if the eNodeB cannot derive an MME.

In Step S203, the new MME sends an Identification Request to an old MME to request an IMSI. The old MME may respond with an Identification Response by providing the IMSI. After the UE is separated or detached from the network, the S-TMSI of the UE and the MME are changed, and the new MME may send the S-TMSI and old TAI to the old MME to request the IMSI.

In Step S204, if neither the new MME nor the old MME can identify the UE, the new MME sends an Identification Request to the UE to request the IMSI, and the UE may respond with an Identification Response by providing the IMSI to the new MME.

In Step S205, if no context of the UE exists in the network, an Authentication message must be performed forcedly.

In Step S206, if some active bearer contexts related to the UE exist in the new MME, the new MME needs to send a Delete Bearer Request to a related gateway (for example, the PDN GW as shown in the figure), and the related gateway may respond with a Delete Bearer Response, so that the new MME deletes the bearer contexts.

In Step S207, the new MME sends an Update Location message to an HSS. The Update Location message contains an identity of the new MME and the IMSI.

In Step S208, the HSS sends a Cancel Location message to the old MME, and the old MME responds with a Cancel Location Acknowledgement (Ack) message and removes the mobility management and bearer contexts.

In Step S209, if some active bearer contexts related to the UE exist in the old MME, the old MME needs to send a Delete Bearer Request to a related gateway, and the related gateway may respond with a Delete Bearer Response, so that the old MME deletes the bearer contexts.

In Step S210, the HSS sends an Insert Subscriber Data message to the new MME. If the new MME verifies that the UE is allowed to attach, the new MME constructs a context for the UE, and returns an Insert Subscriber Data Ack message to the HSS.

In Step S211, the HSS sends an Update Location Ack message to the new MME.

In Step S211a, the new MME selects a suitable PDN GW according to information such as an APN or a Fully Qualified Domain Name (FQDN). The PDN GW may be selected according to an APN-based policy and with reference to configuration of a user plane entity (UPE) pool, location of the PDN GW, equipment load, operator subscription information, roaming protocol, and other information. The HSS may also provide a set of PDN GW addresses, and the new MME may directly select a suitable PDN GW according to the configuration of UPE pool, location of the PDN GW, equipment load, operator subscription information, roaming protocol, and other information. Definitely, this step is optional when the PDN GW addresses may be directly provided by the HSS, for example, when the UE in the active state is handed over from a non-3GPP network to a 3GPP network or when the UE is attached to the 3GPP network for the first time and the HSS only provides a unique PDN GW address to the MME.

In Step S212, the new MME sends a Create Default Bearer Request to the selected serving GW. The Create Default Bearer Request may contain the IMSI and a context identity of the new MME.

In Step S213, the serving GW creates a new entity in an evolved packet system (EPS) bearer table, and sends the Create Default Bearer Request message to the PDN GW.

In Step S214, if a policy control and charging (PCC) system is applied in the network, the PDN GW may need to interact with a policy charging rule function (PCRF) to obtain a default PCC rule set for the UE.

In Step S215, the PDN GW returns a Create Default Bearer Response message to the serving GW. If an address has been assigned to the PDN GW, the Create Default Bearer Response message may contain the address of the PDN GW.

In Step S216, the serving GW returns the Create Default Bearer Response message to the new MME.

In Step S216a, if the UE has subscribed to mobility capability in a non-3GPP network, the new MME may register the address of the PDN GW and a corresponding APN with the HSS. Definitely, the new MME may also register the address of the PDN GW with the HSS according to a configuration parameter thereof, so as to maintain the service continuity when the UE is handed over between the 3GPP network and the non-3GPP network. Specifically, after obtaining a set of PDN GW addresses in Step S211a, the new MME will select a suitable PDN GW according to the description in Step S211a; and after a bearer is successfully established between the serving GW and the PDN GW, the new MME may register a flag of the address of the selected PDN GW with the HSS, so as to indicate that the PDN GW has been selected as a user PDN anchor point by the new MME.

As the HSS needs to provide PDN GW addresses to the new MME and record the registered PDN GW addresses, the HSS may be additionally provided with the following subscription data.

| | |
|---|---|
| PDN GW list (including PDN GW address and flag) | Maintain a list of related PDN GW addresses provided to the UE and flags indicating whether a PDN GW is selected |
| Register PDN GW address | PDN GW address registered with the HSS |

In Step S217, the new MME sends an Attach Accept message to the eNodeB. The Attach Accept message may contain a security context, quality of service (QoS), uplink tunnel information, the PDN GW address assigned to the UE, and other information.

In Step S218, the eNodeB sends a Radio Bearer Establishment Request and an Attach Accept message to the UE. Definitely, the Attach Accept message may be contained in the Radio Bearer Establishment Request, or on the contrary, the Radio Bearer Establishment Request may also be contained in the Attach Accept message.

In Step S219, the UE sends a Radio Bearer Establishment Response to the eNodeB. In addition, the UE may also send an Attach Complete message to the eNodeB. Definitely, the Attach Accept message may be contained in the Radio Bearer Establishment Response, or on the contrary, the Radio Bearer Establishment Response may also be contained in the Attach Accept message.

In Step S220, the eNodeB forwards an Attach Complete message to the new MME. The Attach Complete message may be contained in an S1-MME interface control message, and the control message also contains downlink tunnel information.

In Step S221, the new MME sends an Update Bearer Request message to the serving GW. The Update Bearer Request message may contain an eNodeB address and a downlink tunnel parameter.

In Step S222, the serving GW returns an Update Bearer Response message to the new MME.

In the embodiment shown in FIG. 2A and FIG. 2B, if a plurality of bearers needs to be established, different network entities may trigger the establishment of different bearers, for example, pre-established virtual private network (VPN) scenarios and dedicated signaling bearers. The network entities may include the MME, the serving GW, the PCRF, the PDN GW, and the like. Therefore, the PDN GW addresses selected for establishing the new bearers also need to be registered with the HSS. Accordingly, the HSS needs to store PDN GW addresses of different bearers, and different PDN GW addresses may be selected for different bearers.

In addition, the HSS and an authentication, authorization, and accounting (AAA) server may be implemented as an entity or separate entities. Likewise, the HSS and a subscription profile repository (SPR) may be implemented as an entity or separate entities.

Moreover, if the UE is attached to the non-3GPP network, the MME may be equivalent to an access gateway entity such as an ePDG or an access serving network gateway (ASN GW), and the entity may register the PDN GW addresses with the AAA server after the bearers are successfully established.

In the embodiment shown in FIG. 2A and FIG. 2B, as the MME is a control plane entity and has an interface with the HSS, the MME may register a selected PDN GW address with the HSS according to a parameter configured on the MME when the UE selects a related PDN GW for the first time.

Figure 3A:
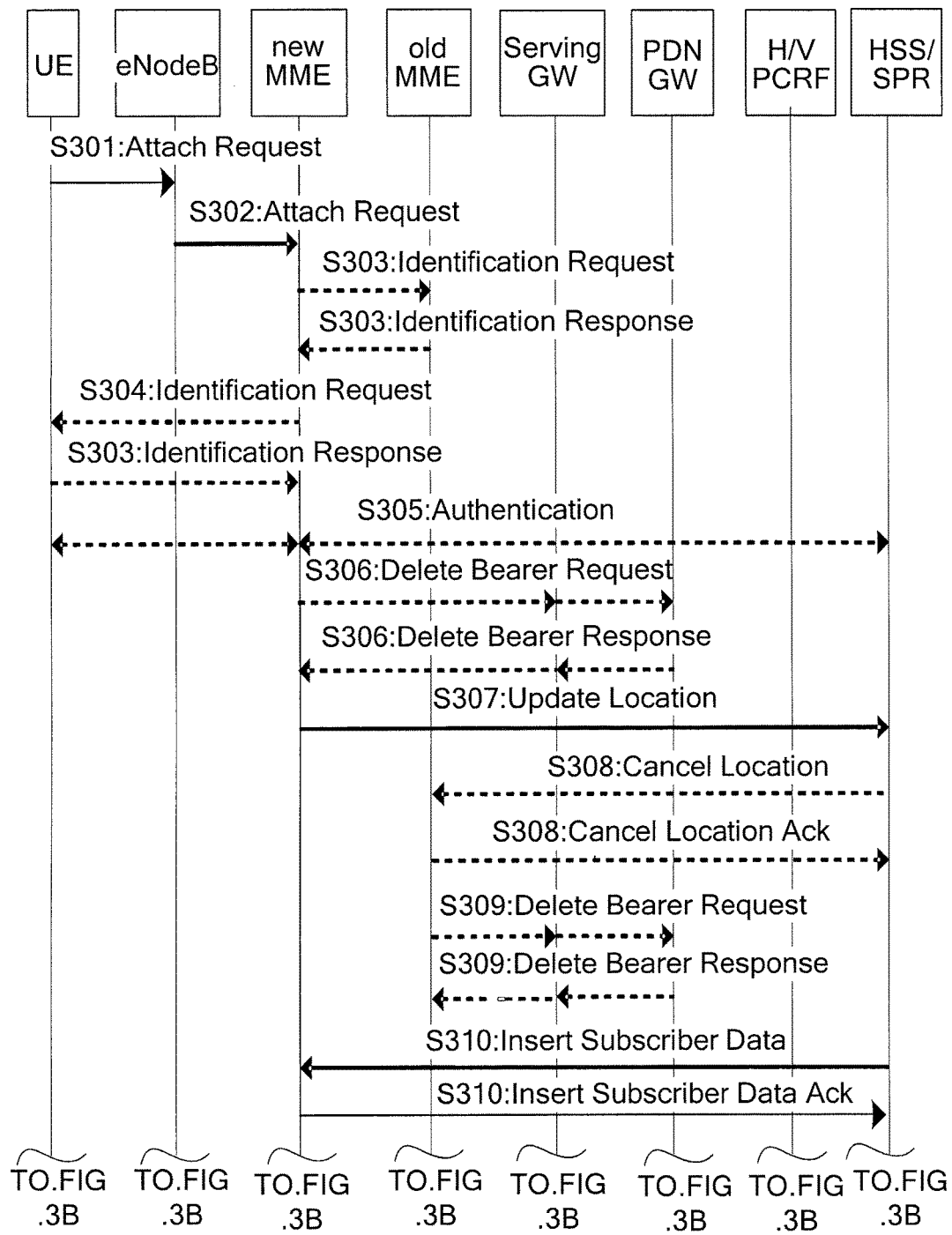
FIG. 3A and FIG. 3B together show a flow chart of the method for storing an address of a network anchor point to a network server according to one embodiment of the present disclosure.
Figure 3B:
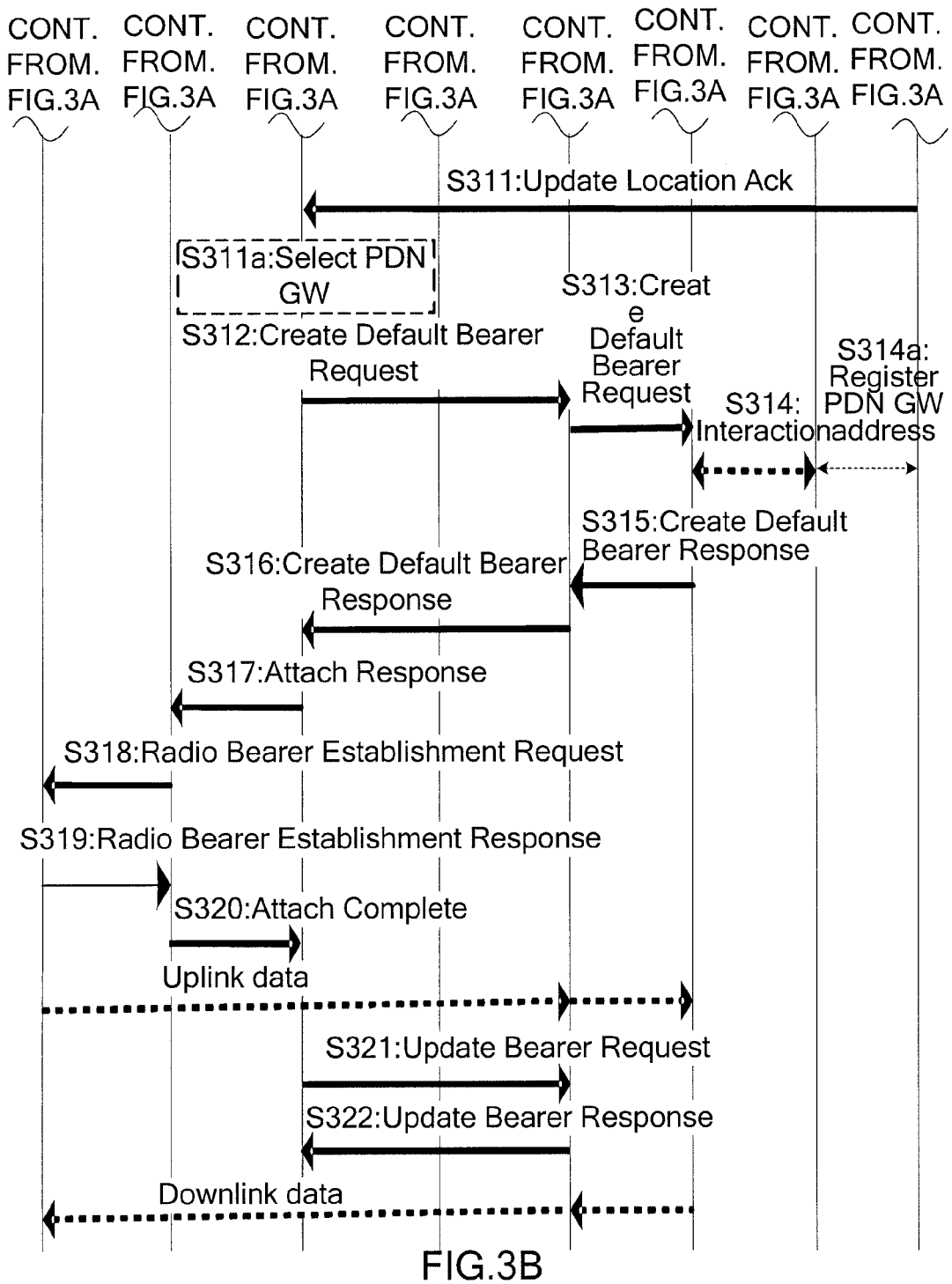

In the embodiment shown in FIG. 3A and FIG. 3B, a PCC system registers an address of a PDN GW with the HSS.

As shown in FIG. 3A and FIG. 3B, the process includes the following steps.

Steps S301-S311 are the same as Steps S201-S211 shown in FIG. 2.

In Step S311a, the new MME selects a suitable PDN GW according to information such as an APN or an FQDN. The PDN GW may be selected according to an APN-based policy and with reference to configuration of the UPE pool, location of the PDN GW, equipment load, operator subscription information, roaming protocol, and other information. The HSS may also provide a set of PDN GW addresses, and the new MME may directly select a suitable PDN GW according to the configuration of the UPE pool, location of the PDN GW, equipment load, operator subscription information, roaming protocol, and other information. Definitely, this step is optional, for example, when the UE in the active state is handed over from a non-3GPP network to a 3GPP network or when the UE is attached to the 3GPP network for the first time and the HSS only provides a unique PDN GW address to the new MME.

In addition, the new MME needs to determine whether to trigger a process for registering the PDN GW address with the HSS/SPR through a PCC system or not. A condition for the determination may be subscription data of the UE or a parameter configured on the new MME.

In Step S312, the new MME sends a Create Default Bearer Request to the serving GW. The Create Default Bearer Request may contain a parameter for registering the PDN GW address with the HSS/SPR, and the parameter indicates that the PDN GW registers the selected PDN GW address with the HSS/SPR through the PCC system. The parameter is optional, that is, the PDN GW may directly configure related options to ensure that the PDN GW address is registered with the HSS/SPR/AAA server through the PCC system.

In Step S313, the serving GW sends the Create Default Bearer Request message to the PDN GW. The Create Default Bearer Request may contain the parameter mentioned in Step S312 so as to trigger the PDN GW to register the address thereof with the HS S/SPR.

In Step S314, if the PCC system is applied in the network, the PDN GW may need to interact with the PCRF to obtain a default PCC rule set for the UE (here, scenarios of local breakout, that is, access to local services are included). When the PDN GW is located in a roaming area, the PDN GW will interact with a home-PCRF (H-PCRF) through a visit-PCRF (V-PCRF).

A related attribute value pair (AVP) may be added into a message interacted between the PDN GW and the PCRF to trigger the PCRF to register the PDN GW address with the HSS/SPR, which is specifically implemented as follows.

```
<CC-Request> ::= < Diameter Header: 272, REQ, PXY >
    < Session-Id >
    { Auth-Application-Id }
    { Origin-Host }
    { Origin-Realm }
    { Destination-Realm }
    { CC-Request-Type }
    { CC-Request-Number }
    [ Destination-Host ]
    [ Origin-State-Id ]
    *[ Subscription-Id ]
    [ Bearer-Control-Mode ]
    [ Network-Request-Support ]
    [ Bearer-Identifier ]
    [ Bearer-Operation ]
    [ Framed-IP-Address ]
    [ Framed-IPv6-Prefix ]
    [ 3GPP-RAT-Type ]
    [ Termination-Cause ]
    [ User-Equipment-Info ]
    [ 3GPP-GPRS-Negotiated-QoS-Profile ]
    [ 3GPP-SGSN-MCC-MNC ]
    [ 3GPP-SGSN-Address ]
    [ 3GPP-SGSN-IPv6-Address ]
    [ Called-Station-ID ]
    [ Bearer-Usage ]
    *[ TFT-Packet-Filter-Information ]
    *[ Charging-Rule-Report]
    *[ Event-Trigger]
    [ Access-Network-Charging-Address ]
    *[ Access-Network-Charging-Identifier-Gx ]
    *[Flag of Register PCEF address to HSS/SPR ]
    *[ Proxy-Info ]
    *[ Route-Record ]
    *[ AVP ]
```

In Step S314a, the PCRF may initiate a process for obtaining the subscription data of the UE from the HSS/SPR and then register the PDN GW address with the HSS/SPR. In addition, if the PCRF has the subscription data of the UE, the PCRF may only initiate the process for registering the PDN GW address with the HSS/SPR.

Steps S315-S322 may be the same as Steps S215-S222 shown in FIG. 2B, except that if the Create Default Bearer Request sent by the new MME to the serving GW in Step S312 contains the parameter for registering the PDN GW address with the HSS/SPR, the Create Default Bearer Response message in Steps S315 and S316 may contain a parameter indicating that the PDN GW address is successfully registered with the HSS/SPR.

In the embodiment shown in FIG. 3A and FIG. 3B, the process in the prior art may be adopted, and no additional message is introduced.

In addition, if the UE is attached to the non-3GPP network, the MME may be equivalent to an access gateway entity such as an ePDG or an ASN GW; and the PDN GW may register the PDN GW addresses with the HSS/AAA server/SPR through the PCC system after the bearers are successfully established.

In the process shown in FIG. 3A and FIG. 3B, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

Figure 4A:
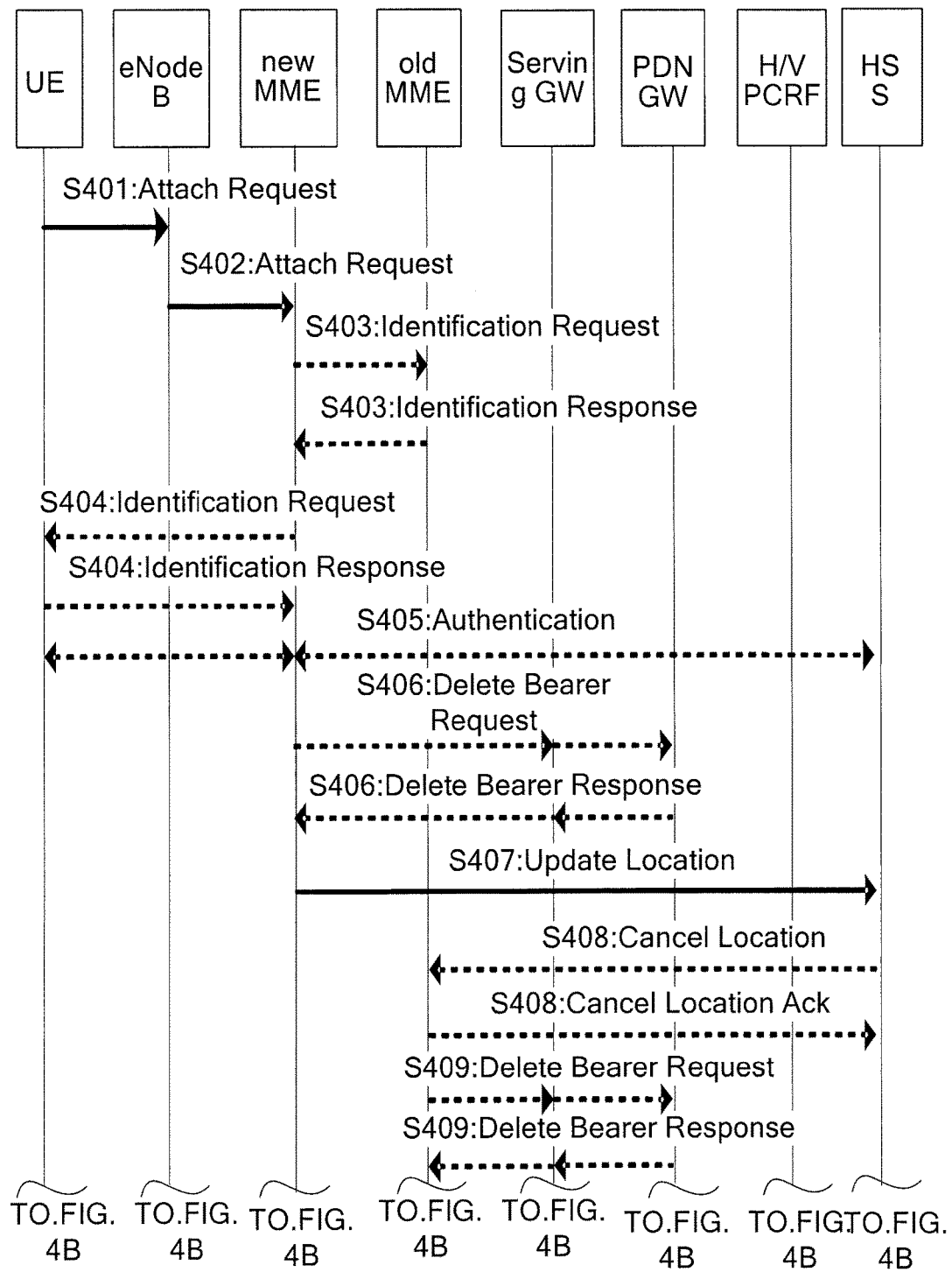
FIG. 4A and FIG. 4B together show a flow chart of the method for storing an address of a network anchor point to a network server according to one embodiment of the present disclosure.
Figure 4B:
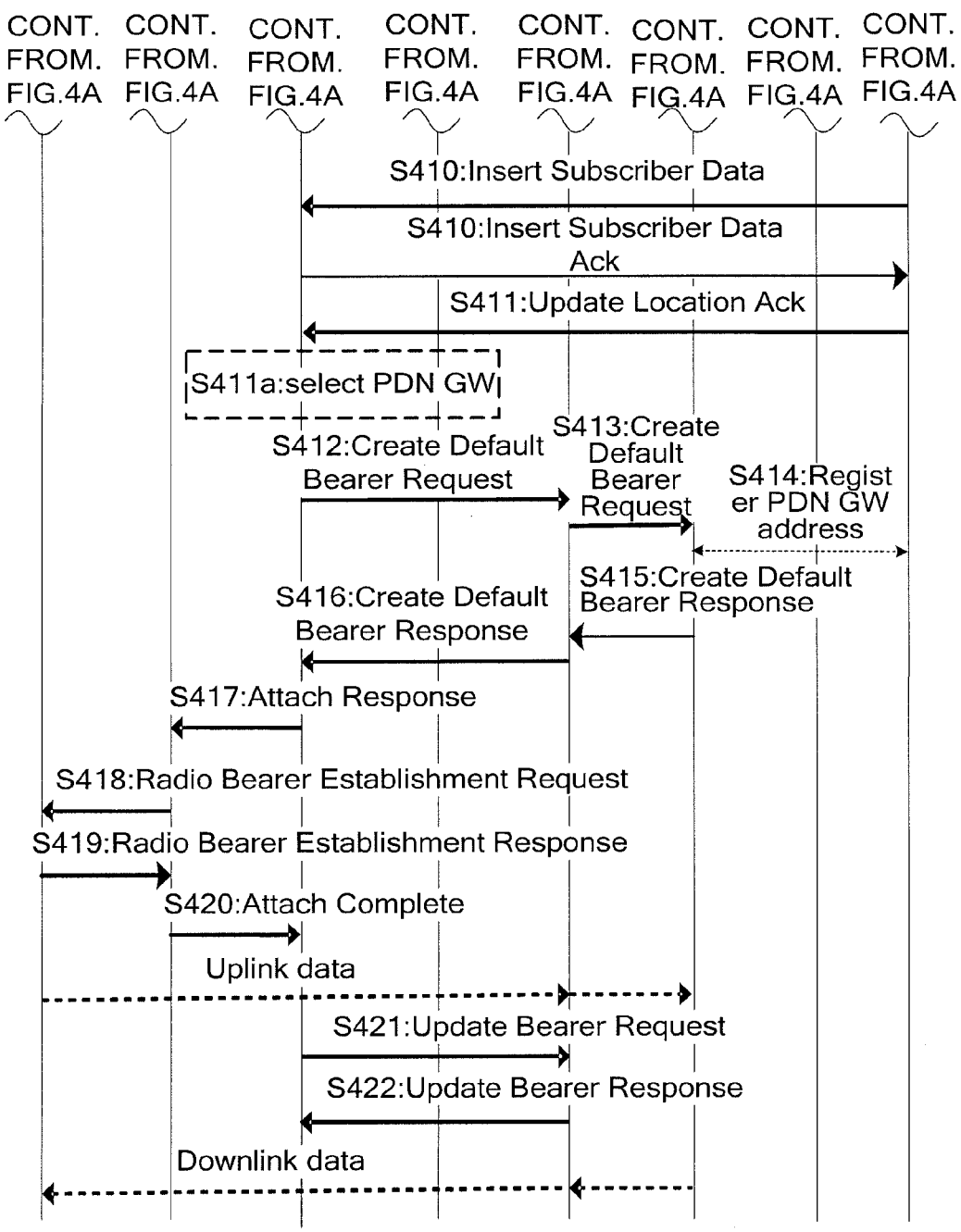

In the embodiment shown in FIG. 4A and FIG. 4B, a PDN GW directly registers an address thereof with an HSS. The embodiment shown in FIG. 4A and FIG. 4B may include local breakout scenarios.

As shown in FIG. 4A and FIG. 4B, the process includes the following steps.

Steps S401-S411 are the same as Steps S201-S211 shown in FIG. 2.

In Step S411a, the new MME selects a suitable PDN GW according to information such as an APN or an FQDN. The PDN GW may be selected according to an APN-based policy and with reference to configuration of the UPE pool, location of the PDN GW, equipment load, operator subscription information, roaming protocol, and other information. The HSS may also provide a set of PDN GW addresses, and the new MME may directly select a suitable PDN GW according to the configuration of the UPE pool, location of the PDN GW, equipment load, operator subscription information, roaming protocol, and other information. Definitely, this step is optional, for example, when the UE in the active state is handed over from a non-3GPP network to a 3GPP network or when the UE is attached to the 3GPP network for the first time and the HSS only provides a unique PDN GW address to the new MME.

In addition, the new MME needs to determine whether to trigger the PDN GW to register the address thereof with the HSS/SPR or not. A condition for the determination may be subscription data of the UE or a parameter configured on the new MME.

In Step S412, the new MME sends a Create Default Bearer Request to the serving GW. The Create Default Bearer Request may contain a parameter for registering the PDN GW address with the HSS/SPR. The parameter is optional, that is, the PDN GW may directly configure related option parameters to ensure that the address thereof is directly registered with the HSS/SPR/AAA server.

In Step S413, the serving GW creates a new entity in an EPS bearer table, and transparently transmits the Create Default Bearer Request sent by the new MME to the PDN GW.

In Step S414, the PDN GW registers the address thereof to the HSS/AAA server, and the HSS/AAA server returns a related indication to the PDN GW.

Steps S415-S422 may be the same as Steps S215-S222 shown in FIG. 2, except that if the Create Default Bearer Request sent by the new MME to the serving GW in Step S412 contains the parameter for registering the PDN GW address with the HSS/SPR, the Create Default Bearer Response message in Steps S415 and S416 may contain a parameter indicating that the PDN GW address is successfully registered with the HSS/SPR.

In the embodiment shown in FIG. 4A and FIG. 4B, the process in the prior art may be adopted, and no additional message is introduced.

In addition, in the embodiment shown in FIG. 4A and FIG. 4B, if the HSS and the AAA server are separate entities, the PDN GW may register the address thereof with the AAA server, and then the AAA server transmits the address of the PDN GW to the HSS.

Moreover, if the UE is attached to the non-3GPP network, the MME may be equivalent to an access gateway entity such as an ePDG or an ASN GW; and the PDN GW may directly register the addresses thereof with the HSS/AAA server after the bearers are successfully established.

It should also be noted that, the network entity that triggers the PDG GW to register the addresses thereof with the HSS may be, but is not limited to, the MME, the serving GW, the PDN GW, the ePDG, or the ASN GW.

In the process shown in FIG. 4A and FIG. 4B, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

Figure 5:
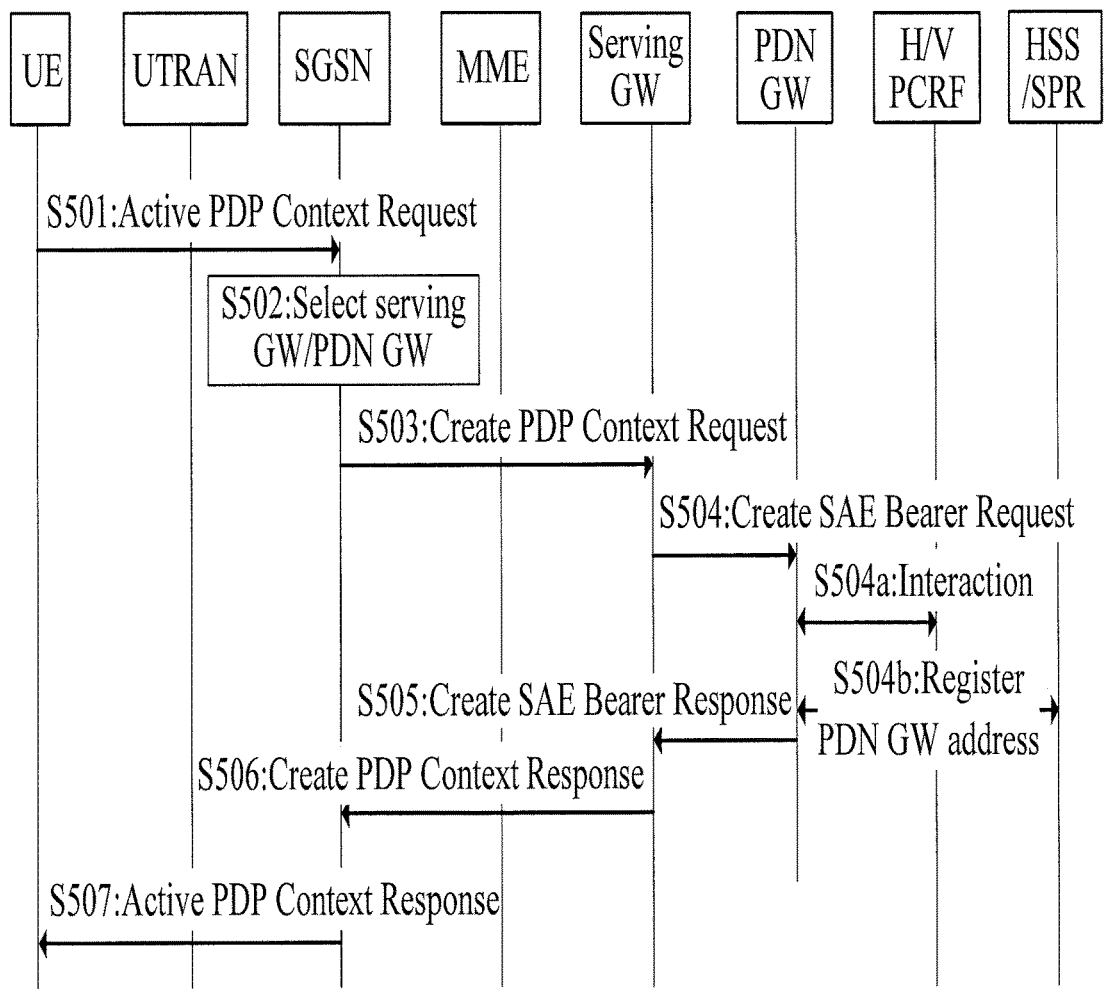
FIG. 5 is a flow chart of the method for storing an address of a network anchor point to a network server according to one embodiment of the present disclosure.
Figure 6:
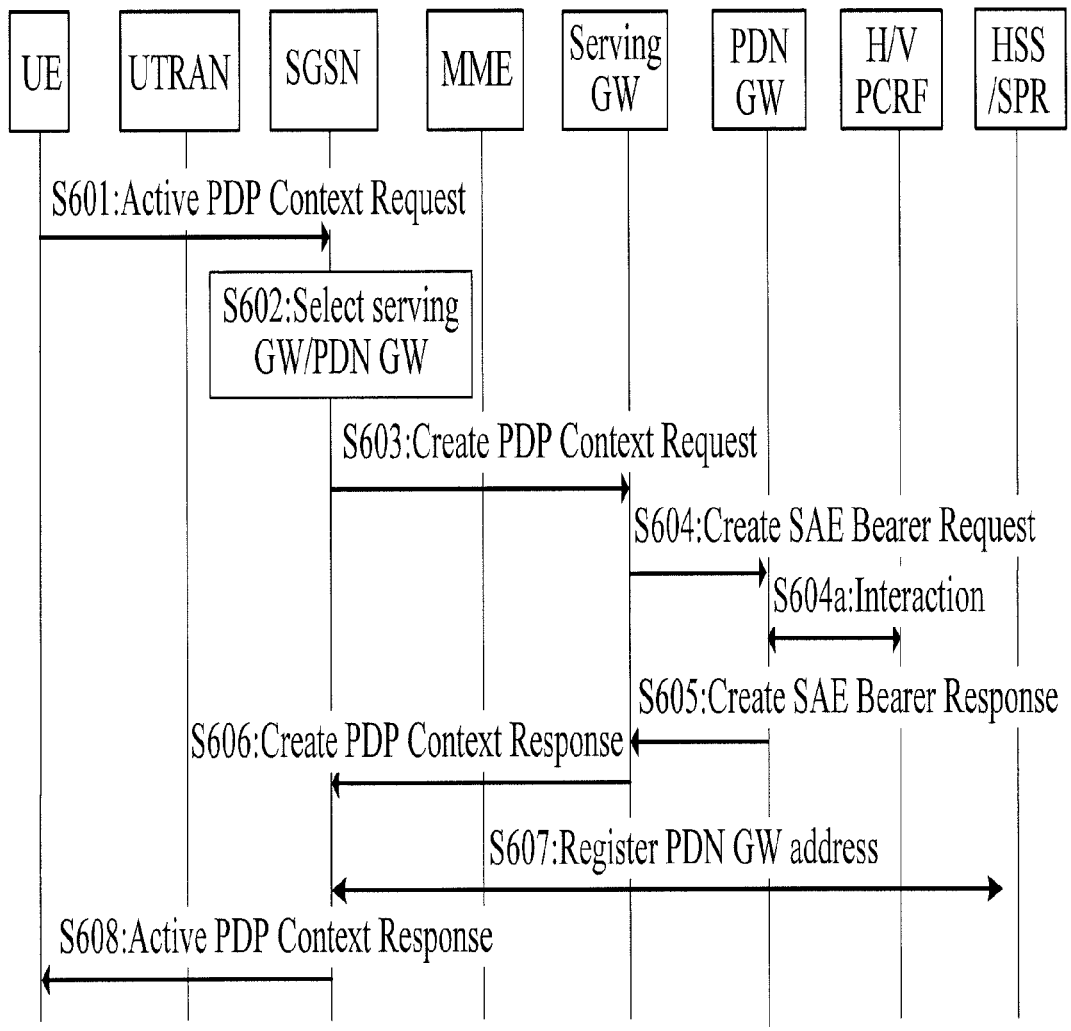
FIG. 6 is a flow chart of the method for storing an address of a network anchor point to a network server according to one embodiment of the present disclosure.
Figure 7:
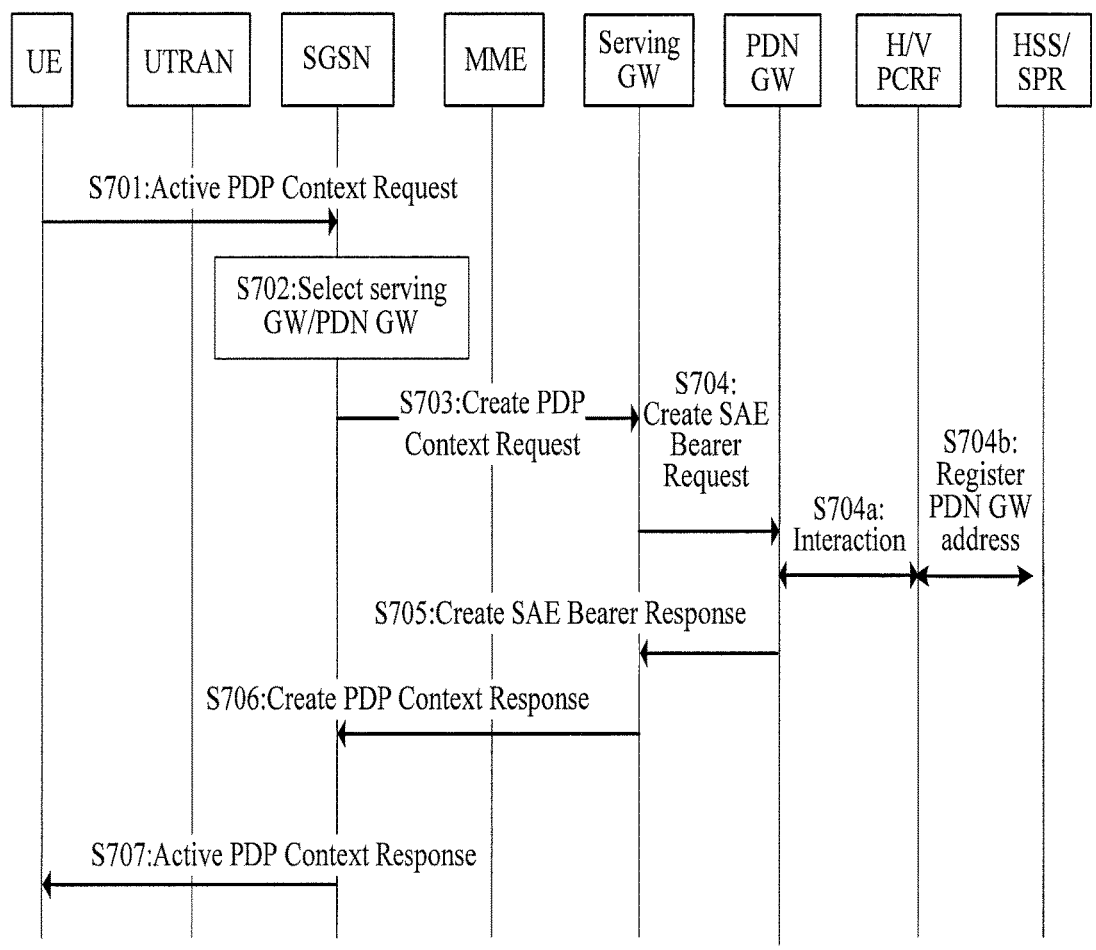
FIG. 7 is a flow chart of the method for storing an address of a network anchor point to a network server according to one embodiment of the present disclosure.

Embodiments shown in FIGS. 5, 6, and 7 respectively describe processes for registering an address of a PDN GW with an HSS/SPR when a terminal initiates a bearer establishment process in a 3GPP access network.

Specifically, in the embodiment shown in FIG. 5, if a UE initiates a service from the 3GPP network to access an external PDN for the first time, the PDN GW directly registers the address thereof with the HSS. This embodiment includes local breakout scenarios.

As shown in FIG. 5, the process includes the following steps.

In Step S501, a UE sends an Active Packet Data Protocol (PDP) Context Request message to an SGSN.

In Step S502, the SGSN selects a related serving GW and PDN GW according to subscription data of the UE and APN information carried in the Active PDP Context Request message, and determines whether the PDN GW is required to register an address thereof with an HSS or not. A condition for the determination may be subscription data of the UE. The process for determining the condition is optional, for example, the PDN GW may also directly determine whether to register the address thereof with the HSS or not according to a parameter configured on the PDN GW.

In Step S503, the SGSN initiates a Create PDP Context Request message to the serving GW. The Active PDP Context Request message may contain the address of the PDN GW and the APN information, and may also contain an indication indicating whether the PDN GW is required to register the address thereof with the HSS or not. It should be noted that, the indication is optional.

In Step S504, the serving GW initiates a Create System Architecture Evolution (SAE) Bearer Request to the PDN GW. The Active SAE Bearer Request may contain a registration indicator bit, an APN, and other information.

In Step S504a, the PDN GW requests a PCC rule from a V/H PCRF.

In Step S504b, if the UE establishes a bearer to the PDN GW for the first time, the PDN GW directly registers the address thereof with the HSS. The PDN GW may determine whether to register the address thereof with the HSS or not according to the registration indicator bit provided in the received Create SAE Bearer Request or a parameter configured on the PDN GW.

Step S504a and Step S504b are performed in no particular order.

In Step S505, the PDN GW returns a Create SAE Bearer Response to the serving GW. The Create SAE Bearer Response may contain a parameter indicating that the PDN GW is successfully registered with the HSS.

In Step S506, the serving GW returns a Create PDP Context Response to the SGSN. The Create PDP Context Response may contain a parameter indicating that the PDN GW is successfully registered to the HSS.

In Step S507, the SGSN returns an Active PDP Context Accept message to the UE.

In Step S502, the PDG GW address may also be selected by the serving GW. In this scenario, the create bearer request message initiated by the SGSN to the serving GW only contains the APN or a set of PDN GW addresses or one PDN GW address. The serving GW may select a PDG GW according to some conditions. In addition, a parameter may also be added in Step S504 to indicate that the PDN GW registers the address thereof with the HSS/AAA server.

In the embodiment shown in FIG. 6, if a UE establishes a bearer to a PDN GW in a 3GPP network for the first time, an SGSN registers an address of the PDN GW with an HSS. This embodiment includes local breakout scenarios.

As shown in FIG. 6, the process includes the following steps.

In Step S601, a UE sends an Active PDP Context Request message to an SGSN.

In Step S602, the SGSN selects a related serving GW and PDN GW according to subscription data of the UE and APN information carried in the Active PDP Context Request message.

In Step S603, the SGSN initiates a Create PDP Context Request message to the serving GW. The Create PDP Context Request message may contain an address of the PDN GW and the APN information. The PDN GW may also be selected by the serving GW according to the APN information and other conditions, for example, the SGSN may also provide a set of PDN GW addresses, and the serving GW selects a PDN GW according to conditions such as load and network configuration.

In Step S604, the serving GW initiates a Create SAE Bearer Request to the PDN GW. The Active SAE Bearer Request may contain the APN information or the address of the PDN GW.

In Step S604a, the PDN GW may interact with a PCRF to obtain a PCC rule.

In Step S605, the PDN GW returns a Create SAE Bearer Response to the serving GW.

In Step S606, the serving GW returns a Create PDP Context Response message to the SGSN. The message may contain the address of the PDN GW if the address is selected by the serving GW.

In Step S607, the SGSN may determine whether to register the address of the PDN GW with an HS S or not according to the subscription data of the UE, whether the UE has mobility in non-3GPP networks, or a parameter configured on the SGSN. The address of the PDN GW may be obtained by the SGSN by querying the APN information, or be provided by the serving GW in Step S606.

In Step S608, the SGSN returns an Active PDP Context Accept message to the UE.

In the process shown in FIG. 6, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

In the embodiment shown in FIG. 7, if a UE initiates a service in a 3GPP network to establish a bearer to an external PDN for the first time, an address of a PDN GW is registered with an HSS/AAA server/SPR through a PCC system. This embodiment includes local breakout scenarios.

In Step S701, a UE sends an Active PDP Context Request message to an SGSN.

In Step S702, the SGSN selects a related serving GW and PDN GW according to APN information, and determines whether to trigger a process for registering an address of the PDN GW with an HSS/SPR through a PCC system or not. A condition for the determination may be subscription data of the UE or a parameter configured on the SGSN. In addition, the SGSN may also not perform such a determination process, but directly determines whether to register the address of the PDN GW with the HSS/SPR through the PCC system or not according to a configuration parameter on the PDN GW.

As for the selection of the serving GW and PDN GW, the following should be noted.

A. The SGSN may select a serving GW and a PDN GW according to APN information, a parameter configured on the SGSN, or subscription data of the UE through DNS query, for example, select a serving GW and a PDN GW through two DNS queries. In addition, the SGSN provides information about the address of the PDN GW to the serving GW.

B. The serving GW may select a PDN GW according to a parameter configured on the serving GW or subscription data of the UE through DNS query. For example, the SGSN may provide APN information to the serving GW, and the serving GW queries a DNS system to obtain information about the PDN GW.

C. The HSS directly provides the information about the PDN GW to the SGSN. If the HSS provides a set of IP addresses or FQDNs, a PDN GW may be selected by the SGSN according to information such as an APN, or be selected by the serving GW according to the APN information and a parameter configured on the serving GW.

In Step S703, the SGSN initiates an Active PDP Context Request message to the serving GW. The Active PDP Context Request message contains a parameter for registering the address of the PDN GW with the HSS/SPR, so as to indicate that the address of the PDN GW is registered with the HSS/SPR through the PCC system. Definitely, the parameter is optional. The PDN GW may also be selected by the serving GW according to information such as the APN.

In Step S704, the serving GW initiates an Active SAE Bearer Request to the PDN GW. The Active SAE Bearer Request may contain a registration indicator bit, the APN information, and other parameters. Definitely, the serving GW may also trigger an indication to the PDN GW indicating that the address of the PDN GW is registered with the HS S/AAA server/SPR through the PCC system.

In Step S704a, PCRF interaction is involved. Here, local breakout scenarios are included. When the PDN GW is located in a roaming area, the PDN GW may interact with an H-PCRF through a V-PCRF.

A related AVP may be added into a credit control request (CCR) message interacted between the PDN GW and the PCRF to trigger the PCRF to register the address of the PDN GW with the HSS/SPR.

In Step S704b, the PCRF may initiate a process for obtaining the subscription data of the UE from the HSS/SPR and then register the address of the PDN GW with the HSS/SPR. If the PCRF has the subscription data of the UE, the PCRF only initiates the process for registering the address of the PDN GW with the HSS/SPR.

In Step S705, the PDN GW returns an Active SAE Bearer Response to the serving GW. The response message may contain a parameter identifier indicating a successful registration.

In Step S706, the serving GW returns an Active PDP Context Response to the SGSN. The response message may contain a parameter identifier indicating a successful registration.

In Step S707, the SGSN returns an Active PDP Context Accept message to the UE.

Figure 8:
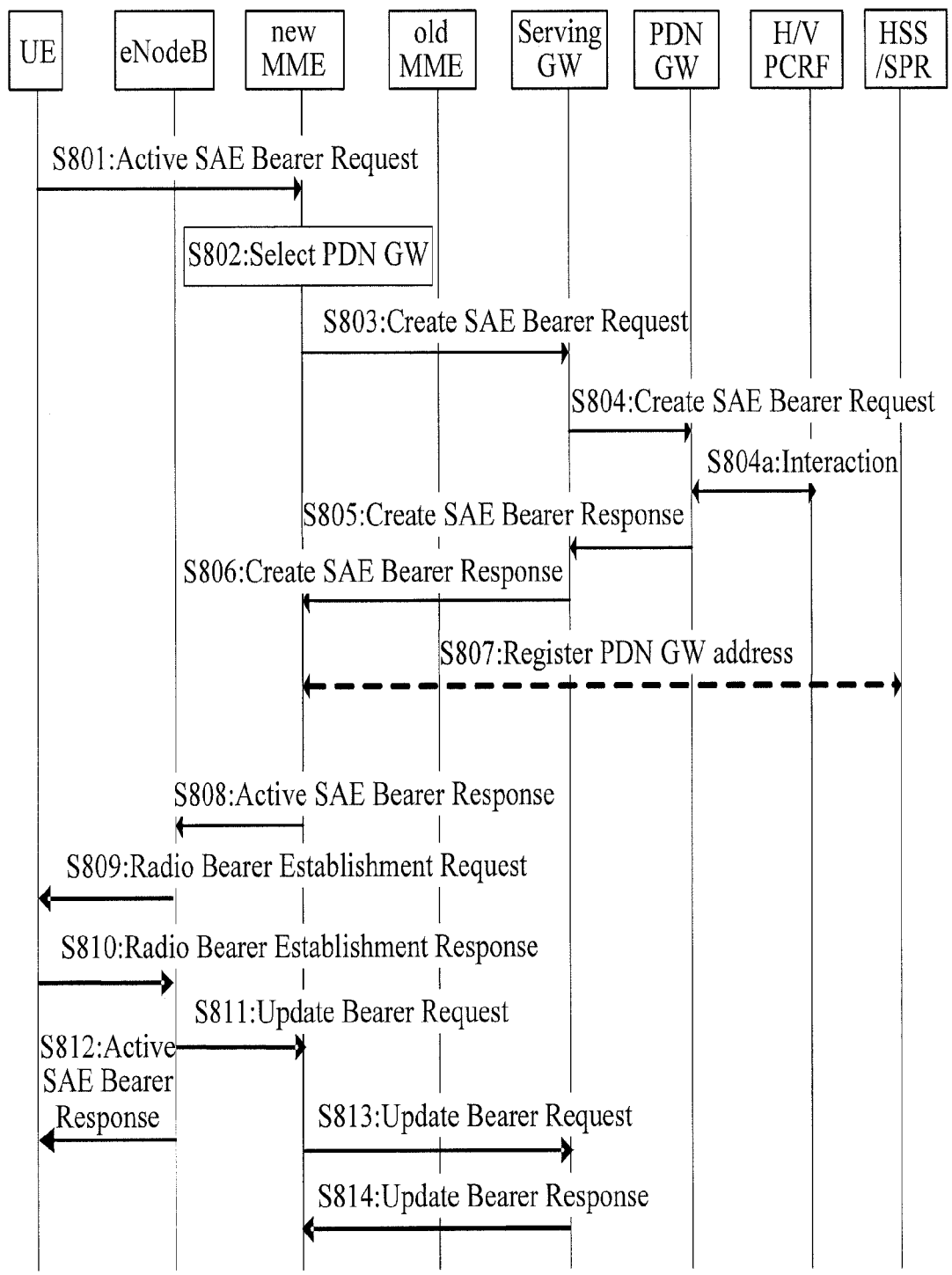
FIG. 8 is a flow chart of the method for storing an address of a network anchor point to a network server according to one embodiment of the present disclosure.
Figure 9:
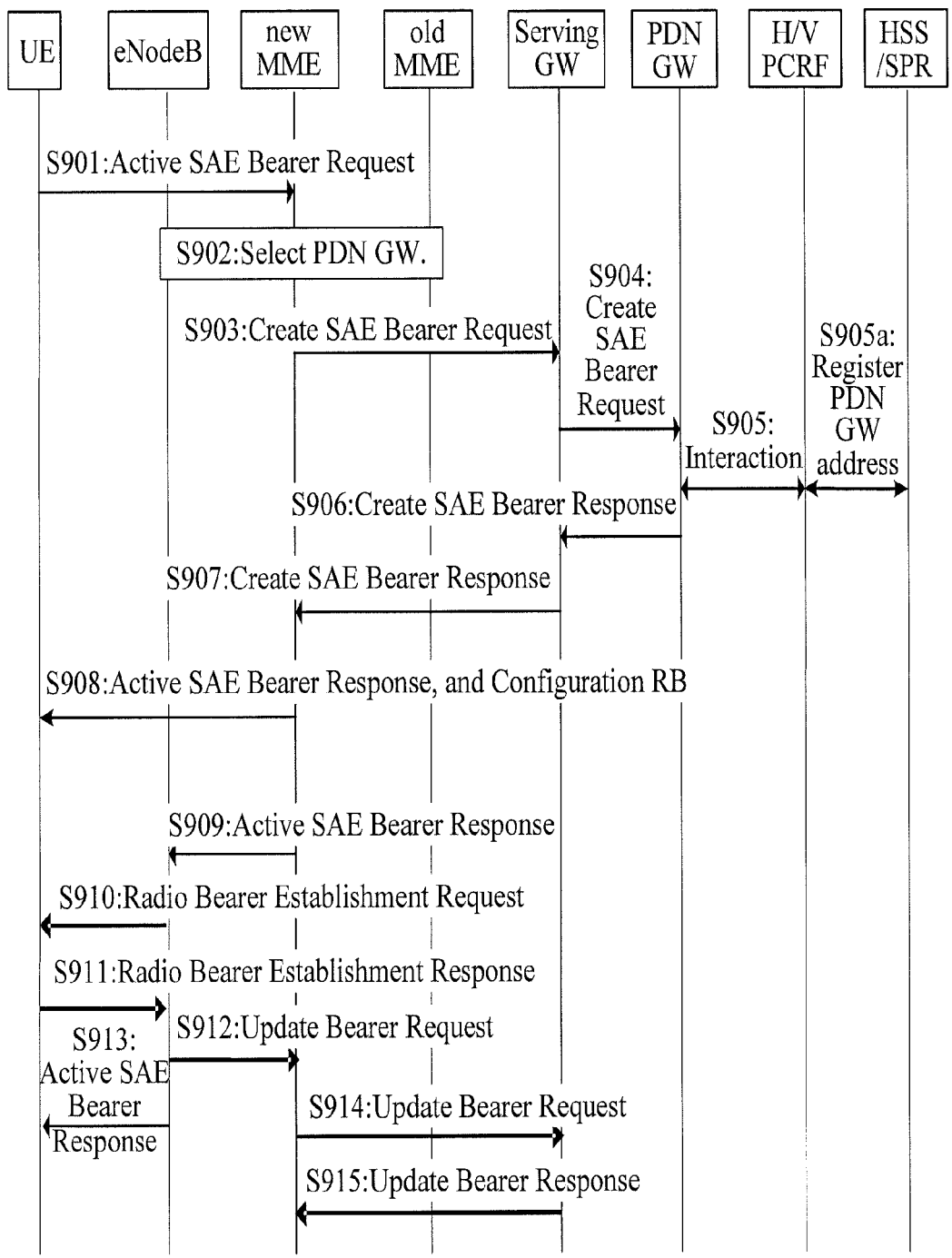
FIG. 9 is a flow chart of an eighth preferred embodiment of the method for storing an address of a network anchor point to a network server according to one embodiment of the present disclosure.
Figure 10:
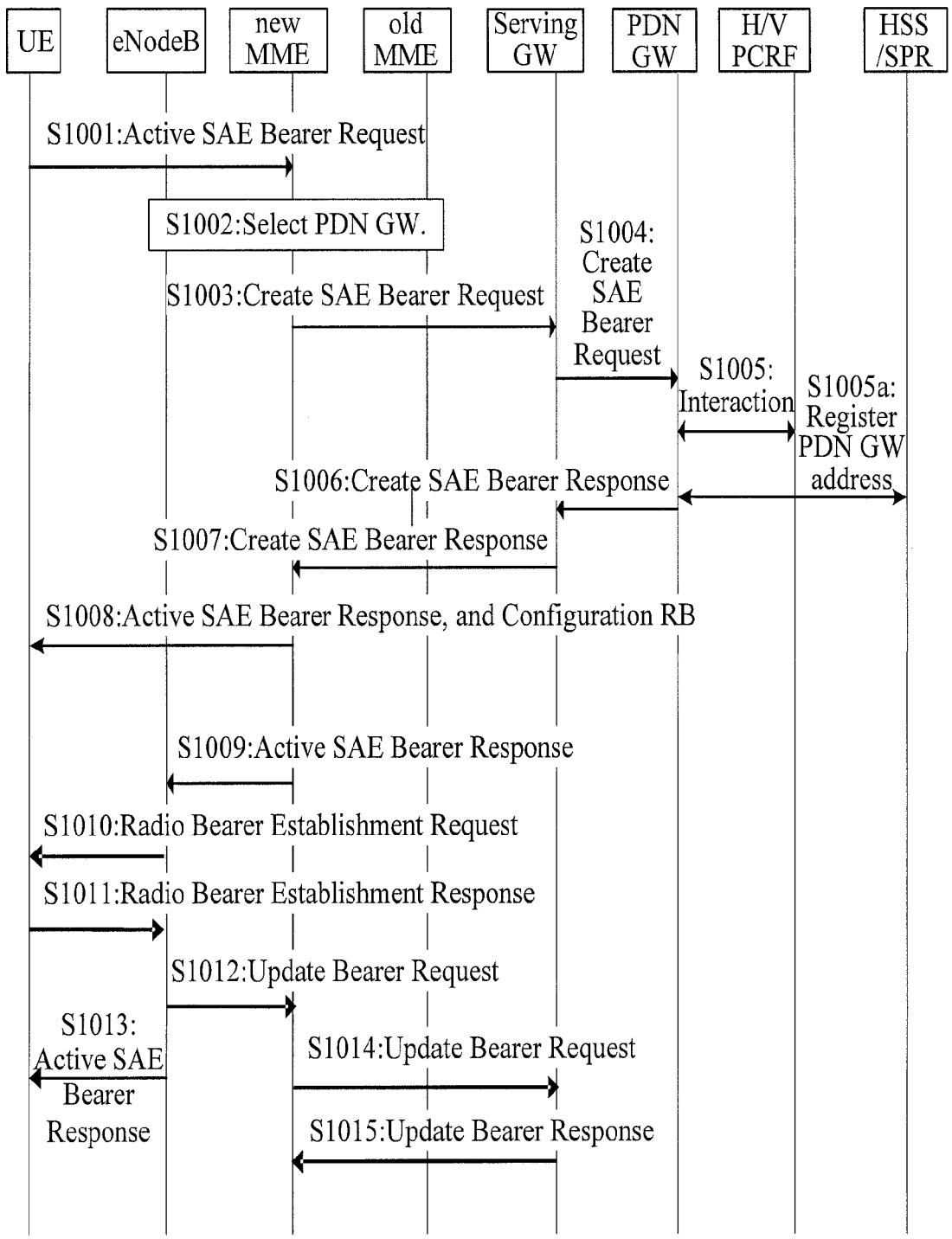
FIG. 10 is a flow chart of the method for storing an address of a network anchor point to a network server according to one embodiment of the present disclosure.

Embodiments shown in FIGS. 8, 9, and 10 respectively describe processes for registering an address of a PDN GW with an HSS/SPR when a terminal initiates a bearer establishment process in an SAE/Long Term Evolution (LTE) access network.

Specifically, in the embodiment shown in FIG. 8, if a UE initiates the establishment of a service from an SAE/LTE network to an external PDN for the first time, an MME registers an address of a PDN GW with an HSS. This embodiment includes local breakout scenarios.

In the process shown in FIG. 8, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

As shown in FIG. 8, the process includes the following steps.

In Step S801, a UE initiates an Active SAE Bearer Request. In Step S802, a new MME selects a PDN GW. Here, multiple PDN scenarios are included.

When selecting the PDN GW, the MME may obtain the PDN GW according to an indication carried by the UE such as APN information, or determine an address of the PDN GW according to a parameter provided by an HSS through the default configuration in the HSS.

In Steps S803-S806, a bearer establishment process at the core network is performed.

In Step S807, the new MME initiates a process for registering the address of the PDN GW with the HSS. In addition, before initiating the registration process, the new MME may determine whether to initiate the registration process or not according to subscription data of the UE, capability of the UE, or a parameter configured on the new MME.

In Step S808, the new MME returns an Active SAE Bearer Response to an eNodeB. The Active SAE Bearer Response may contain a configuration parameter at the related radio side and configuration information of related uplink tunnels. The message contains a parameter for establishing an air interface radio bearer. The eNodeB will establish a related radio bearer according to the provided parameter for establishing a radio bearer.

In Steps S809-S810, a radio bearer establishment process is performed.

In Step S811, the eNodeB initiates an Update Bearer Request to the new MME. The Update Bearer Request may contain information about related downlink tunnels between the eNodeB and the serving GW.

In Step S812, after radio air interface resources are successfully established, the eNodeB returns an Active SAE Bearer Response to the UE.

In Step S813, the new MME initiates an Update Bearer Request to the serving GW. The Update Bearer Request may contain the information about the related downlink tunnels between the eNodeB and the serving GW.

In Step S814, the serving GW returns an Update Bearer Response to the new MME.

The embodiment shown in FIG. 8 may include the following scenario, i.e., after the UE is attached to the SAE/LTE network, the UE initiates a preconfigured bearer establishment process immediately, for example, in scenarios such as a preconfigured VPN.

In addition, the embodiment shown in FIG. 8 may include scenarios where the UE initiates a service in a non-3GPP network, for example, multiple PDN and multiple home agent (HA) scenarios. As such, the MME is equivalent to a control-plane access gateway entity such as an ePDG or an ASN GW; and the entity such as the ePDG or the ASN GW may directly register the address of the PDN GW with the HSS/AAA server/SPR after the bearers are successfully established. If the AAA server and the HSS are separate entities, the registered PDN GW address may be transmitted by the AAA server to the HSS.

In the process shown in FIG. 8, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

In the embodiment shown in FIG. 9, if a UE initiates the establishment of a service from an SAE/LTE access network to an external PDN for the first time, an address of a PDN GW is registered with an HSS through a PCC system. This embodiment includes local breakout scenarios.

As shown in FIG. 9, the process includes the following steps.

In Step S901, a UE initiates an Active SAE Bearer Request.

In Step S902, a new MME selects a PDN GW.

In Step S903, the new MME initiates a Create SAE Bearer Request to a serving GW. The Active SAE Bearer Request may contain an address of the selected PDN GW.

In Step S904, the serving GW initiates a Create SAE Bearer Request to the PDN GW. The Active SAE Bearer Request may contain an address of the selected PDN GW.

In Step S905, the PDN GW may interact with a PCRF to obtain a default PCC rule set for the UE. When the PDN GW is located in a roaming area, the PDN GW will interact with an H-PCRF through a V-PCRF.

In Step S905a, the PCRF may initiate a process for obtaining subscription data of the UE from the HSS/SPR and then register the PDN GW address with the HSS/AAA server/SPR. In addition, if the PCRF has the subscription data of the UE, the PCRF may only initiate the process for registering the PDN GW address with the HSS/SPR.

In Step S906, the PDN GW returns an Active SAE Bearer Response to the serving GW. The Active SAE Bearer Response may contain QoS information.

In Step S907, the serving GW returns an Active SAE Bearer Response to the new MME. The Active SAE Bearer Response may contain QoS information.

In Step S908, the new MME returns an Active SAE Bearer Response to the UE, and performs a radio bearer configuration (configuration RB) process.

In Step S909, the new MME returns an Active SAE Bearer Response to an eNodeB.

In Step S910, the eNodeB initiates a Radio Bearer Establishment Request to the UE.

In Step S911, the UE returns a Radio Bearer Establishment Response to the eNodeB.

In Step S912, the eNodeB initiates an Update Bearer Request to the new MME.

In Step S913, the eNodeB returns an Active SAE Bearer Response to the UE.

In Step S914, the new MME initiates an Update Bearer Request to the serving GW.

In Step S915, the serving GW returns an Update Bearer Response to the new MME.

The embodiment shown in FIG. 9 may include scenarios where the UE initiates a service in a non-3GPP network, for example, multiple PDN and multiple HA scenarios. As such, the MME is equivalent to a control-plane access gateway entity such as an ePDG or an ASN GW; and the PDN GW may register the address of the PDN GW with the HSS/AAA server/SPR through the PCC system after the bearers are successfully established. If the AAA server and the HSS are separate entities, the registered PDN GW address may be transmitted by the AAA server to the HSS.

In the process shown in FIG. 9, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

It should also be noted that, the entity and conditions for triggering the PCRF to register the PDN GW address with the HSS/SPR when the PDN GW interacts with the PCRF have been mentioned in the foregoing embodiments, so the details will not be described herein again.

In the embodiment shown in FIG. 10, if a UE initiates the establishment of a service from an SAE/LTE access network to an external PDN for the first time, a PDN GW directly registers an address thereof with an HSS. This embodiment includes local breakout scenarios.

In Step S1001, a UE initiates an Active SAE Bearer Request.

In Step S1002, a new MME selects a PDN GW.

In Step S1003, the new MME initiates an Active SAE Bearer Request to a serving GW. The Active SAE Bearer Request may contain an address of the selected PDN GW.

In Step S1004, the serving GW initiates an Active SAE Bearer Request to the PDN GW. The Active SAE Bearer Request may contain an address of the selected PDN GW.

In Step S1005, the PDN GW may interact with a PCRF to obtain a default PCC rule set for the UE.

In Step S1005a, if the UE establishes a bearer to the PDN GW for the first time, the PDN GW directly registers the address thereof with the HSS/SPR.

In Step S1006, the PDN GW returns an Active SAE Bearer Response to the serving GW. The Active SAE Bearer Response may contain QoS information.

In Step S1007, the serving GW returns an Active SAE Bearer Response to the new MME. The Active SAE Bearer Response may contain QoS information.

In Step S1008, the new MME returns an Active SAE Bearer Response to the UE, and performs a radio bearer configuration process.

In Step S1009, the new MME returns an Active SAE Bearer Response to an eNodeB.

In Step S1010, the eNodeB initiates a Radio Bearer Establishment Request to the UE.

In Step S1011, the UE returns a Radio Bearer Establishment Response to the eNodeB.

In Step S1012, the eNodeB initiates an Update Bearer Request to the new MME.

In Step S1013, the eNodeB returns an Active SAE Bearer Response to the UE.

In Step S1014, the new MME initiates an Update Bearer Request to the serving GW.

In Step S1015, the serving GW returns an Update Bearer Response to the new MME.

The embodiment shown in FIG. 10 may include scenarios where the UE initiates a service in a non-3GPP network, for example, multiple PDN and multiple HA scenarios. As such, the MME is equivalent to a control-plane access gateway entity such as an ePDG or an ASN GW; and the PDN GW may directly register the address thereof with the HSS/AAA server/SPR after the bearers are successfully established. If the AAA server and the HSS are separate entities, the registered PDN GW address may be transmitted by the AAA server to the HSS.

It should also be noted that, the entity and conditions for triggering the PCRF to register the PDN GW address with the HSS/SPR when the PDN GW interacts with the PCRF have been mentioned in the foregoing embodiments, so the details will not be described herein again.

In the process shown in FIG. 10, when the PDN GW address is registered with the HSS/SPR, if the network supports multiple PDNs or a PDN GW is connected to multiple PDNs, APN information also needs to be registered with the HSS/SPR together with the PDN GW. The HSS needs to store a corresponding relation between the APN and the PDN GW.

As some of the above embodiments are applicable to a communication system, the present disclosure further provides embodiments of the communication system.

Consistent with an embodiment, the present disclosure provides a communication system. The communication system includes a bearer context assignment entity and an address registration entity. The bearer context assignment entity is configured to enable a network anchor point to assign a first bearer context to a terminal. The address registration entity is configured to register an address of the network anchor point with a network server.

Consistent with an embodiment, the present disclosure provides a communication system. The communication system includes a connection establishment entity and an address registration entity. The connection establishment entity is configured to establish a first connection between a network anchor point and a terminal. The address registration entity is configured to register an address of the network anchor point with a network server.

In the communication system according to the above embodiments, the address registration entity is further configured to register an APN corresponding to the network anchor point with the network server when an access network supports a plurality of PDNs or the network anchor point corresponds to a plurality of PDNs.

The address registration entity is an MME, or an SGSN, or an access network entity, or the network anchor point, or an entity in a PCC system.

As for the process for storing an address of a network anchor point to a network server by using the communication system, reference may be made to the descriptions in the above method embodiments.

In actual applications, a current service of the terminal may need to be terminated. Accordingly, an address of a PDN GW stored in an HSS may also be deleted. Therefore, the present disclosure further provides a method for deleting an address of a network anchor point from a network server.

In order to enable those skilled in the art to easily delete an address of a network anchor point from a network server, several embodiments are introduced below with reference to the accompanying drawings.

Figure 11:
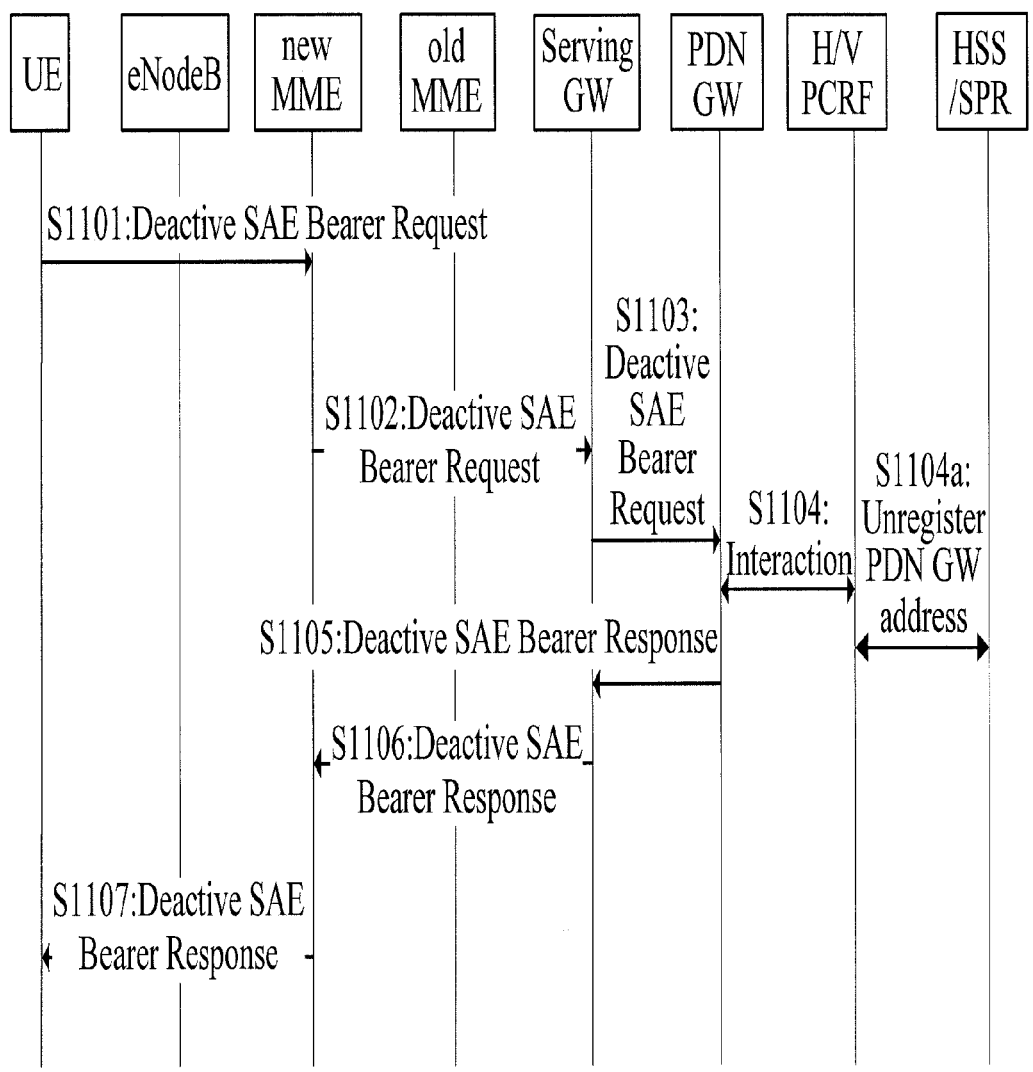
FIG. 11 is a flow chart of a method for deleting an address of a network anchor point from a network server according to one embodiment of the present disclosure.
Figure 12:
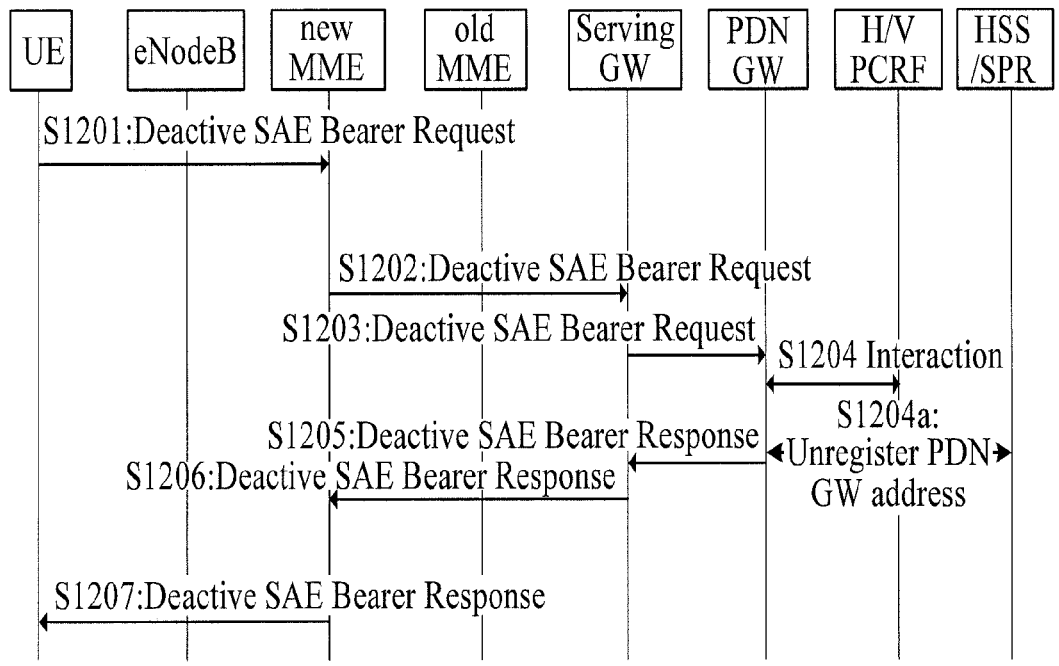
FIG. 12 is a flow chart of the method for deleting an address of a network anchor point from a network server according to one embodiment of the present disclosure.
Figure 13:
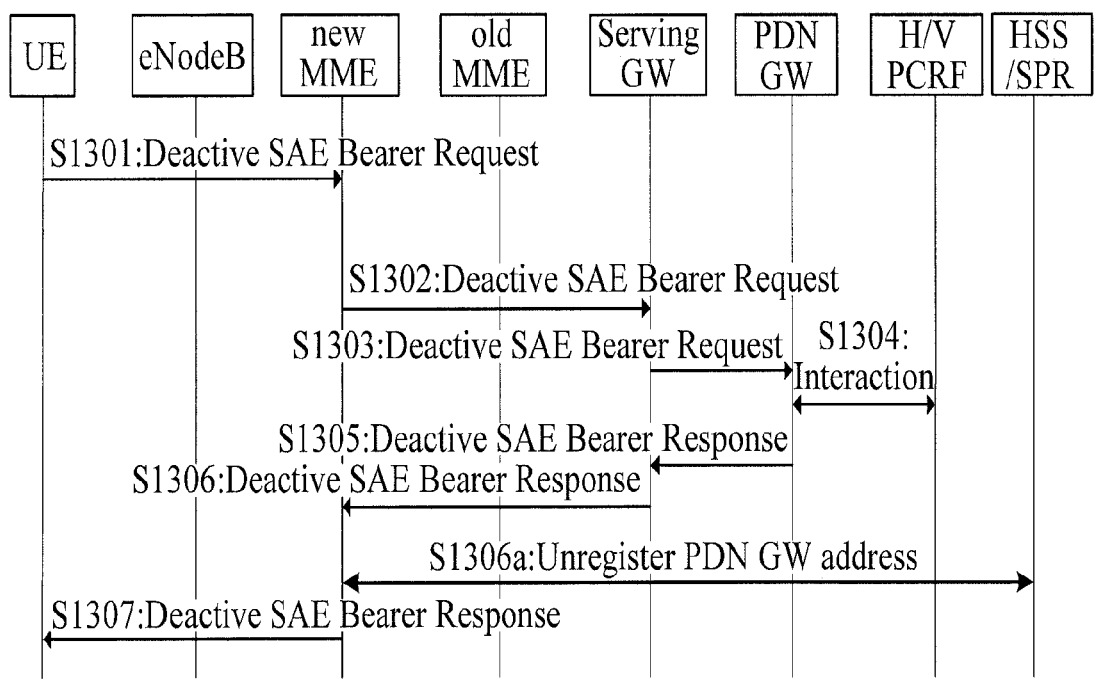
FIG. 13 is a flow chart of the method for deleting an address of a network anchor point from a network server according to one embodiment of the present disclosure.

Embodiments as shown in FIGS. 11, 12, and 13 respectively describe processes for deleting an address of a PDN GW from an HSS when a terminal initiates a bearer deletion process in an SAE/LTE access network.

Specifically, in the embodiment shown in FIG. 11, when all bearers related to a UE on a PDN GW are released, a PCC system deletes an address of the PDN GW stored in an HSS/SPR.

As shown in FIG. 11, the process includes the following steps.

In Step S1101, a UE initiates a Deactive SAE Bearer Request.

In Step S1102, a new MME initiates the Deactive SAE Bearer Request to a serving GW. The Deactive SAE Bearer Request may contain information indicating the PDN GW that the address of the PDN GW in the HSS/SPR is deregistered through a PCC system.

In Step S1103, the serving GW initiates a Deactive SAE Bearer Request to the PDN GW. The Deactive SAE Bearer Request may contain information indicating the PDN GW that the address of the PDN GW in the HSS/SPR is deregistered through the PCC system. The message that triggers the deregistration of the PDN GW may be provided by the MME or the serving GW, and the PDN GW may also determine to initiate the process for deregistering the PDN GW address through the PCC system according to network configuration.

In Step S1104, the PDN GW interacts with a PCRF to release related binding information.

In Step S1104a, the PCRF deregisters the PDN GW address stored in the HSS/SPR (deregister PDN GW to HSS). Before the deregistration, the PDN GW may determine whether the PDN GW address stored in the HSS/SPR needs to be deregistered through the PCC system or not according to the received indication information or according to a parameter configured on the PDN GW. If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

In Step S1105, the PDN GW returns a Deactive SAE Bearer Response to the serving GW. If the Deactive SAE Bearer Request in Step S1102 contains an indication, the Deactive SAE Bearer Response may also contain a successful deregistration indication.

In Step S1106, the serving GW returns a Deactive SAE Bearer Response to the new MME. The message may contain a successful deregistration indication.

In Step S1107, the new MME returns a Deactive SAE Bearer Response to the UE.

The embodiment shown in FIG. 11 may include scenarios where the UE terminates a service in a non-3GPP network, for example, multiple PDN and multiple HA scenarios. When all services related to the UE on the PDN GW are terminated, the PDN GW may deregister the PDN GW address from the HSS/AAA server/SPR through the PCC system. If the AAA server and the HSS are separate entities, the deregistration parameter or information may be transmitted by the AAA server to the HSS.

In the embodiment shown in FIG. 12, when all bearers related to a UE on a PDN GW are released, the PDN GW directly deletes an address thereof stored in an HSS/SPR.

As shown in FIG. 12, the process includes the following steps.

In Step S1201, a UE initiates a Deactive SAE Bearer Request.

In Step S1202, a new MME initiates a Deactive SAE Bearer Request to a serving GW. The Deactive SAE Bearer Request may contain information indicating that the PDN GW directly deregisters the address thereof in the HSS/SPR.

In Step S1203, the serving GW initiates a Deactive SAE Bearer Request to the PDN GW. The Deactive SAE Bearer Request may contain information indicating that the PDN GW directly deregisters the address thereof in the HSS/SPR. The message that triggers the deregistration of the PDN GW may be provided by the MME or the serving GW, and the PDN GW may also determine to initiate the process for deregistering the address from the HSS/AAA server according to network configuration.

In Step S1204, the PDN GW interacts with a PCRF to release related binding information. This step is optional, and includes local breakout scenarios, that is, the PDN GW interacts with an H-PCRF through a V-PCRF.

In Step S1204a, the PDN GW directly deregisters the address thereof in the HSS/SPR (deregister PDN GW to HSS). Before the deregistration, the PDN GW may determine whether to directly deregister the address thereof in the HSS/SPR or not according to the received indication information or a parameter configured on the PDN GW.

In Step S1205, the PDN GW returns a Deactive SAE Bearer Response to the serving GW. If the Deactive SAE Bearer Request in Step S1202 contains an indication, the Deactive SAE Bearer Response may also contain a successful deregistration indication.

In Step S1206, the serving GW returns a Deactive SAE Bearer Response to the new MME. The message may contain a successful deregistration indication.

In Step S1207, the new MME returns a Deactive SAE Bearer Response to the UE.

The embodiment shown in FIG. 12 may include scenarios where the UE terminates a service in a non-3GPP network, for example, multiple PDN and multiple HA scenarios. When all services related to the UE on the PDN GW are terminated, the PDN GW may directly deregister the address thereof from the HSS/AAA server/SPR. If the AAA server and the HSS are separate entities, the deregistration parameter or information may be transmitted by the AAA server to the HSS.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

In the embodiment shown in FIG. 13, when all bearers related to a UE on a PDN GW are released, an MME deletes an address of the PDN GW stored in an HSS/SPR.

As shown in FIG. 13, the process includes the following steps.

In Step S1301, a UE initiates a Deactive SAE Bearer Request.

In Step S1302, a new MME initiates a Deactive SAE Bearer Request to a serving GW.

In Step S1303, the serving GW initiates a Deactive SAE Bearer Request to the PDN GW.

In Step S1304, the PDN GW interacts with a PCRF to release related binding information. This step is optional, and includes local breakout scenarios, that is, the PDN GW interacts with an H-PCRF through a V-PCRF.

In Step S1305, the PDN GW returns a Deactive SAE Bearer Response to the serving GW.

In Step S1306, the serving GW returns a Deactive SAE Bearer Response to the new MME.

In Step S1306a, the new MME deregisters the PDN GW address in the HSS/SPR. Before the deregistration, the new MME may determine whether to deregister the PDN GW address in the HSS/SPR or not according to subscription data of the UE or a parameter configured on the new MME.

In Step S1307, the new MME returns a Deactive SAE Bearer Response to the UE.

The embodiment shown in FIG. 13 may include scenarios where the UE terminates a service in a non-3GPP network, for example, multiple PDN and multiple HA scenarios. When all services related to the UE on the PDN GW are terminated, an entity such as an ePDG or an ASN GW that is equivalent to the MME may deregister the PDN GW address from HSS/AAA server/SPR. If the AAA server and the HSS are separate entities, the deregistration parameter or information may be transmitted by the AAA server to the HSS.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

Figure 14:
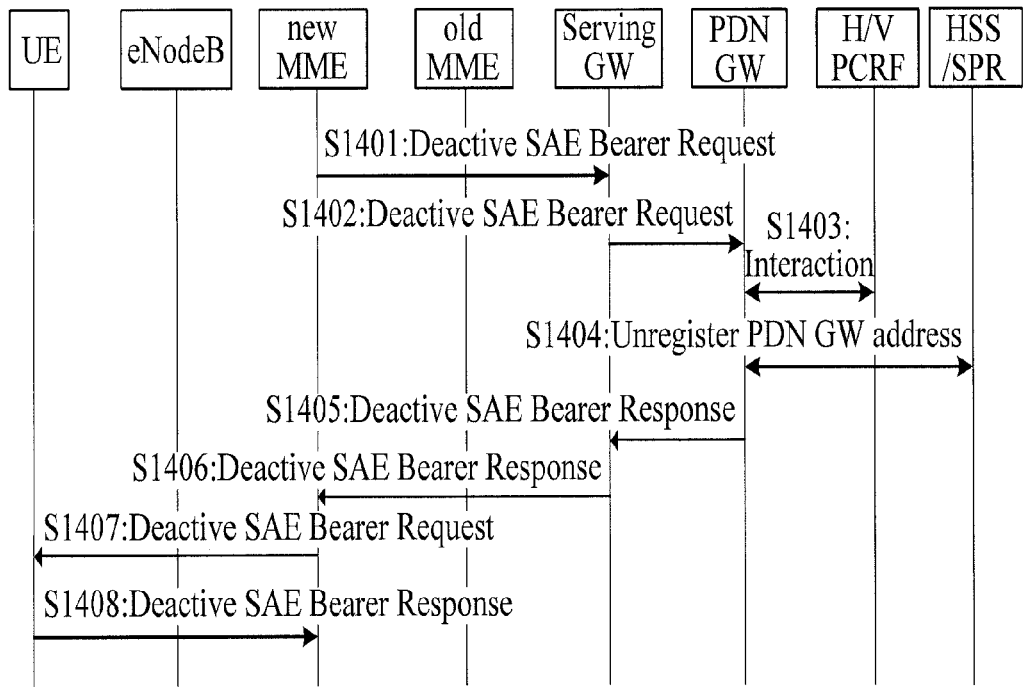
FIG. 14 is a flow chart of the method for deleting an address of a network anchor point from a network server according to one embodiment of the present disclosure.
Figure 15:
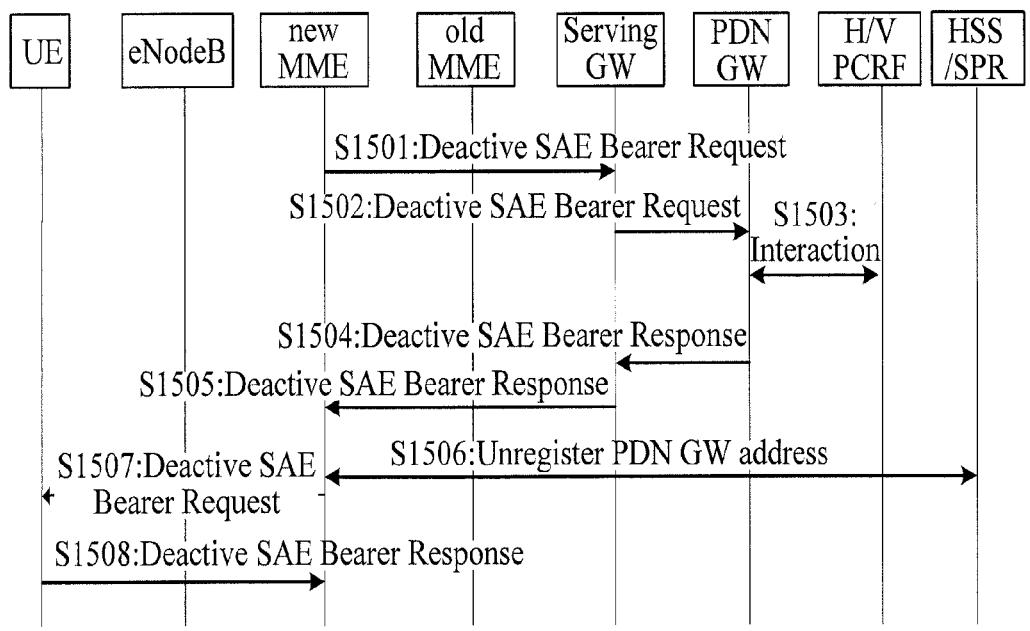
FIG. 15 is a flow chart of the method for deleting an address of a network anchor point from a network server according to one embodiment of the present disclosure.
Figure 16:
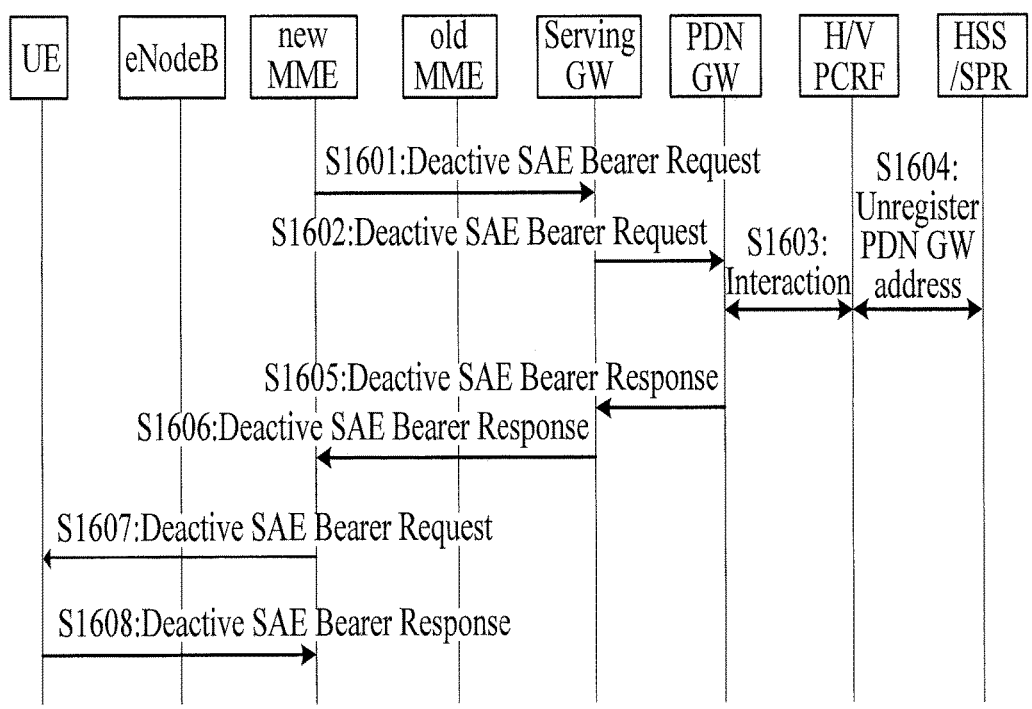
FIG. 16 is a flow chart of the method for deleting an address of a network anchor point from a network server according to one embodiment of the present disclosure.

Embodiments shown in FIGS. 14, 15, and 16 respectively describe processes for deleting an address of a PDN GW from an HSS when an MME initiates a bearer deletion process.

Specifically, in the embodiment shown in FIG. 14, when all bearers related to a UE on a PDN GW are released, the PDN GW directly deletes an address thereof stored in an HSS/SPR.

As shown in FIG. 14, the process includes the following steps.

In Step S1401, a new MME initiates a Deactive SAE Bearer Request to a serving GW. The Deactive SAE Bearer Request may contain information indicating that a PDN GW deregisters a PDN GW address in an HSS. The new MME may determine whether to send the indication to the serving GW or not according to subscription data of the UE or a parameter configured on the new MME.

In Step S1402, the serving GW initiates a Deactive SAE Bearer Request to the PDN GW.

In Step S1403, the PDN GW interacts with a PCRF to release related binding information. This step is optional, and includes local breakout scenarios, that is, the PDN GW interacts with an H-PCRF through a V-PCRF.

In Step S1404, the PDN GW directly deregisters the address thereof stored in the HSS/SPR. Before the deregistration, the PDN GW may determine whether to deregister the address thereof stored in the HSS/SPR or not according to the received indication information or a parameter configured on the PDN GW. The message that triggers the deregistration of the PDN GW may be provided by the MME or the serving GW, and the PDN GW may also determine to initiate the process for deregistering the address from the HSS/AAA server according to network configuration.

In Step S1405, the PDN GW returns a Deactive SAE Bearer Response to the serving GW. If the Deactive SAE Bearer Request in Step S1401 contains an explicit indication, the Deactive SAE Bearer Response may also contain a successful deregistration indication.

In Step S1406, the serving GW returns a Deactive SAE Bearer Response to the new MME. The message may contain a successful deregistration indication.

In Step S1407, the new MME initiates a Deactive SAE Bearer Request to the UE. In addition, the new MME may also indicate an eNodeB to release a related radio bearer. Definitely, the indication may also be sent after Step S1401.

In Step S1408, the UE returns a Deactive SAE Bearer Response to the new MME.

The embodiment shown in FIG. 14 may include scenarios where the UE terminates a service in a non-3GPP network, for example, multiple PDN and multiple HA scenarios, and may also include scenarios where an entity such as an ePDG or an ASN GW initiates a bearer deletion process. When all services related to the UE on the PDN GW are terminated, the PDN GW may directly deregister the address thereof from the HSS/AAA server/SPR. If the AAA server and the HSS are separate entities, the deregistration parameter or information needs to be transmitted by the AAA server to the HSS.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

In the embodiment shown in FIG. 15, when all bearers related to a UE on a PDN GW are released, an MME deletes an address of the PDN GW stored in an HSS/AAA server/SPR.

As shown in FIG. 15, the process includes the following steps.

In Step S1501, a new MME initiates a Deactive SAE Bearer Request to a serving GW.

In Step S1502, the serving GW initiates a Deactive SAE Bearer Request to a PDN GW.

In Step S1503, the PDN GW interacts with a PCRF to release related binding information. This step is optional, and includes local breakout scenarios, that is, the PDN GW interacts with an H-PCRF through a V-PCRF.

In Step S1504, the PDN GW returns a Deactive SAE Bearer Response to the serving GW.

In Step S1505, the serving GW returns the Deactive SAE Bearer Response to the new MME.

In Step S1506, the new MME deregisters the PDN GW address in the HSS/SPR. Before the deregistration, the new MME may determine whether to deregister the PDN GW address from the HSS/SPR or not according to subscription data of the UE or a parameter configured on the new MME.

In Step S1507, the new MME initiates a Deactive SAE Bearer Request to the UE. In addition, the new MME may also indicate an eNodeB to release a related radio bearer. Definitely, the indication may also be sent after Step S1501.

In Step S1508, the UE returns a Deactive SAE Bearer Response to the new MME.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

The embodiment shown in FIG. 15 may include scenarios where the UE terminates a service in a non-3GPP network, for example, multiple PDN and multiple HA scenarios, and may also include scenarios where an entity such as an ePDG or an ASN GW initiates a bearer deletion process. When all services related to the UE on the PDN GW are terminated, the entity such as the ePDG or the ASN GW that is equivalent to the MME may deregister the PDN GW address from the HSS/AAA server/SPR. If the AAA server and the HSS are separate entities, the deregistration parameter or information needs to be transmitted by the AAA server to the HSS.

On the contrary, when the PDN GW address is registered with the HSS/AAA server, if the AAA server and the HSS are separate entities, the PDN GW address needs to be transmitted by the AAA server to the HSS.

In the embodiment shown in FIG. 16, when all bearers related to a UE on a PDN GW are released, a PCC system deletes an address of the PDN GW stored in an HSS/SPR.

As shown in FIG. 16, the process includes the following steps.

In Step S1601, a new MME initiates a Deactive SAE Bearer Request to a serving GW. The Deactive SAE Bearer Request may contain information indicating that a PDN GW deregisters a PDN GW address in an HSS/SPR by interacting with a PCC system. The new MME may also determine whether to send the indication to the serving GW according to subscription data of the UE or a parameter configured on the new MME.

In Step S1602, the serving GW initiates a Deactive SAE Bearer Request to the PDN GW.

In Step S1603, the PDN GW interacts with the PCRF to release related binding information. This step is optional, and includes local breakout scenarios, that is, the PDN GW interacts with an H-PCRF through a V-PCRF. In addition, the PDN GW may also determine whether to trigger the PCC system to deregister the PDN GW address in the HSS/SPR or not according to the received indication information or a parameter configured on the PDN GW.

In Step S1604, the PCRF interacts with the HSS/SPR to deregister the PDN GW address in the HSS/SPR.

In Step S1605, the PDN GW returns a Deactive SAE Bearer Response to the serving GW. If the Deactive SAE Bearer Request in Step S1601 contains an explicit indication, the Deactive SAE Bearer Response may also contain a successful deregistration indication.

In Step S1606, the serving GW returns a Deactive SAE Bearer Response to the new MME.

In Step S1607, the new MME initiates a Deactive SAE Bearer Request to the UE. In addition, the new MME may also indicate an eNodeB to release a related radio bearer. Definitely, the indication may also be sent after Step S1601.

In Step S1608, the UE returns a Deactive SAE Bearer Response to the new MME.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

The embodiment shown in FIG. 16 may include scenarios where the UE terminates a service in a non-3GPP network, for example, multiple PDN and multiple HA scenarios, and may also include scenarios where an entity such as an ePDG or an ASN GW initiates a bearer deletion process. When all services related to the UE on the PDN GW are terminated, the PDN GW may deregister the PDN GW address from the HSS/AAA server/SPR via the PCC. If the AAA server and the HSS are separate entities, the deregistration parameter or information needs to be transmitted by the AAA server to the HSS.

The entity and conditions for triggering the deregistration of the PDN GW address from the HSS/AAA server/SPR have been described in the foregoing embodiments, so the details will not be described herein again.

Figure 17:
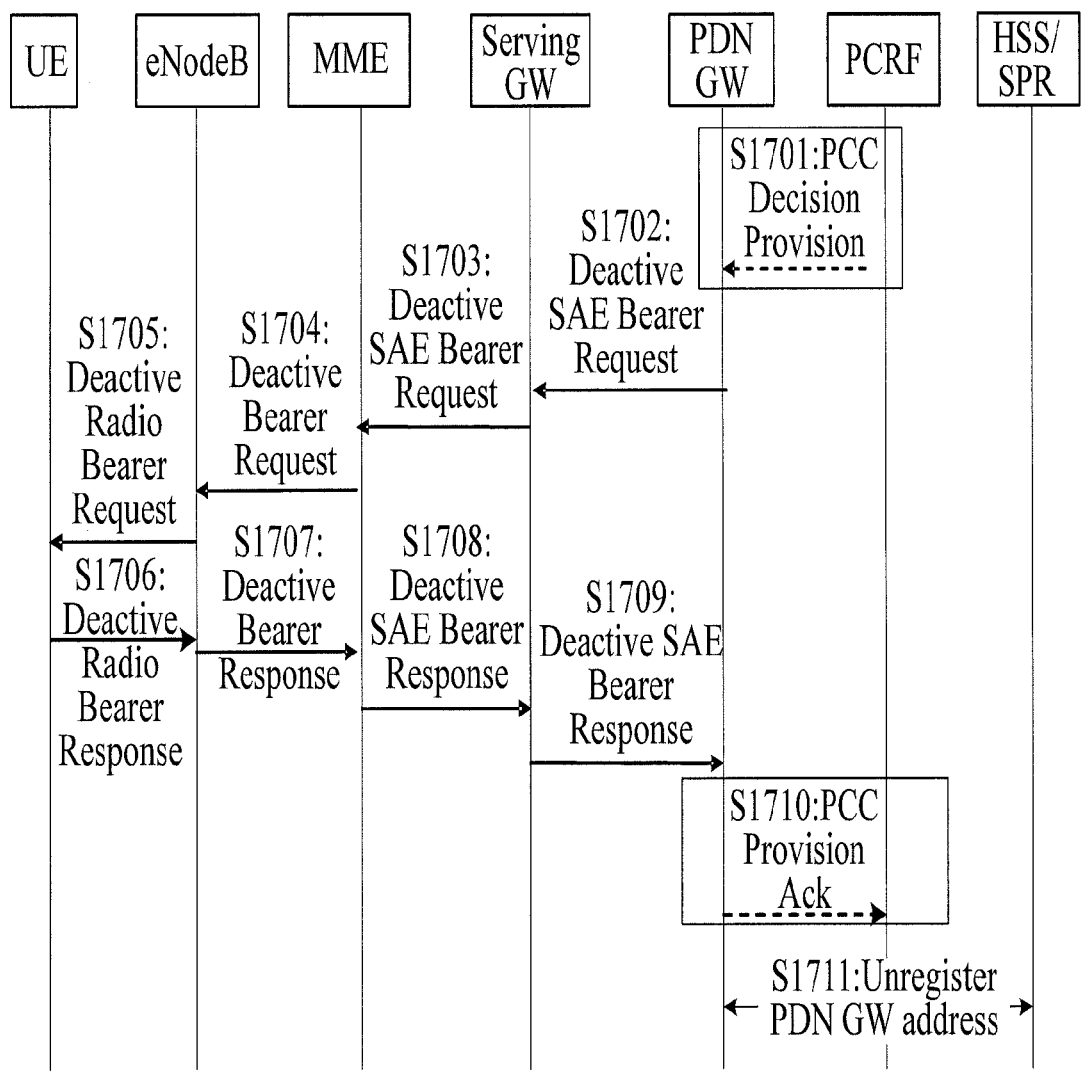
FIG. 17 is a flow chart of the method for deleting an address of a network anchor point from a network server according to one embodiment of the present disclosure.
Figure 18:
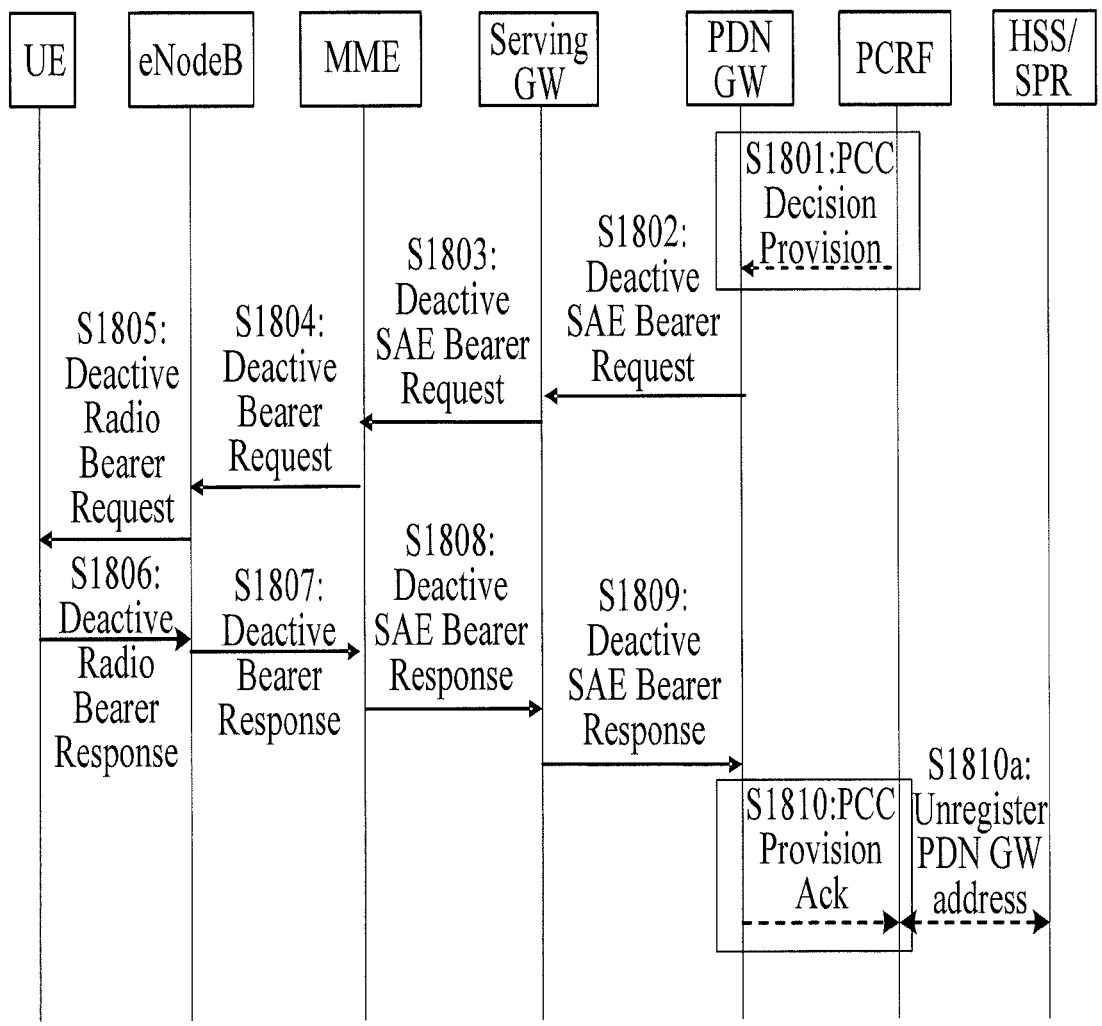
FIG. 18 is a flow chart of the method for deleting an address of a network anchor point from a network server according to one embodiment of the present disclosure.
Figure 19:
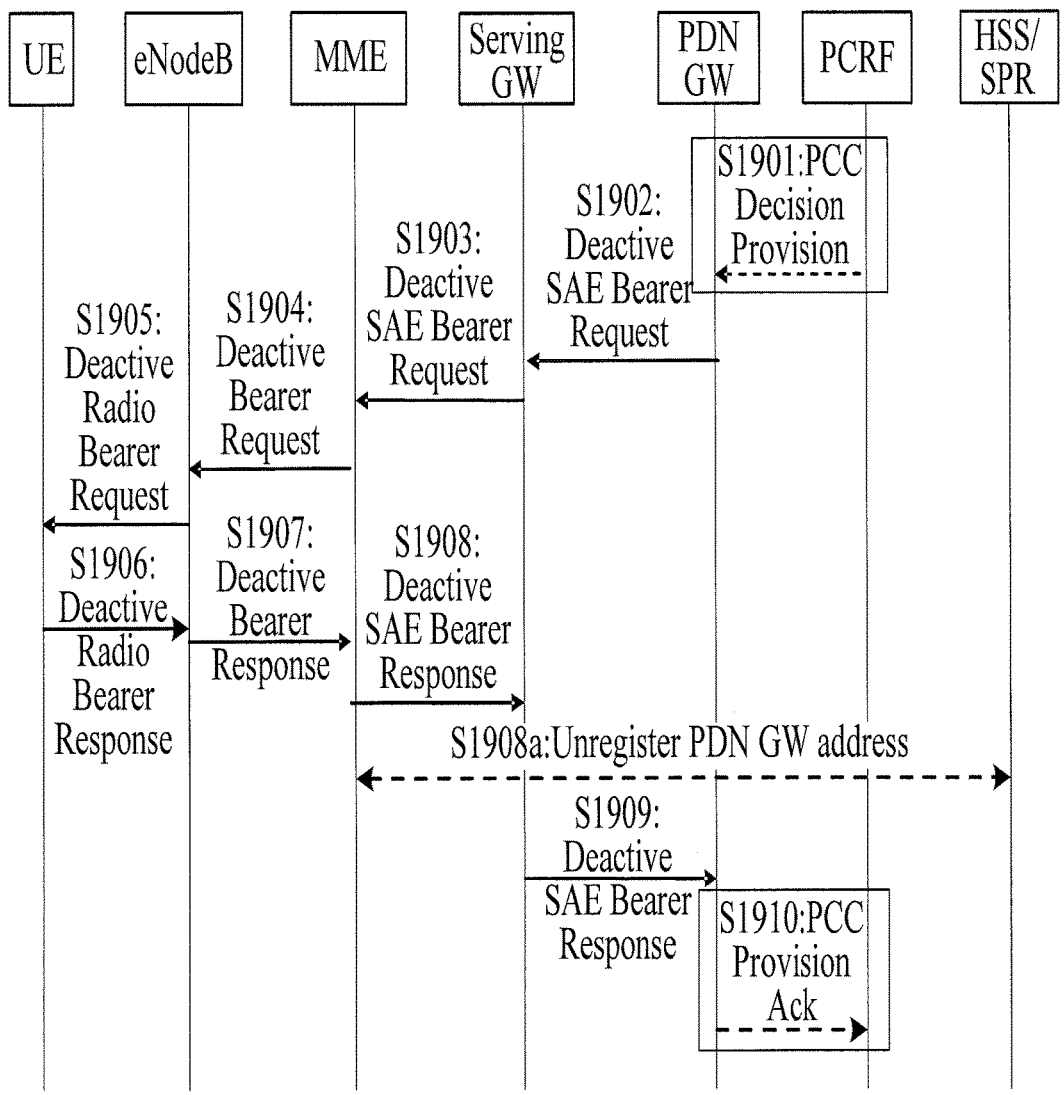
FIG. 19 is a flow chart of the method for deleting an address of a network anchor point from a network server according to one embodiment of the present disclosure.

Embodiments shown in FIGS. 17, 18, and 19 respectively describe processes for deleting an address of a PDN GW from an HSS when a network initiates a bearer deletion process in an SAE/LTE access network.

Specifically, in the embodiment shown in FIG. 17, when all bearers related to a UE on a PDN GW are released, the PDN GW directly deletes an address thereof stored in an HSS/SPR.

As shown in FIG. 17, the process includes the following steps.

In Step S1701, a PCRF provides a PCC decision to a PDN GW (PCC Decision Provision).

In Step S1702, the PDN GW triggers a bearer deletion process according to the received PCC decision. In this step, the PDN GW initiates a Deactive SAE Bearer Request to a serving GW.

In Step S1703, the serving GW initiates a Deactive SAE Bearer Request to an MME.

In Step S1704, the MME initiates a Deactive Bearer Request to an eNodeB.

In Step S1705, the eNodeB initiates a Deactive Radio Bearer Request to a UE.

In Step S1706, the UE removes a related uplink data stream template, and returns a Deactive Radio Bearer Response to the eNodeB.

In Step S1707, the eNodeB returns a Deactive Bearer Response to the MME.

In Step S1708, the MME returns a Deactive SAE Bearer Response to the serving GW.

In Step S1709, the serving GW returns a Deactive SAE Bearer Response to the PDN GW.

In Step S1710, the PDN GW returns a PCC Provision Ack to the PCRF.

In Step S1711, the PDN GW directly deregisters an address thereof stored in an HSS/SPR. Before the deregistration, the PDN GW may determine whether to deregister the address thereof from the HSS or not according to subscription data of the UE or a parameter configured on the PDN GW. In addition, the PDN GW may also determine whether to deregister the address thereof from the HSS or not according to a request or an indication of the MME. As such, the MME may determine whether the PDN GW needs to deregister the address thereof from the HSS or not according to the subscription data of the UE or a parameter configured on the MME.

In addition, the serving GW may also provide an indication, and the PDN GW deregisters address information of the PDN GW from the HS S/AAA server according to the indication provided by the serving GW.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

The embodiment shown in FIG. 17 may include scenarios where the UE terminates a service in a non-3GPP network, for example, multiple PDN and multiple HA scenarios, and may also include scenarios where the PDN GW initiates a bearer deletion process. When all services related to the UE on the PDN GW are terminated, the PDN GW may directly deregister the address thereof from the HSS/AAA server/SPR. If the AAA server and the HSS are separate entities, the deregistration parameter or information needs to be transmitted by the AAA server to the HSS.

In the embodiment shown in FIG. 18, when all bearers related to a UE on a PDN GW are released, a PCC system deletes an address of the PDN GW stored in an HSS/SPR.

As shown in FIG. 18, the process includes the following steps.

In Step S1801, a PCRF provides a PCC decision to a PDN GW.

In Step S1802, the PDN GW triggers a bearer deletion process according to the received PCC decision. In this step, the PDN GW initiates a Deactive SAE Bearer Request to a serving GW.

In Step S1803, the serving GW initiates a Deactive SAE Bearer Request to an MME.

In Step S1804, the MME initiates a Deactive Bearer Request to an eNodeB.

In Step S1805, the eNodeB initiates a Deactive Radio Bearer Request to a UE.

In Step S1806, the UE removes a related uplink data stream template, and returns a Deactive Radio Bearer Response to the eNodeB.

In Step S1807, the eNodeB returns a Deactive Bearer Response to the MME.

In Step S1808, the MME returns a Deactive SAE Bearer Response to the serving GW.

In Step S1809, the serving GW returns a Deactive SAE Bearer Response to the PDN GW.

In Step S1810, the PDN GW returns a PCC Provision Ack to the PCRF, and triggers the PCRF to deregister an address of the PDN GW from an HSS/SPR.

In Step S1810*a*, the PCRF deregisters the address of the PDN GW from the HSS/SPR.

In Step S1810, the PDN GW may trigger the PCRF to deregister the address according to a parameter configured on the PDN GW or the Deactive SAE Bearer Response returned by the MME in Step S1808. Likewise, the MME may determine whether to deregister the PDN GW address from the HSS/SPR by interacting with a PCC system or not according to subscription data of the UE and a parameter configured on the MME.

Likewise, the serving GW may determine whether to deregister the PDN GW address from the HSS/SPR by interacting with a PCC system according to conditions such as a parameter configured on the serving GW, and provide a related indication to the PDN GW to indicate that the PDN GW address is deregistered through the PCC system.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

In addition, the embodiment shown in FIG. 18 may include scenarios where the UE terminates a service in a non-3GPP network, for example, multiple PDN and multiple HA scenarios, and may also include scenarios where the PDN GW initiates a bearer deletion process. When all services related to the UE on the PDN GW are terminated, the PDN GW may deregister the PDN GW address from the HSS/AAA server/SPR through the PCC system. If the AAA server and the HSS are separate entities, the deregistration parameter or information needs to be transmitted by the AAA server to the HSS.

In the embodiment shown in FIG. 19, when all bearers related to a UE on a PDN GW are released, an MME deletes an address of the PDN GW stored in an HSS/SPR.

As shown in FIG. 19, the process includes the following steps.

In Step S1901, a PCRF provides a PCC decision to a PDN GW.

In Step S1902, the PDN GW triggers a bearer deletion process according to the received PCC decision. In this step, the PDN GW initiates a Deactive SAE Bearer Request to a serving GW.

In Step S1903, the serving GW initiates a Deactive SAE Bearer Request to an MME.

In Step S1904, the MME initiates a Deactive Bearer Request to an eNodeB.

In Step S1905, the eNodeB initiates a Deactive Radio Bearer Request to a UE.

In Step S1906, the UE removes a related uplink data stream template, and returns a Deactive Radio Bearer Response to the eNodeB.

In Step S1907, the eNodeB returns a Deactive Bearer Response to the MME.

In Step S1908, the MME returns a Deactive SAE Bearer Response to the serving GW.

In Step S1908a, the MME deregisters a PDN GW address in an HSS/SPR. Before the deregistration, the MME may determine whether the MME needs to deregister the PDN GW address in the HSS/SPR or not according to subscription data of the UE and a parameter configured on the MME.

In Step S1909, the serving GW returns a Deactive SAE Bearer Response to the PDN GW.

In Step S1910, the PDN GW returns a PCC Provision Ack to the PCRF, and triggers the PCRF to deregister the address of the PDN GW from the HSS/SPR.

Step S1908 and Step S1908a are performed in no particular order, in other words, Step S1908a may be performed at any time after Step S1907.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HS S/SPR.

In addition, the embodiment shown in FIG. 19 may include scenarios where the UE terminates a service in a non-3GPP network, for example, multiple PDN and multiple HA scenarios, and may also include scenarios where the PDN GW initiates a bearer deletion process. When all services related to the UE on the PDN GW are terminated, an entity such as an ePDG or an ASN GW that is equivalent to the MME may deregister the address of the PDN GW from the HSS/AAA server/SPR. If the AAA server and the HSS are separate entities, the deregistration parameter or information needs to be transmitted by the AAA server to the HSS.

Figure 21:
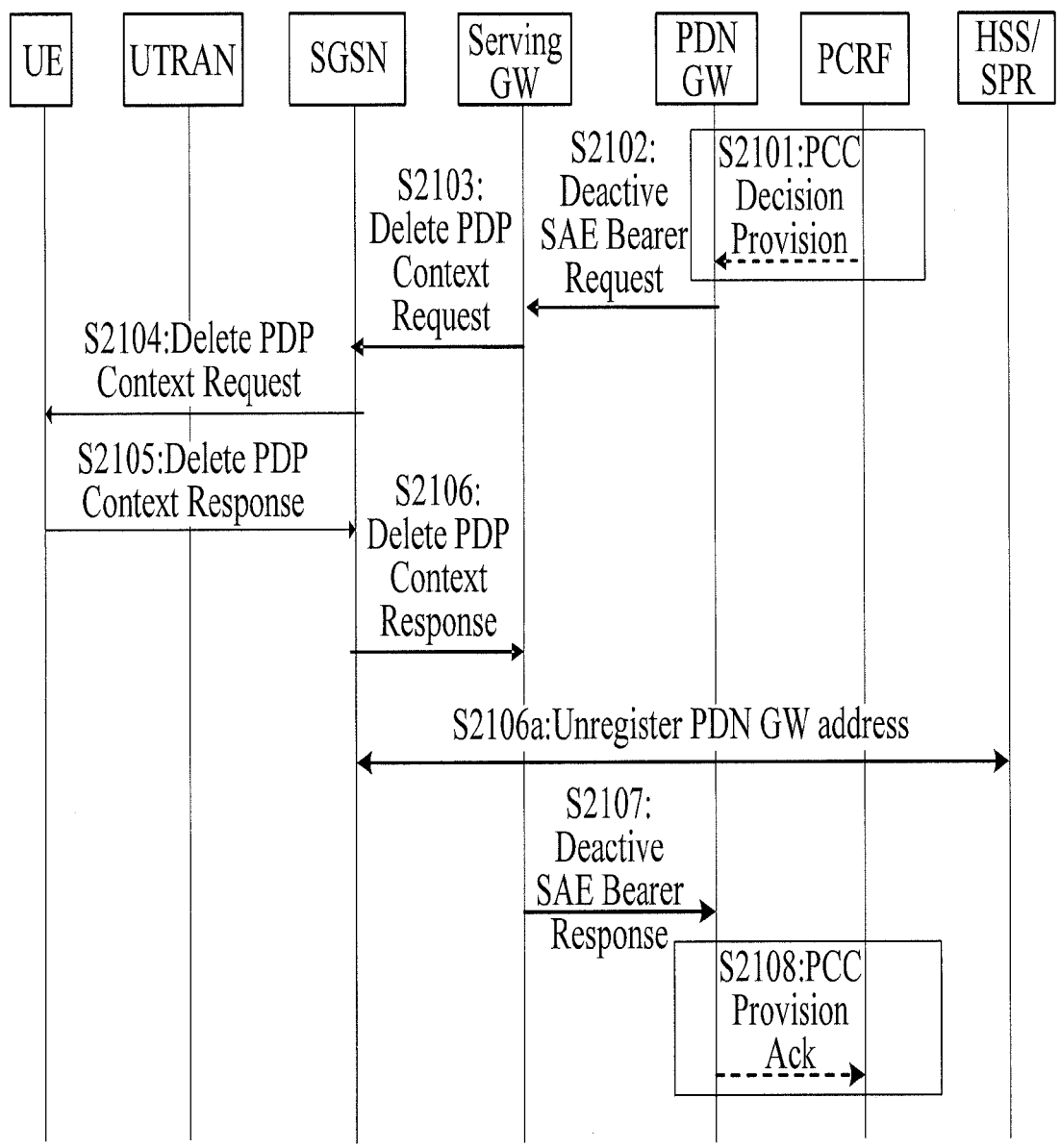
FIG. 21 is a flow chart of the method for deleting an address of a network anchor point from a network server according to one embodiment of the present disclosure.

The embodiment shown in FIG. 21 describes a process for deleting an address of a PDN GW from an HSS when a network initiates a bearer release process in a 3GPP access network. Specifically, when all bearers related to a UE on a PDN GW are released, an SGSN deletes an address of the PDN GW stored in an HSS/SPR.

In Step S2101, a PCRF provides a PCC decision to a PDN GW.

In Step S2102, the PDN GW triggers a bearer deletion process according to the received PCC decision. In this step, the PDN GW initiates a Deactive SAE Bearer Request to a serving GW.

In Step S2103, the serving GW initiates a Delete PDP Context Request to an SGSN.

In Step S2104, the SGSN initiates a Delete PDP Context Request to a UE.

In Step S2105, the UE returns a Delete PDP Context Response to the SGSN.

In Step S2106, the SGSN returns a Delete PDP Context Response to the serving GW.

In Step S2106a, the SGSN deregisters an address of the PDN GW stored in an HSS/SPR.

In Step S2107, the SGSN returns a Deactive SAE Bearer Response to the PDN GW.

In Step S2108, the PDN GW returns a PCC Provision Ack to the PCRF.

In addition, when a network entity such as the PCRF initiates a bearer deletion process, the PCRF may directly deregister the related PDN GW address from the HSS/AAA server/SPR. The specific process is basically the same as the embodiments provided herein, so the details will not be described herein again.

If the network allows a terminal to use multiple PDNs, the HSS may have stored a corresponding relation between the PDN GW and an APN; and at this time, the deregistration process of the PDN GW further includes deleting the corresponding relation between the PDN GW address and the APN stored in the HSS/SPR.

Figure 20:
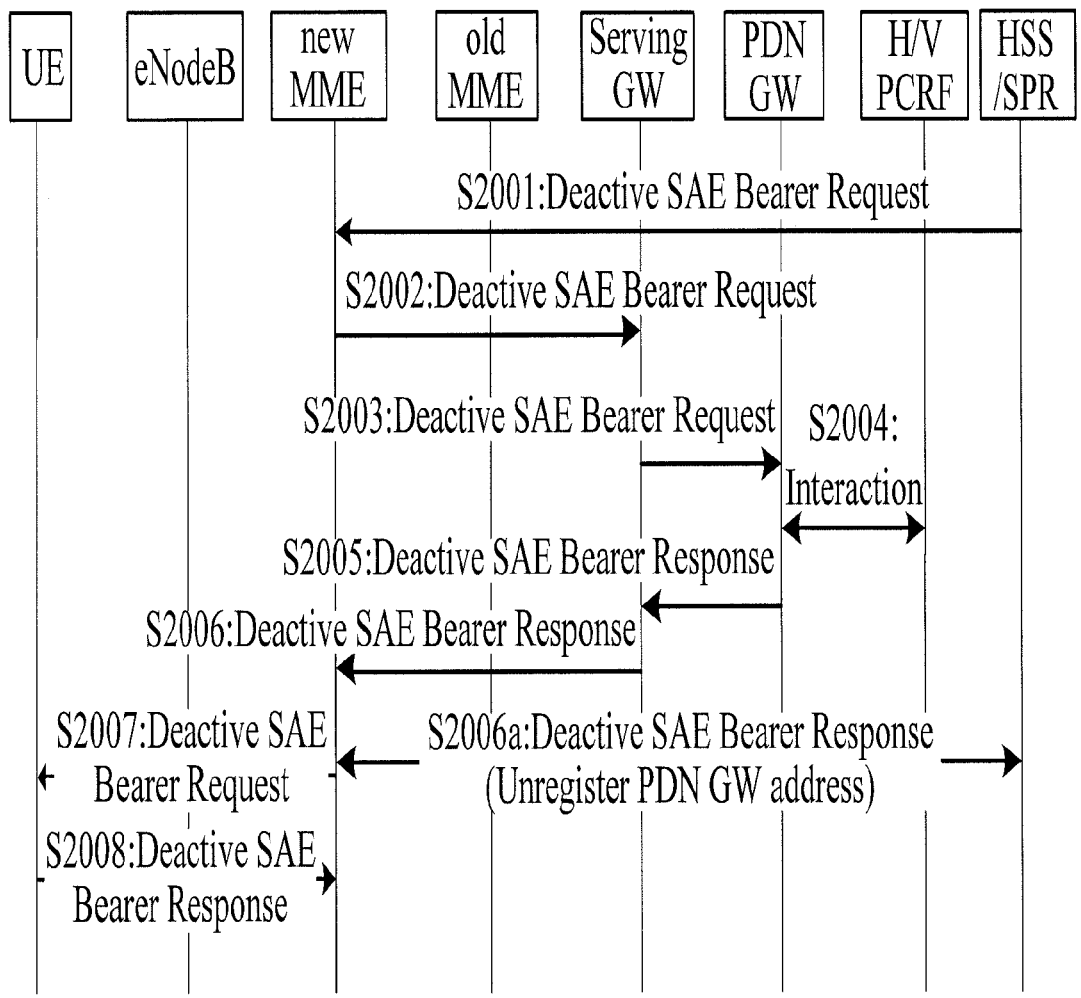
FIG. 20 is a flow chart of a method for implementing a bearer release process initiated by a network server according to one embodiment of the present disclosure.

The embodiment shown in FIG. 20 describes a process for deleting an address of a PDN GW from an HSS when an HSS initiates a bearer release process in an SAE/LTE access network. In actual applications, a terminal may subscribe to or unsubscribe from a service through a subscription mode such as the short message service; and when the terminal unsubscribes from the service, the terminal needs to check whether the service is being used or not in time, and unsubscribe from the service at the bearer level in time, so an HSS needs to initiate a bearer release process.

Specifically, as shown in FIG. 20, the process includes the following steps.

In Step S2001, an HSS/AAA server/SPR initiates a Deactive SAE Bearer Request to a new MME.

In Step S2002, the new MME initiates a Deactive SAE Bearer Request to a serving GW.

In Step S2003, the serving GW initiates a Deactive SAE Bearer Request to a PDN GW.

In Step S2004, the PDN GW interacts with a PCRF to release related binding information. This step is optional, and includes local breakout scenarios, that is, the PDN GW interacts with an H-PCRF through a V-PCRF.

In Step S2005, the PDN GW returns a Deactive SAE Bearer Response to the serving GW.

In Step S2006, the serving GW returns a Deactive SAE Bearer Response to the new MME.

In Step S2006a, the new MME returns a Deactive SAE Bearer Response to the HSS/SPR so as to deregister an address of the PDN GW in the HSS/SPR. Before the deregistration, the new MME may determine whether to deregister the PDN GW address from the HSS/SPR or not according to subscription data of the UE or a parameter configured on the new MME.

The network entity that deregisters the PDG GW may be, but is not limited to, the MME, PDN GW, PCRF, ePDG, ASN GW, or serving GW.

It should also be noted that, the HSS may have deregistered information related to the PDN GW when initiating the bearer deletion process, so the subsequent process for deregistering the address by different entities is optional.

In Step S2007, the new MME initiates a Deactive SAE Bearer Request to the UE. In addition, the new MME may also indicate an eNodeB to release a related radio bearer. Definitely, the indication may also be sent after Step S2002.

In Step S2008, the UE returns a Deactive SAE Bearer Response to the new MME.

The embodiment shown in FIG. 20 may include scenarios where the UE terminates a service in a non-3GPP network, the bearer release process may be initiated by a network service entity such as an HSS or an AAA server, an entity such as an ePDG or an ASN GW that is equivalent to the MME or the PDN GW may deregister the PDN GW address from HSS/AAA server/SPR, and the PDN GW address may also be deregistered through a PCC system. If the AAA server and the HSS are separate entities, the deregistration parameter or information needs to be transmitted by the AAA server to the HSS.

As some of the above embodiments are applicable to a communication system, the present disclosure further provides embodiments of the communication system.

Consistent with an embodiment, the present disclosure provides a communication system. The communication system includes an address deletion notification entity and a deregistration entity. The address deletion notification entity is configured to send a notification for deleting an address of a network anchor point when the network anchor point no longer serves a terminal, in which the address of the network anchor point has been registered with a network server. The deregistration entity is configured to deregister the address of the network anchor point according to the notification of the address deletion notification entity.

The deregistration entity is further configured to delete an APN corresponding to the anchor point when the APN is registered with the network server. The address deletion notification entity is an MME, or an SGSN, or an access network entity, or the network anchor point, or an entity in a PCC system.

As for the process for storing an address of a network anchor point to a network server by using the communication system, reference may be made to the descriptions in the above method embodiments.

In actual applications, in order to effectively manage and utilize the network resources, complete network management and control mechanisms are established for telecommunication networks. When a terminal logs out of a network, resources allocated to the terminal need to be released in time, including radio channels, bearers, and various tunnels. Accordingly, related management information such as an address of a PDN GW stored in an HSS also needs to be deleted. Therefore, the present disclosure further provides embodiments for a terminal to log out of a network.

In order to enable those skilled in the art to easily implement or reproduce a terminal to log out of a network, several embodiments are introduced below with reference to the accompanying drawings.

Embodiments shown in FIGS. 22, 23, 24, 25, 26, 27, and 28 respectively describe processes for a terminal to log out of a network when the terminal accesses through a non-3GPP access network.

Figure 22:
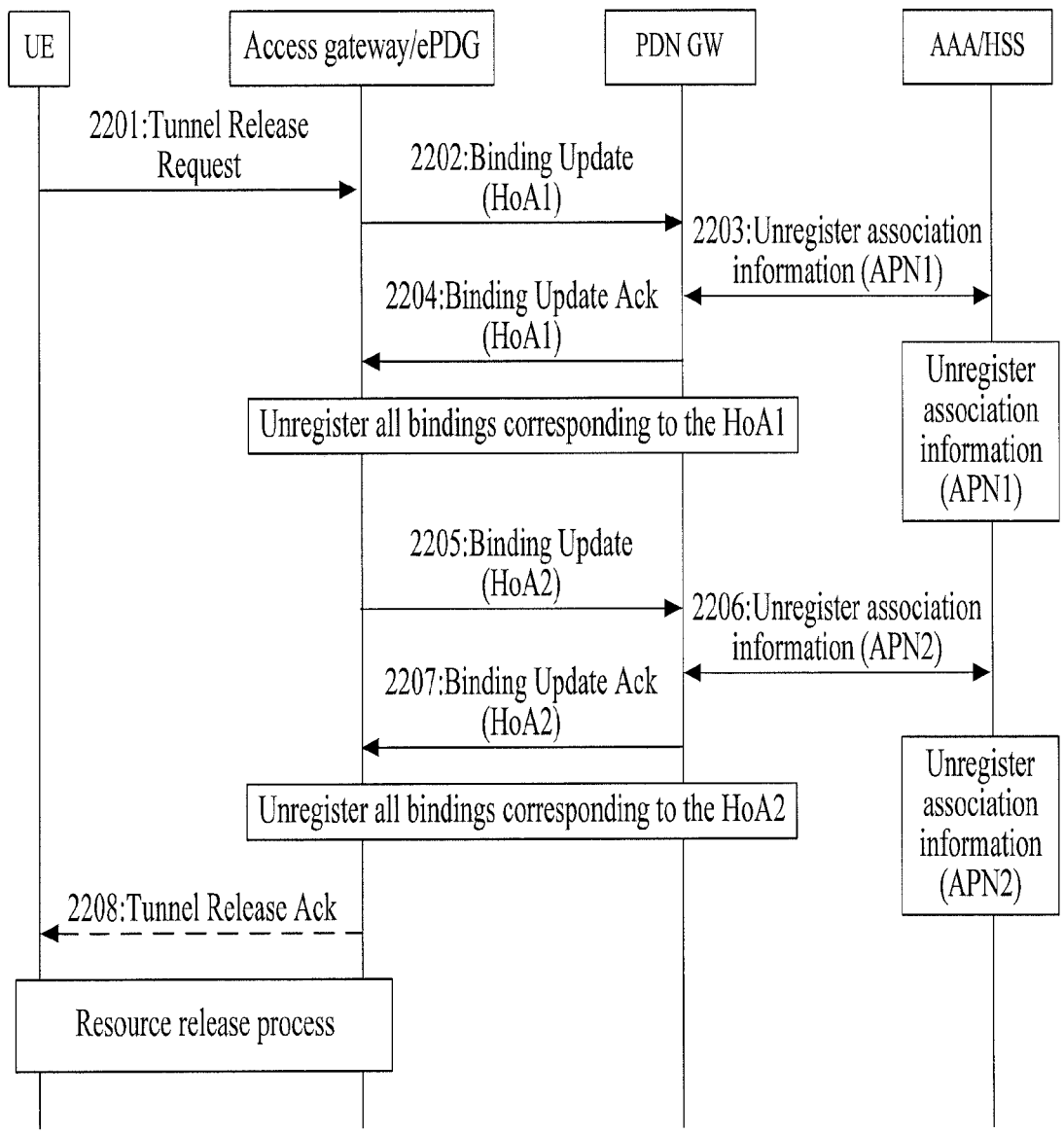
FIG. 22 is a flow chart of a method for a terminal to log out of a network according to one embodiment of the present disclosure.

Specifically, in the embodiment shown in FIG. 22, a UE initiates a logout process. In this embodiment, the UE accesses two PDNs at the same time, and the UE uses a home address 1 (HoA1) to access a PDN 1 identified by an APN1, and uses an HoA2 to access a PDN 2 identified by an APN 2.

As shown in FIG. 22, the logout process initiated by the UE includes the following steps.

In Step 2201, an access gateway/ePDG receives a Tunnel Release Request message sent by a UE. The message may carry an UE address and other parameters.

In Step 2202, the access gateway/ePDG sends a Binding Update message to a PDN GW. In the message, a lifetime parameter is set to 0, and a care-of address (CoA) parameter is set to the HoA1, indicating that all bindings corresponding to the HoA1 need to be deregistered.

In Step 2203, the PDN GW instructs an AAA server/HSS to deregister PDN GW address information corresponding to the APN1.

Here, in Step 2203, the access gateway/ePDG may also instruct the AAA server/HSS to deregister the PDN GW address information. In this case, Step 2203 may be performed concurrently with Steps 2202 and 2204.

In Step 2204, the PDN GW sends a Binding Update Ack message to the access gateway/ePDG to acknowledge that all bindings corresponding to the HoA1 are deleted. The PDN GW and the access gateway/ePDG delete the bindings specified in Step 2202.

In Step 2205, the access gateway/ePDG sends a Binding Update message to the PDN GW. In the message, a lifetime parameter is set to 0, and a CoA parameter is set to the HoA2, indicating that all bindings corresponding to the HoA2 need to be deregistered.

In Step 2206, the PDN GW instructs the AAA server/HSS to deregister PDN GW address information corresponding to the APN2.

Here, in Step 2206, the access gateway/ePDG may also instruct the AAA server/HSS to deregister the PDN GW address information. In this case, Step 2206 may be performed concurrently with Steps 2205 and 2207.

In Step 2207, the PDN GW sends a Binding Update Ack message to the access gateway/ePDG to acknowledge that all bindings corresponding to the HoA2 are deleted. The PDN GW and the access gateway/ePDG delete the bindings specified in Step 2205.

In Step 2208, the access gateway/ePDG returns a Tunnel Release Ack message to the UE. If the UE indicates in the Tunnel Release Request message that the logout process is initiated due to power off, Step 2208 may be omitted.

A resource release process is performed to release resources between the UE and the access gateway/ePDG.

If the UE and the ePDG are connected through a secure tunnel, Steps 2201 and 2208 may be a Tunnel Release Request/Ack message. If a Layer 3 connection such as an IP-based connection is established between the UE and the access gateway, Steps 2201 and 2208 may be a Layer 3-based Trigger/Ack message or Trigger/Ack process, or an access technology-specific trigger process.

If UE has multiple HoAs, bindings and PDN GW address information corresponding to each HoA may be sequentially deleted according to the method of this embodiment. The above method for deregistering the PDN GW address information by using HoA as the granularity is also applicable to other embodiments.

Figure 23:
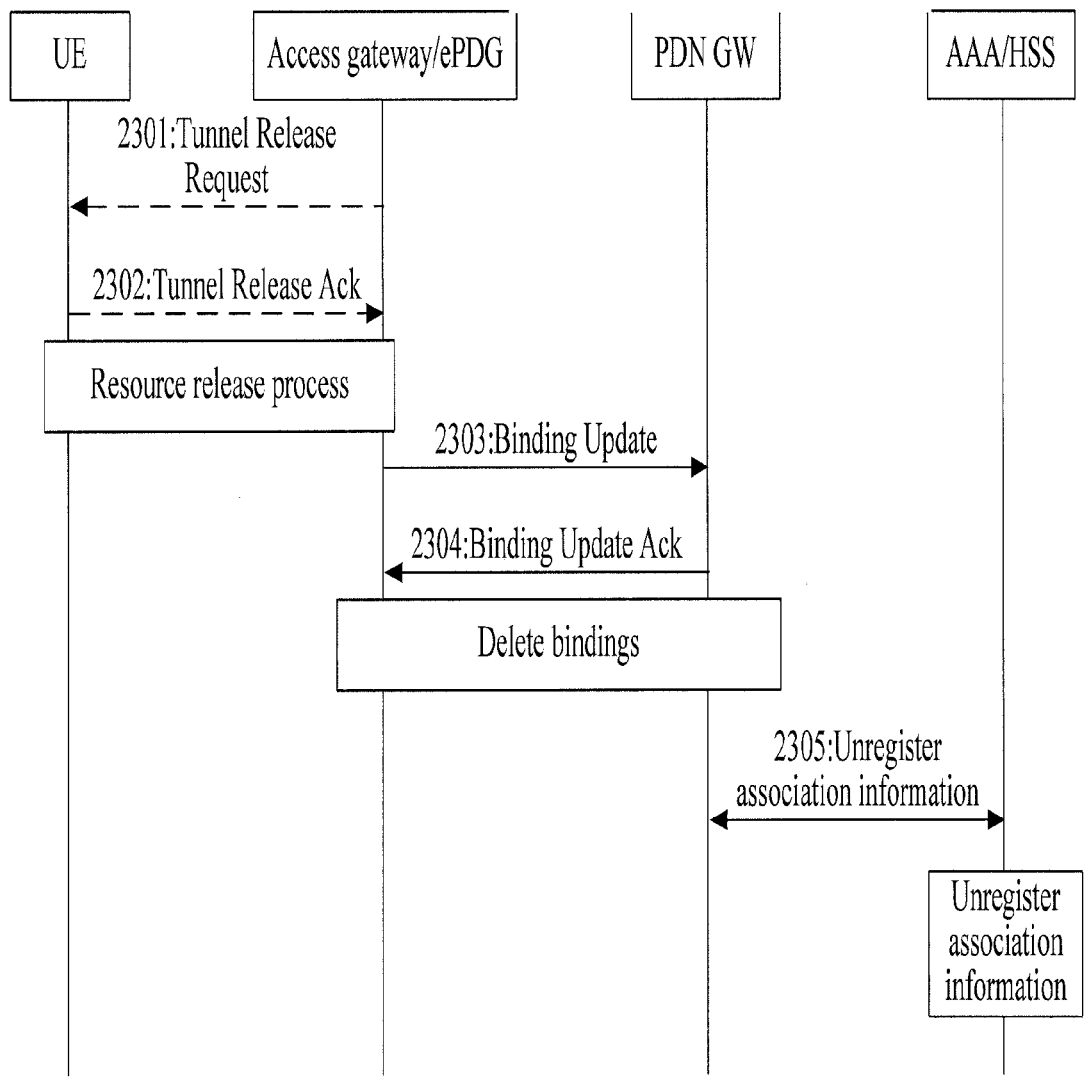
FIG. 23 is a flow chart of the method for a terminal to log out of a network according to one embodiment of the present disclosure.

Specifically, in the embodiment shown in FIG. 23, an access gateway/ePDG initiates a logout process.

As shown in FIG. 23, the process includes the following steps.

In Step 2301, an access gateway/ePDG sends a Tunnel Release Request message to a UE to request the releasing of a tunnel. The message may contain a release reason and other parameters.

In Step 2302, the UE returns a Tunnel Release Ack message to the access gateway/ePDG to perform a resource release process, so as to release tunnel resources and access network resources between the UE and the access gateway/ePDG.

Here, the access gateway/ePDG may directly perform the resource release process without notifying the UE, that is, Steps 2301 and 2302 may be omitted.

If the UE and the access gateway/ePDG are connected through a secure tunnel, Steps 2301 and 2302 may be a Tunnel Release Request/Ack message. If a Layer 3 connection such as an IP-based connection is established between the UE and the access gateway, Steps 2301 and 2302 may be a Layer 3-based Trigger/Ack message or Trigger/Ack process, or an access technology-specific trigger process.

In Step 2303, the access gateway/ePDG sends a Binding Update message to a PDN GW. In the message, a lifetime parameter is set to 0, and a CoA parameter is set to an HoA, indicating that all bindings corresponding to the HoA need to be deregistered.

In Step 2304, the PDN GW returns a Binding Update Ack message to the access gateway/ePDG. The PDN GW and the access gateway/ePDG delete the bindings specified in Step 3.

In Step 2305, the PDN GW instructs an AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, in Step 2305, the access gateway/ePDG may also instruct the AAA server/HSS to deregister the PDN GW address information.

Moreover, there is no strict time sequence among Steps 2301 and 2302, Steps 2303 and 2304, and Step 2305.

Figure 24:
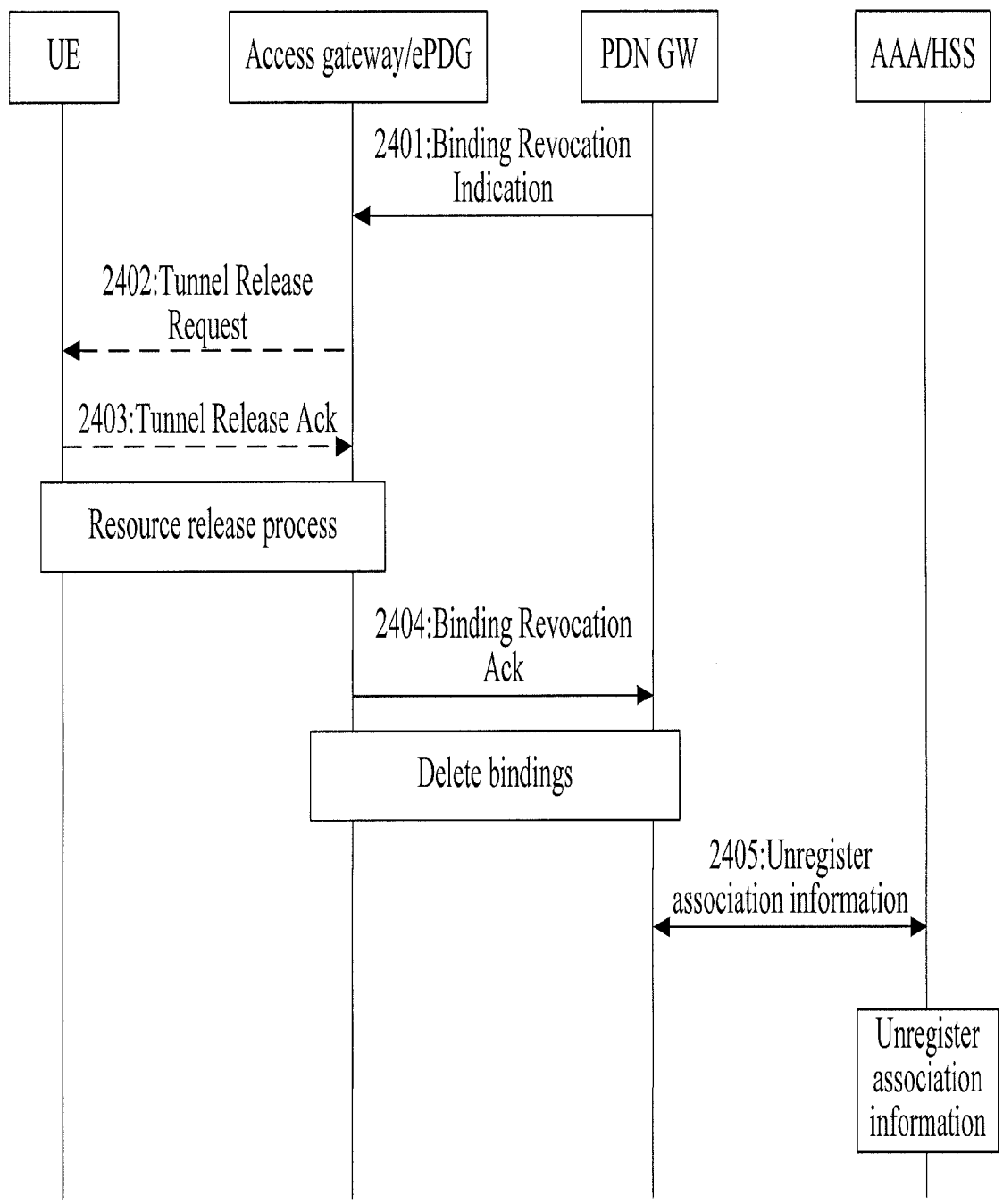
FIG. 24 is a flow chart of the method for a terminal to log out of a network according to one embodiment of the present disclosure.

Specifically, in the embodiment shown in FIG. 24, a PDN GW initiates a logout process.

As shown in FIG. 24, the process includes the following steps.

In Step 2401, a PDN GW sends a Binding Revocation Indication message to an access gateway/ePDG. The message may contain the following parameters: a UE identifier, a revocation reason, a revocation type, and the like.

In Step 2402, the access gateway/ePDG sends a Tunnel Release Request message to a UE. The message may contain a release reason and other parameters.

In Step 2403, the UE returns a Tunnel Release Ack message to the access gateway/ePDG to perform a resource release process, so as to release resources between the UE and the access gateway/ePDG.

Here, the access gateway/ePDG may directly perform the resource release process without notifying the UE, that is, Steps 2402 and 2403 may be omitted.

If the UE and the ePDG are connected through a secure tunnel, Steps 2402 and 2403 may be a Tunnel Release Request/Ack message. If a Layer 3 connection such as an IP-based connection is established between the UE and the access gateway, Steps 2402 and 2403 may be a Layer 3-based Trigger/Ack message or Trigger/Ack process, or an access technology-specific trigger process.

In Step 2404, the access gateway/ePDG returns a Binding Revocation Ack message to the PDN GW. The access gateway/ePDG and the PDN GW delete all bindings specified in Step 1.

In Step 2405, the PDN GW instructs an AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, in Step 2405, the access gateway/ePDG may also instruct the AAA server/HSS to deregister the association information.

Figure 25:
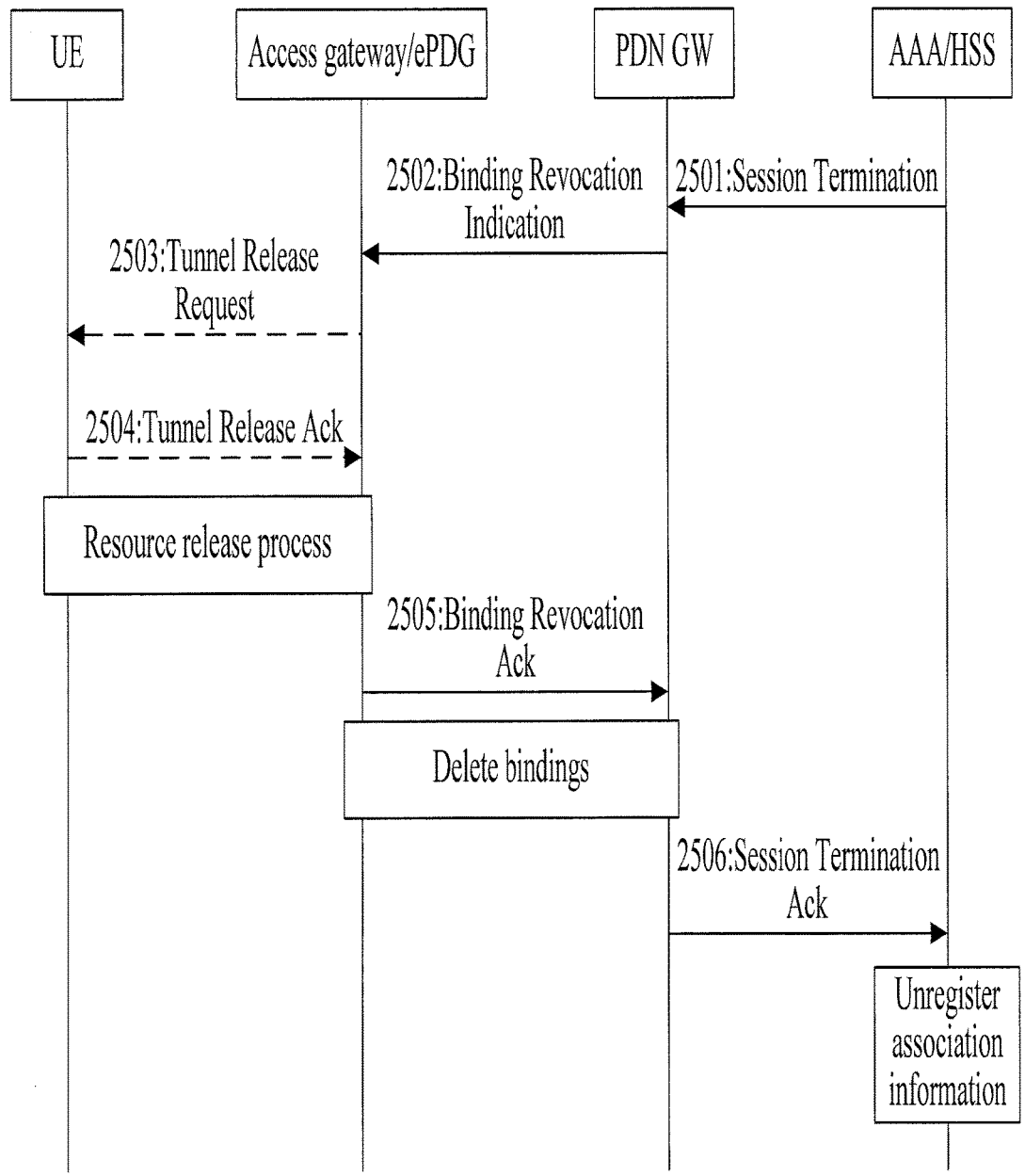
FIG. 25 is a flow chart of the method for a terminal to log out of a network according to one embodiment of the present disclosure.

Specifically, in the embodiment shown in FIG. 25, an AAA server/HSS initiates a logout process to a PDN GW.

As shown in FIG. 25, the process includes the following steps.

In Step 2501, an AAA server/HSS sends a Session Termination message to a PDN GW. The message may contain the following parameters: a UE identifier, a termination reason, a termination type, and the like.

In Step 2502, the PDN GW sends a Binding Revocation Indication message to an access gateway. The message may contain the following parameters: a UE identifier, a termination reason, a termination type, and the like.

In Step 2503, the access gateway sends a Tunnel Release Request message to a UE.

In Step 2504, the UE returns a Tunnel Release Ack message to the access gateway. An access network-specific resource release process is performed to release access network resources.

Here, the access gateway/ePDG may directly perform the resource release process without notifying the UE, that is, Steps 2503 and 2504 may not be performed.

If the UE and the access gateway/ePDG are connected through a secure tunnel, Steps 2503 and 2504 may be a Tunnel Release Request/Ack message. If a Layer 3 connection such as an IP-based connection is established between the UE and the access gateway, Steps 2503 and 2504 may be a Layer 3-based Trigger/Ack message or Trigger/Ack process, or an access technology-specific trigger process.

In Step 2505, the access gateway returns a Binding Revocation Ack message to the PDN GW. The access gateway and the PDN GW delete all bindings specified in Step 2502.

In Step 2506, the PDN GW instructs the AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Figure 26:
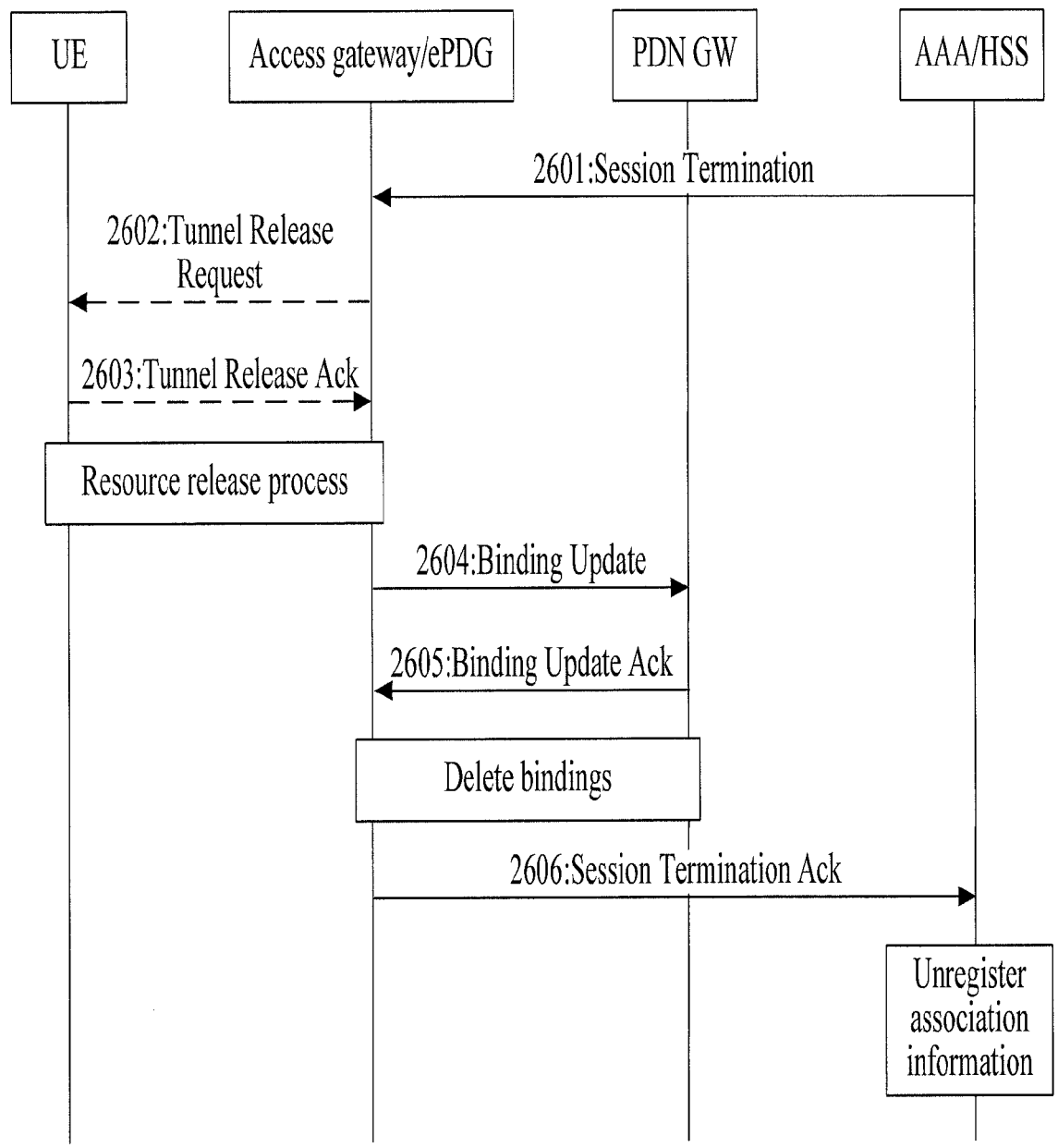
FIG. 26 is a flow chart of the method for a terminal to log out of a network according to one embodiment of the present disclosure.

Specifically, in the embodiment shown in FIG. 26, an AAA server/HSS initiates a logout process to an access gateway/ePDG. As shown in FIG. 26, the process includes the following steps.

In Step 2601, an AAA server/HSS sends a Session Termination message to an ePDG. The message contains the following parameters: a UE identifier, a termination reason, a termination type, and the like.

In Step 2602, the access gateway/ePDG sends a Tunnel Release Request message to a UE. The message may contain a release reason and other parameters.

In Step 2603, the UE returns a Tunnel Release Ack message to the access gateway/ePDG to perform a resource release process, so as to release resources between the UE and the access gateway/ePDG.

Here, the access gateway/ePDG may directly perform the resource release process without notifying the UE, that is, Steps 2602 and 2603 may not be performed.

If the UE and the ePDG are connected through a secure tunnel, Steps 2602 and 2603 may be a Tunnel Release Request/Ack message. If a Layer 3 connection such as an IP-based connection is established between the UE and the access gateway, Steps 2602 and 2603 may be a Layer 3-based Trigger/Ack message or Trigger/Ack process, or an access technology-specific trigger process.

In Step 2604, the access gateway/ePDG sends a Binding Update message to a PDN GW. In the message, a lifetime parameter is set to 0, and a CoA parameter is set to an HoA, indicating that all bindings corresponding to the HoA need to be deregistered.

In Step 2605, the PDN GW returns a Binding Update Ack message to the ePDG. The PDN GW and the access gateway/ePDG delete all bindings specified in Step 2604.

In Step 2606, the access gateway/ePDG returns a Session Termination Ack message to the AAA server/HSS. After receiving the message, the AAA server/HSS deregisters association information, for example, address information of the PDN GW that provides a service to the UE. If the network allows a terminal to use multiple PDNs, the AAA server/HSS may have stored a corresponding relation between the PDN GW and an APN; and at this time, the AAA server/HSS may further delete the corresponding relation between the PDN GW address and the APN stored therein.

Figure 27:
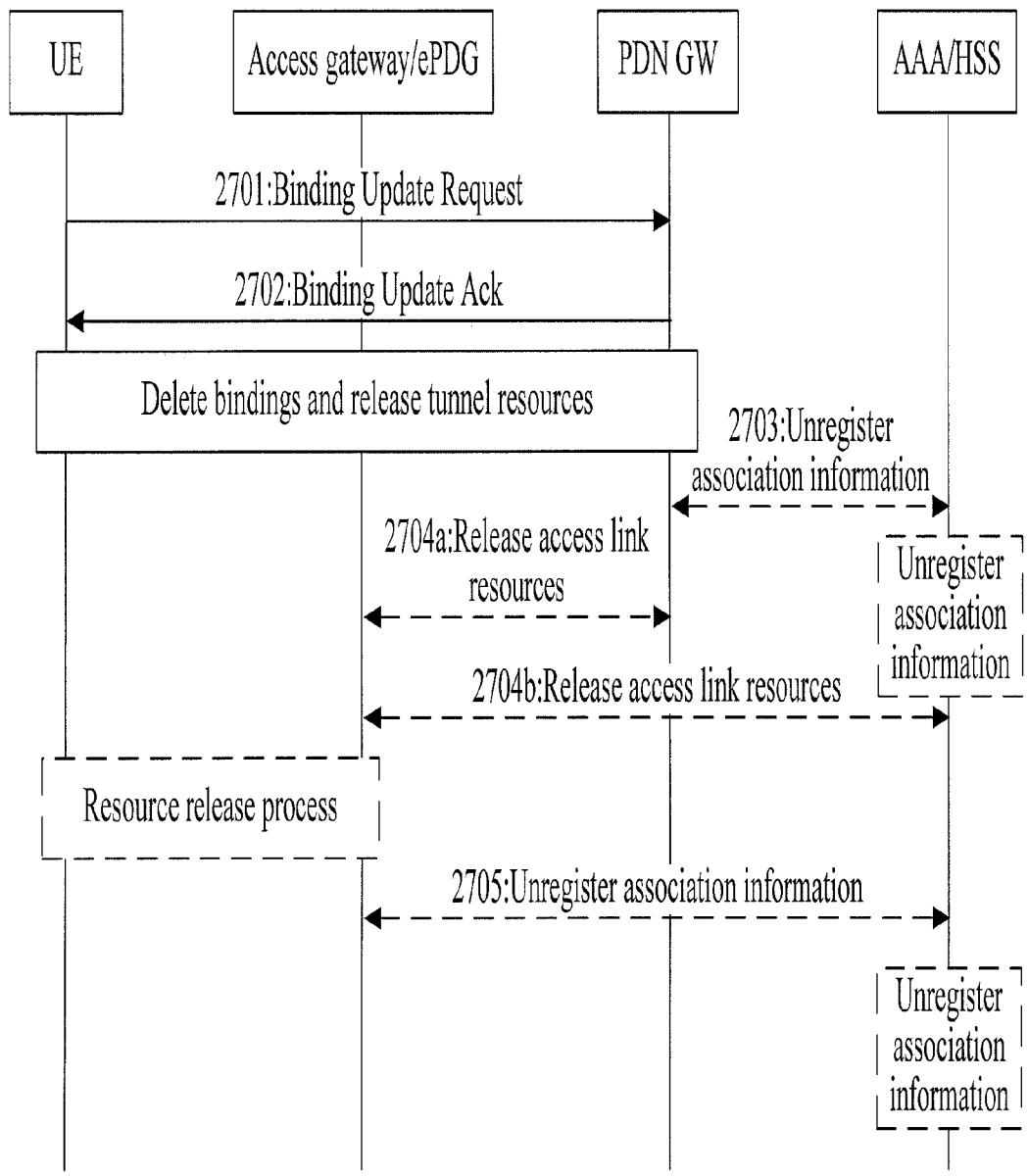
FIG. 27 is a flow chart of the method for a terminal to log out of a network according to one embodiment of the present disclosure.

Specifically, in the embodiment shown in FIG. 27, in the case of client mobile IP (CMIP) in a co-located CoA (Co-CoA mode), a UE initiates a logout process. The CMIP is a terminal-based mobile IP technology, that is, a technology that requires a terminal to participate in a mobile IP binding process. The CMIP has two modes: a foreign agent CoA mode (FA-CoA mode) and the Co-CoA mode. In the FA-CoA mode, a CoA of a terminal is an IP address of an access link mobile agent, and at this time, two endpoints of a mobile IP tunnel is the access link mobile agent and a home link mobile agent. In the Co-CoA mode, a CoA of a terminal is a terminal IP address obtained in a certain manner, and at this time, two endpoints of a mobile IP tunnel is the terminal and a home link mobile agent, and an access link mobile agent just serves as an ordinary router, that is, a mobile agent may not be deployed in an access link.

As shown in FIG. 27, the process includes the following steps.

In Step 2701, a PDN GW receives a Binding Update Request message sent by a UE. In the message, a lifetime parameter is set to 0, and a CoA parameter is set to an HoA, indicating that all bindings corresponding to the HoA need to be deregistered.

In Step 2702, the PDN GW returns a Binding Update Ack message to the UE.

The UE and the PDN GW delete the binding relation between the HoA and the CoA, and release a CMIP tunnel.

In Step 2703, the PDN GW instructs an AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

In Step 2704a, the PDN GW instructs an access gateway/ePDG to release access link resources. Alternatively, after Step 2703, the AAA server/HSS instructs the access gateway/ePDG to release the access link resources (Step 2704b).

In Step 2705, after receiving the indication of releasing the access link resources, the access gateway/ePDG instructs the AAA server/HS S to deregister the PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, Step 2703 and Step 2705 are two manners for deleting association information on the AAA server/HSS, and this embodiment may be implemented by performing either of the two steps.

Figure 28:
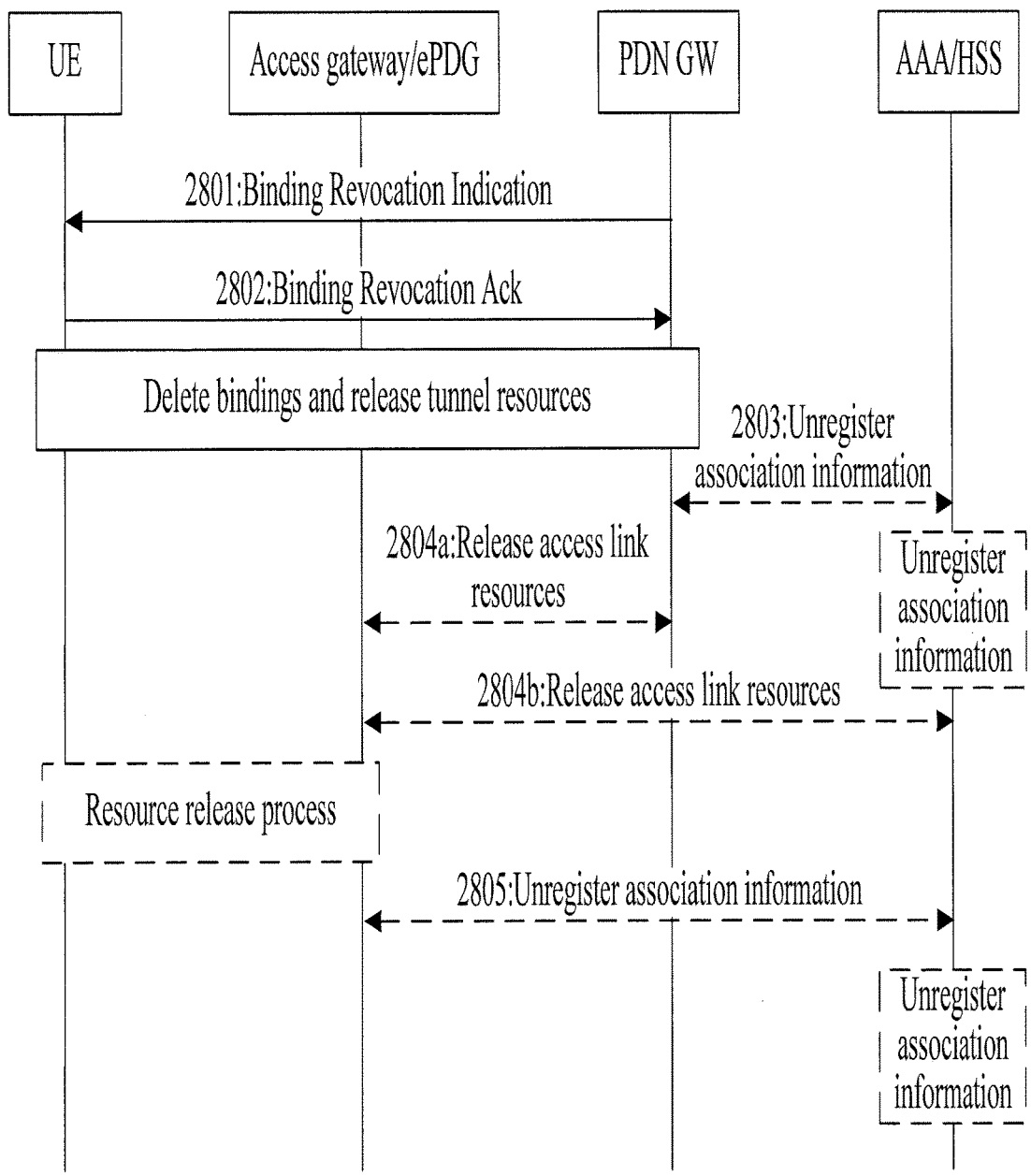
FIG. 28 is a flow chart of the method for a terminal to log out of a network according to one embodiment of the present disclosure.

Specifically, in the embodiment shown in FIG. 28, in the case of CMIP in the Co-CoA mode, a PDN GW initiates a logout process. As shown in FIG. 28, the process includes the following steps.

In Step 2801, a PDN GW sends a Binding Revocation Indication to a UE.

In Step 2802, the UE returns a Binding Revocation Ack message to the PDN GW.

The UE and the PDN GW delete the binding relation between the HoA and the CoA, and release a CMIP tunnel.

In Step 2803, the PDN GW instructs an AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

In Step 2804a, the PDN GW instructs an access gateway/ePDG to release access link resources. Alternatively, after Step 2803, the AAA server/HSS instructs the access gateway/ePDG to release the access link resources (Step 2804b).

In Step 2805, after receiving the indication of releasing the access link resources, the access gateway/ePDG instructs the AAA server/HSS to deregister the PDN GW address information. If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, Step 2803 and Step 2805 are two manners for deleting association information on the AAA server/HSS, and this embodiment may be implemented by performing either of the two steps.

Embodiments shown in FIGS. 29, 30, 31, and 32 respectively describe processes for a terminal to log out of a network when the terminal accesses an evolved 3GPP core network through a 3GPP network.

Figure 29:
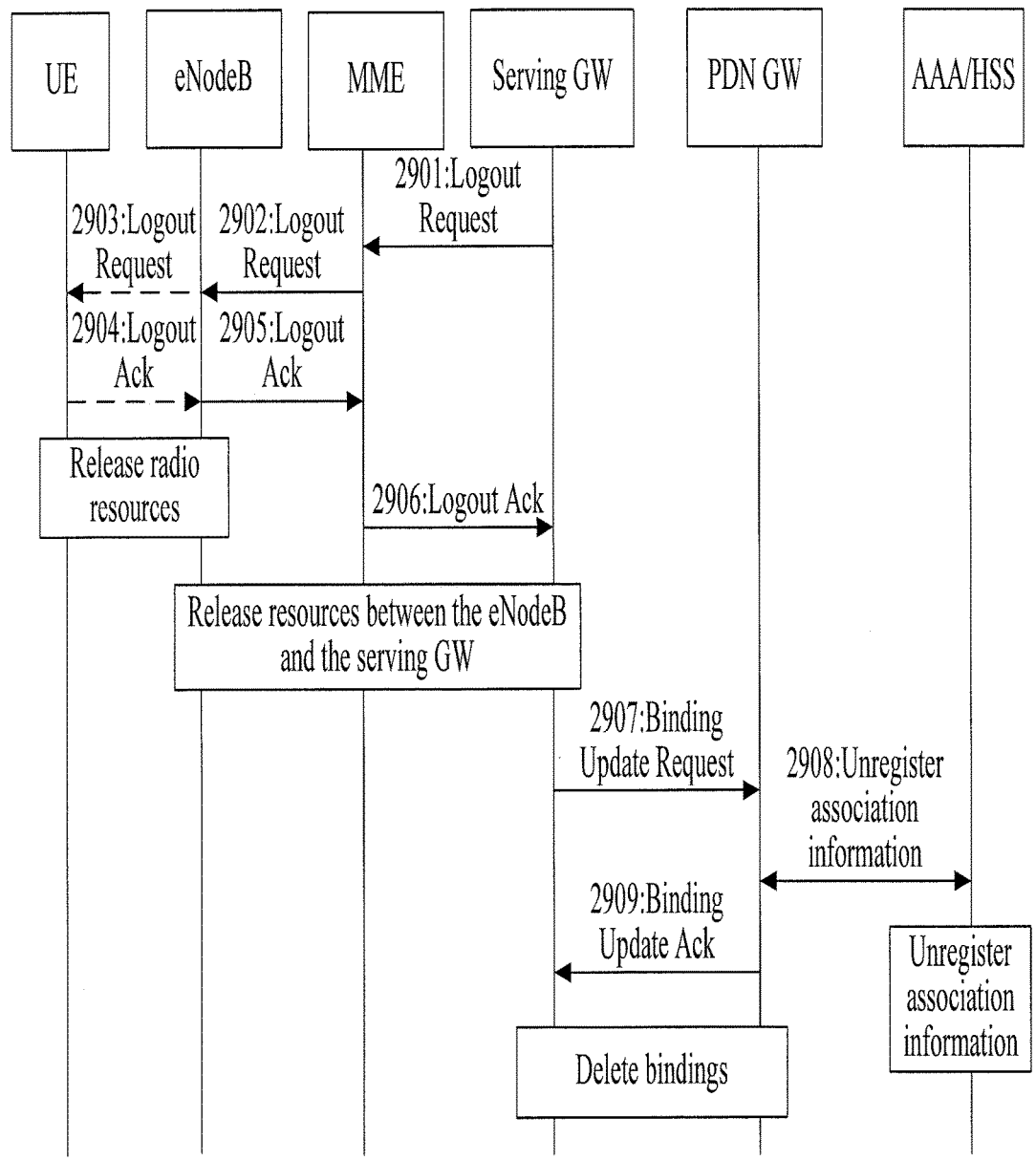
FIG. 29 is a flow chart of the method for a terminal to log out of a network according to one embodiment of the present disclosure.

Specifically, in the embodiment shown in FIG. 29, a serving GW initiates a logout process. As shown in FIG. 29, the process includes the following steps.

In Step 2901, a serving GW sends a Logout Request message to an MME. The message may contain a UE identifier, a logout reason, a logout type, and other parameters.

In Step 2902, the MME sends a Logout Request message to an eNodeB. The message may contain a UE identifier, a logout reason, a logout type, and other parameters.

In Step 2903, the eNodeB sends a Logout Request message to a UE. The message may contain a logout reason, a logout type, and the like.

In Step 2904, the UE returns a Logout Ack message to the eNodeB.

Radio resources between the UE and the eNodeB are released.

Here, the eNodeB may directly release the radio resources without notifying the UE, that is, Steps 2903 and 2904 may be omitted.

In Step 2905, the eNodeB returns a Logout Ack message to the MME.

In Step 2906, the MME returns a Logout Ack message to the serving GW.

Resources between the eNodeB and the serving GW are released.

In Step 2907, the serving GW sends a Binding Update message to a PDN GW. In the message, a lifetime parameter is set to 0, and a CoA parameter is set to an HoA, indicating that all bindings corresponding to the HoA need to be deregistered.

In Step 2908, the PDN GW instructs an AAA server/HSS to deregister PDN GW address information.

If the UE accesses multiple PDNs at the same time, i.e., the UE has multiple HoAs, the PDN GW may be indicated to delete all bindings corresponding to all HoAs of the UE in Step 2907, and then the PDN GW instructs the AAA server/HSS to deregister all PDN GW address information of the UE in Step 2908; the PDN GW may be instructed to sequentially delete bindings corresponding to each HoA, and the PDN GW sequentially instructs the AAA server/HSS to deregister PDN GW address information corresponding to each APN according to the method in the embodiment shown in FIG. 22.

Here, in Step 2908, the serving GW or the MME may also instruct the AAA server/HSS to deregister the PDN GW address information.

In Step 2909, the PDN GW returns a Binding Update Ack message to the serving GW.

The PDN GW and the serving GW delete all bindings specified in Step 2907.

Figure 30:
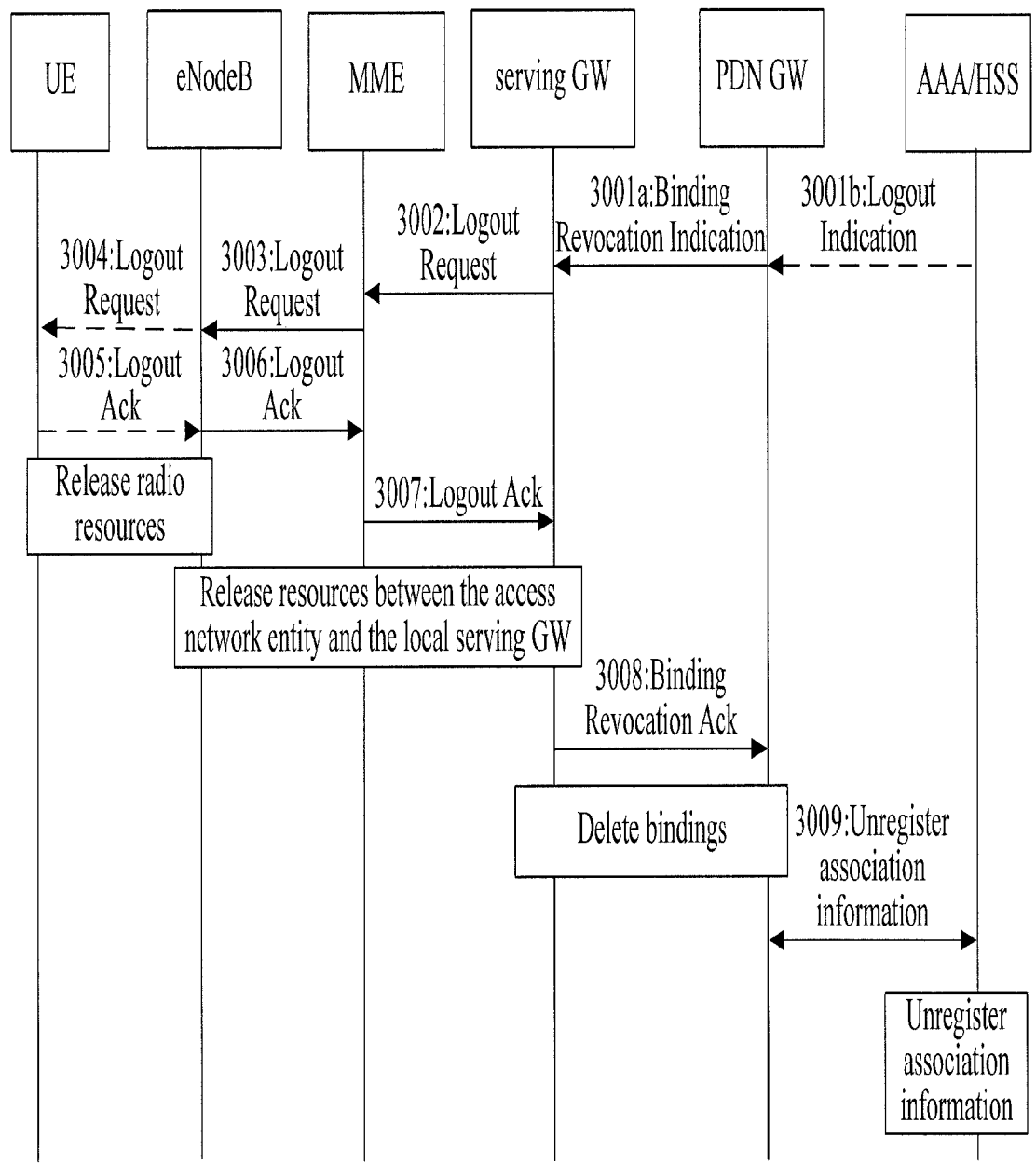
FIG. 30 is a flow chart of the method for a terminal to log out of a network according to one embodiment of the present disclosure.

Specifically, in the embodiment shown in FIG. 30, a PDN GW or an AAA server/HSS initiates a logout process. As shown in FIG. 30, the process includes the following steps.

In Step 3001*a*, a PDN GW sends a Binding Revocation Indication message to a serving GW. The message may contain the following parameters: a UE identifier, a revocation reason, a revocation type, and the like.

If an AAA server/HSS initiates a logout process, the AAA server/HSS sends a Logout Indication message to the PDN GW first (Step 3001*b*), and the PDN GW then sends the Binding Revocation Indication message to the serving GW.

In Step 3002, the serving GW sends a Logout Request message to an MME. The message may contain a UE identifier, a logout reason, a logout type, and other parameters.

In Step 3003, the MME sends a Logout Request message to an eNodeB. The message may contain a UE identifier, a logout reason, a logout type, and other parameters.

In Step 3004, the eNodeB sends a Logout Request message to a UE. The message may contain a logout reason, a logout type, and the like.

In Step 3005, the UE returns a Logout Ack message to the eNodeB, and radio resources between the UE and the eNodeB are released.

Here, the eNodeB may directly release the radio resources without notifying the UE, that is, Steps 3004 and 3005 may be omitted.

In Step 3006, the eNodeB returns a Logout Ack message to the MME.

In Step 3007, the MME returns a Logout Ack message to the serving GW.

Resources between the eNodeB and the serving GW are released.

In Step 3008, the serving GW returns a Binding Revocation Ack message to the PDN GW.

The PDN GW and the serving GW delete all bindings specified in Step 3001.

In Step 3009, the PDN GW instructs the AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, in Step 3009, the serving GW or the MME may also instruct the AAA server/HSS to deregister the PDN GW address information.

Figure 31:
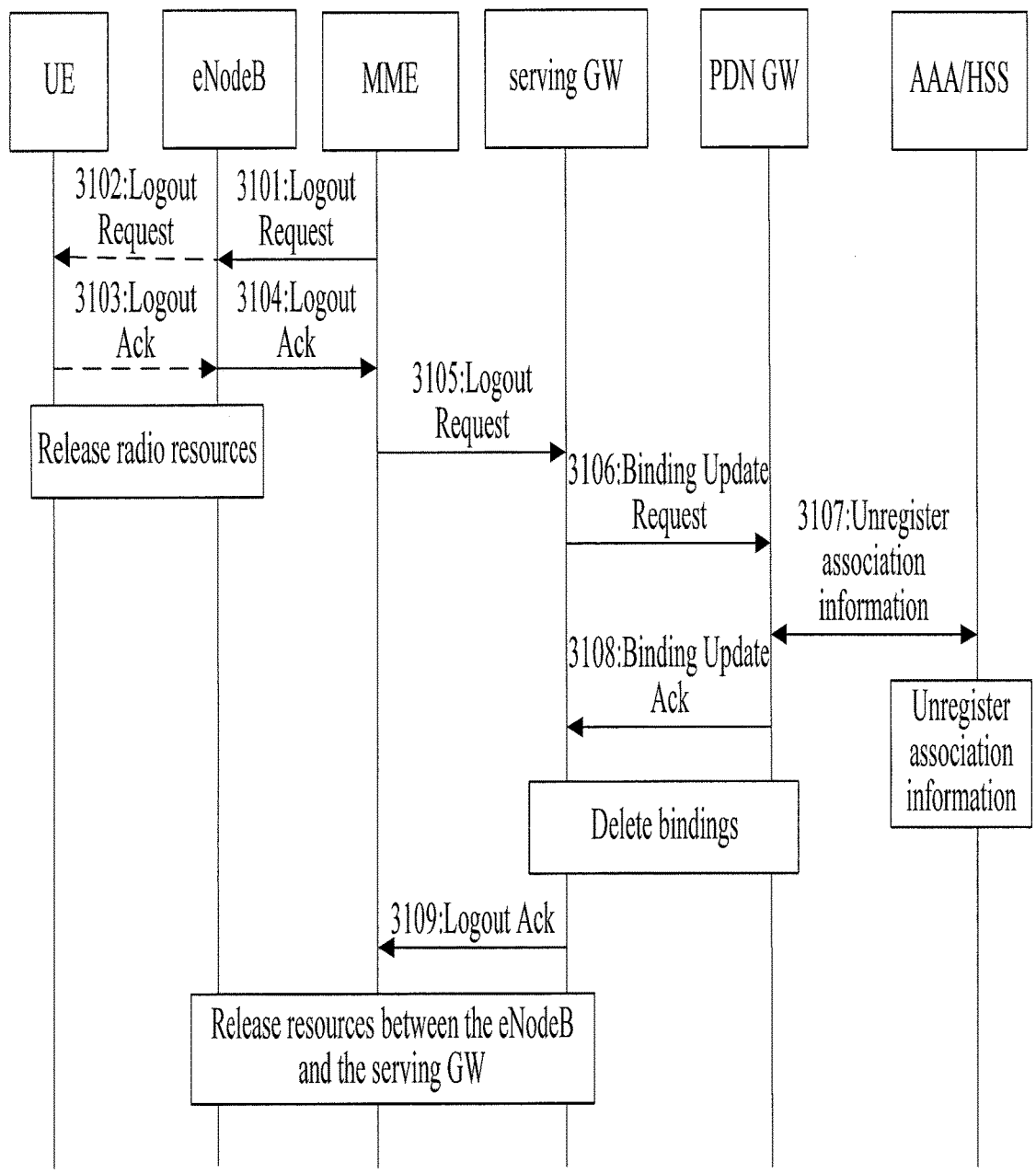
FIG. 31 is a flow chart of the method for a terminal to log out of a network according to one embodiment of the present disclosure.

Specifically, in the embodiment shown in FIG. 31, an MME initiates a logout process. As shown in FIG. 31, the process includes the following steps.

In Step 3101, an MME sends a Logout Request message to an eNodeB. The message may contain a UE identifier, a logout reason, a logout type, and other parameters.

In Step 3102, the eNodeB sends a Logout Request message to a UE. The message may contain a logout reason, a logout type, and the like.

In Step 3103, the UE returns a Logout Ack message to the eNodeB.

Radio resources between the UE and the eNodeB are released.

Here, the eNodeB may directly release the radio resources without notifying the UE, that is, Steps 3102 and 3103 may be omitted.

In Step 3104, the eNodeB returns a Logout Ack message to the MME.

In Step 3105, the MME sends a Logout Request message to a serving GW.

In Step 3106, the serving GW sends a Binding Update message to a PDN GW. In the message, a lifetime parameter is set to 0, and a CoA parameter is set to an HoA, indicating that all bindings corresponding to the HoA need to be deregistered.

In Step 3107, the PDN GW instructs an AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, in Step 3107, the serving GW or the MME may also instruct the AAA server/HSS to deregister the PDN GW address information.

In Step 3108, the PDN GW returns a Binding Update Ack message to the serving GW.

The PDN GW and the serving GW delete all bindings specified in Step 3106.

In Step 3109, the serving GW returns a Logout Ack message to the MME.

Resources between the eNodeB and the serving GW are released.

Figure 32:
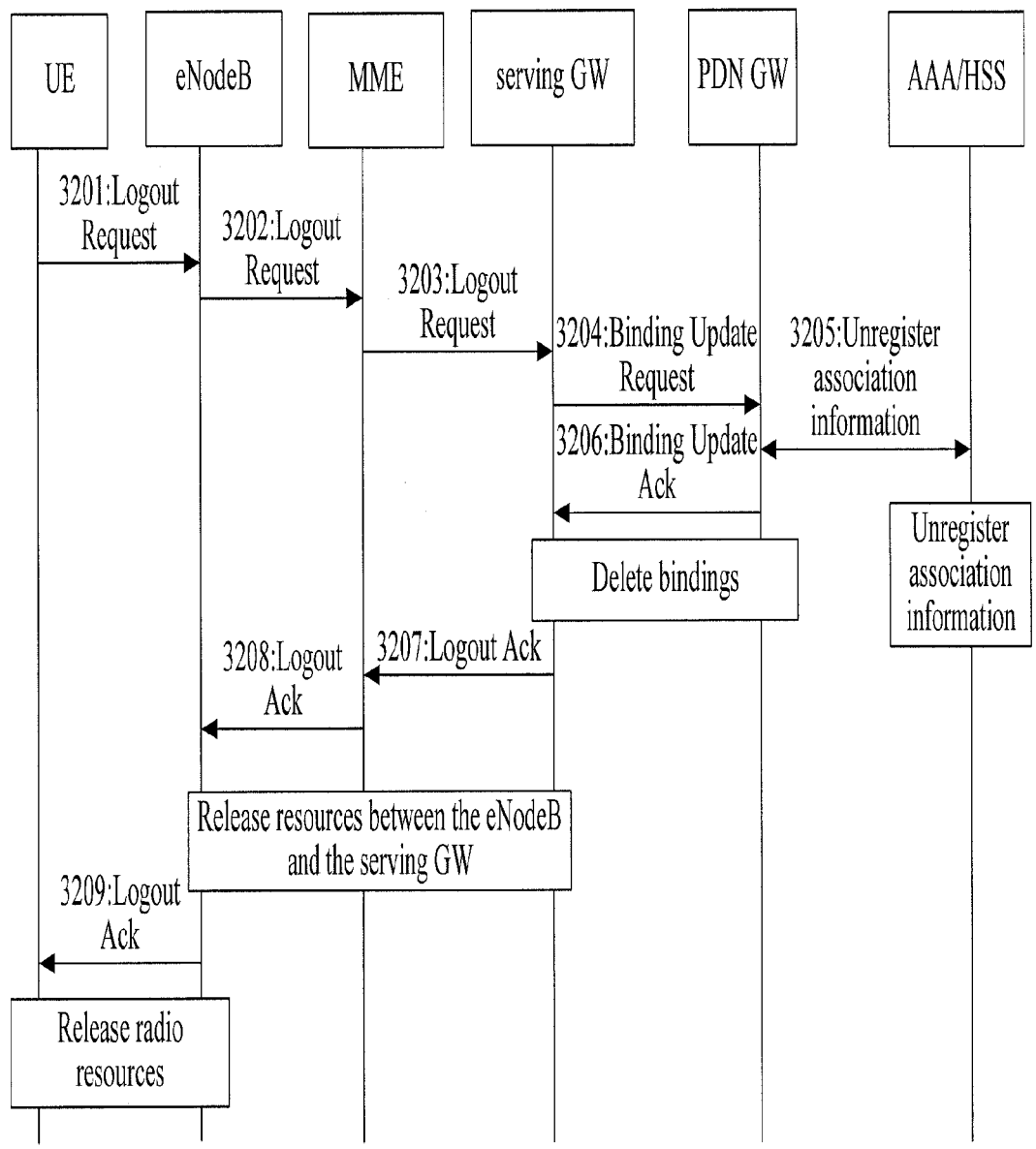
FIG. 32 is a flow chart of the method for a terminal to log out of a network according to one embodiment of the present disclosure.

Specifically, in the embodiment shown in FIG. 32, a UE initiates a logout process. As shown in FIG. 32, the process includes the following steps.

In Step 3201, an eNodeB receives a Logout Request message sent by a UE. The message may contain a UE identifier, a logout reason, a logout type, and other parameters.

In Step 3202, the eNodeB sends a Logout Request message to an MME. The message may contain a UE identifier, a logout reason, a logout type, and other parameters.

In Step 3203, the MME sends a Logout Request message to a serving GW. The message may contain a UE identifier, a logout reason, a logout type, and other parameters.

In Step 3204, the serving GW sends a Binding Update Request to a PDN GW. In the message, a lifetime parameter is set to 0, and a CoA parameter is set to an HoA, indicating that all bindings corresponding to the HoA need to be deregistered.

In Step 3205, the PDN GW instructs an AAA server/HSS to deregister PDN GW address information.

If the network allows a terminal to use multiple PDNs, the AAA server/HSS may have stored a corresponding relation between the PDN GW and an APN; and at this time, the deregistration process of the PDN GW further includes deleting the corresponding relation between the PDN GW address and the APN stored in the AAA server/HSS.

Here, in Step 3205, the serving GW or the MME may also instruct the AAA server/HSS to deregister the PDN GW address information.

In Step 3206, the PDN GW returns a Binding Update Ack message to the serving GW.

The serving GW and the PDN GW delete all bindings specified in Step 4.

In Step 3207, the serving GW returns a Logout Ack message to the MME.

In Step 3208, the MME returns a Logout Ack message to the eNodeB, and resources between the eNodeB and the serving GW are released.

In Step 3209, the eNodeB returns a Logout Ack message to the UE, and releases radio resources.

A method for a terminal to log out of a network so as to release resources is provided according to some embodiments described herein for an evolved network in which broadband radio access and mobile communication networks are converged. In the evolved network, when a terminal needs to be disconnected from the network, or the network intends to disconnect from the terminal, network resources can be released in time. Therefore, management and control mechanisms of the evolved network may be enhanced, thus improving the resource utilization.

The above descriptions are merely embodiments of the present disclosure. It will be apparent to those skilled in the art that improvements and modifications can be made to the embodiments described in the present disclosure without departing from the principle of the present disclosure, and such improvements and modifications shall fall within the protective scope of the present disclosure.

What is claimed is:

1. A telecommunication method, comprising:
determining, by a mobility management entity (MME), to register identity information of a packet data network gateway (PDN GW) and an access point name (APN) corresponding to the PDN GW to a home subscriber server (HSS) according to a condition, wherein the condition comprises subscription data of a user equipment (UE) indicating that the UE is allowed to hand over to a non-3rd Generation Partnership Project (non-3GPP) access;
registering, by the MME in response to the determining, the identity information of the PDN GW and the APN to the HSS; and
storing, by the HSS, the identity information of the PDN GW and the APN.

2. The method of claim 1, wherein the method is applied in an initial attach procedure of the UE to a 3rd Generation Partnership Project (3GPP) network.

3. The method of claim 2, wherein the 3GPP network comprises a long term evolution (LTE) network or a System Architecture Evolution (SAE) network.

4. The method of claim 1, wherein registering the identity information of the PDN GW and the APN comprises:
registering, by the network apparatus, the identity information of the PDN GW and the APN to the network server in case that a bearer in a 3rd Generation Partnership Project (3GPP) network was established by the PDN GW.

5. The method of claim 4, wherein the 3GPP network comprises a long term evolution (LTE) network or a System Architecture Evolution (SAE) network.

6. The method of claim 1, wherein the method is applied in an initial packet data network (PDN) connectivity establishment procedure.

7. The method of claim 1, wherein the identity information of the PDN GW comprises an internet protocol (IP) address of the PDN GW.

8. The method of claim 1, wherein the identity information of the PDN GW comprises a fully qualified domain name (FQDN) of the PDN GW.

9. A telecommunication system, comprising:
a mobility management entity (MME); and
a home subscriber server (HSS) communicatively connected with the MME,
wherein the MME is configured to determine, according to a condition, to register identity information of a packet data network gateway (PDN GW) and an access point name (APN) corresponding to the PDN GW to the HSS; and to register, in response to the determination, the identity information of the PDN GW and the APN to the HSS, wherein the condition comprises subscription data of a user equipment (UE) indicating that the UE is allowed to hand over to a non-3rd Generation Partnership Project (non-3GPP) access;
wherein the HSS is configured to store the identity information of the PDN GW and the APN.

10. The system of claim 9, wherein the MME is configured to register the identity information of the PDN GW and the APN to the HSS in an initial attach procedure of the UE to a 3rd Generation Partnership Project (3GPP) network.

11. The system of claim 10, wherein the 3GPP network comprises a long term evolution (LTE) network or a System Architecture Evolution (SAE) network.

12. The system of claim 9, wherein the MME is configured to register the identity information of the PDN GW and the APN to the HSS in case that a bearer in a 3rd Generation Partnership Project (3GPP) network was established by the network anchor point.

13. The system of claim 12, wherein the 3GPP network comprises a long term evolution (LTE) network or a System Architecture Evolution (SAE) network.

14. The system of claim 9, wherein the MME is configured to register the identity information of the PDN GW and the APN to the HSS in an initial packet data network (PDN) connectivity establishment procedure.

15. The system of claim 9, wherein the identity information of the PDN GW comprises an internet protocol (IP) address of the PDN GW.

16. The system of claim 9, wherein the identity information of the PDN GW comprises a fully qualified domain name (FQDN) of the PDN GW.

* * * * *